United States Patent
Hyde et al.

(10) Patent No.: US 9,435,239 B2
(45) Date of Patent: Sep. 6, 2016

(54) SYSTEMS, METHODS, AND APPARATUSES RELATED TO VEHICLES WITH REDUCED EMISSIONS

(71) Applicant: Elwha, LLC, Bellevue, WA (US)

(72) Inventors: Roderick A. Hyde, Redmond, WA (US); Lowell L. Wood, Jr., Bellevue, WA (US)

(73) Assignee: ELWHA LLC, Bellevue, WA (US)

( * ) Notice: Subject to any disclaimer, the term of this patent is extended or adjusted under 35 U.S.C. 154(b) by 217 days.

(21) Appl. No.: 13/957,083

(22) Filed: Aug. 1, 2013

(65) Prior Publication Data

US 2015/0033702 A1    Feb. 5, 2015

(51) Int. Cl.

| | |
|---|---|
| *F01N 3/00* | (2006.01) |
| *F01N 3/08* | (2006.01) |
| *F02M 21/02* | (2006.01) |
| *F01N 3/02* | (2006.01) |
| *F02B 45/10* | (2006.01) |

(52) U.S. Cl.
CPC ........... *F01N 3/0857* (2013.01); *F01N 3/0205* (2013.01); *F02M 21/02* (2013.01); *F01N 2240/26* (2013.01); *F02B 45/10* (2013.01); *Y02C 10/04* (2013.01); *Y02T 10/20* (2013.01); *Y02T 10/32* (2013.01); *Y02T 10/34* (2013.01)

(58) Field of Classification Search
CPC ...... F01N 3/10; F01N 2610/00; Y02C 10/08
USPC .................................... 60/272–324
See application file for complete search history.

(56) References Cited

U.S. PATENT DOCUMENTS

| | | |
|---|---|---|
| 5,540,190 A | 7/1996 | Rogers et al. |
| 6,079,373 A * | 6/2000 | Kawamura ........... F01N 3/0857 123/3 |
| 6,082,118 A | 7/2000 | Endrizzi et al. |
| 6,797,039 B2 | 9/2004 | Spencer |
| 7,222,673 B2 | 5/2007 | Graue et al. |
| 7,553,996 B2 | 6/2009 | Conant |
| 7,914,749 B2 | 3/2011 | Carstens et al. |
| 8,206,470 B1 | 6/2012 | Jacobson |
| 8,480,798 B1 | 7/2013 | Myers et al. |
| 9,175,591 B2 | 11/2015 | Hamad |
| 2005/0121200 A1 | 6/2005 | Sivaraman |
| 2007/0100178 A1* | 5/2007 | Carstens ................... B01J 7/02 585/15 |
| 2007/0287110 A1 | 12/2007 | Hance et al. |
| 2008/0221373 A1 | 9/2008 | Conant |
| 2009/0035627 A1 | 2/2009 | Tohidi et al. |
| 2010/0284866 A1 | 11/2010 | Jang et al. |
| 2011/0135548 A1 | 6/2011 | Comrie |

(Continued)

FOREIGN PATENT DOCUMENTS

EP    2 472 077 A1    7/2012

OTHER PUBLICATIONS

PCT International Search Report; International App. No. PCT/US2014/048154; Nov. 17, 2014; pp. 1-4.

(Continued)

*Primary Examiner* — Audrey K Bradley
*Assistant Examiner* — Anthony Ayala Delgado

(57) ABSTRACT

This disclosure relates generally to vehicles with reduced emissions. More particularly, this disclosure relates to systems, methods, and apparatuses related to vehicles with reduced carbon dioxide emissions. The carbon dioxide emissions may be stored in a carbon dioxide clathrate.

40 Claims, 5 Drawing Sheets

(56) References Cited

U.S. PATENT DOCUMENTS

2013/0220130 A1     8/2013   Ihms et al.
2013/0298761 A1    11/2013   Hamad
2014/0099245 A1     4/2014   Hamad

OTHER PUBLICATIONS

IEA Greenhouse Gas R&D Programme (IEA GHG), "Safety in Carbon Dioxide Capture, Transport and Storage, Jun. 2009".

Howard Herzog et al., Advanced Post-Combusion $CO_2$ Capture, Apr. 2009.

Youngjune Park et al., Sequestering Carbon Dioxide Into Complex Structures of Naturally Occurring Gas Hydrates, PNAS, Aug. 22, 2006, pp. 12690-12694, vol. 103 No. 34.

Supitcha Rinprasertmeechai et al., Carbon Dioxide Removal from Flue Gas Using Amine-Based Hybrid Solvent Absorption, International Journal of Chemical and Biological Engineering, 6 2012, pp. 296-300.

David Dortmundt et al., Recent Developments in $CO_2$ Removal Membrane Technology, UOP LLC, pp. 1-31, © 1999 UOP LLC, Des Plaines, Illinois.

David A. Green et al., Capture of Carbon Dioxide from Flue Gas Using a Cyclic Alkali Carbonate-Based Process, Second Annual Conference on Carbon Sequestration, Alexandria, Virginia, RTI International, May 2003, 24 pgs.

PCT International Search Report; International App. No. PCT/US2014/048157; Nov. 6, 2014; pp. 1-4.

\* cited by examiner

SYSTEMS, METHODS, AND APPARATUSES RELATED TO VEHICLES WITH REDUCED EMISSIONS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

None

RELATED APPLICATIONS

U.S. patent application Ser. No. 13/957,077, entitled SYSTEMS, METHODS, AND APPARATUSES RELATED TO VEHICLES WITH REDUCED EMISSIONS, naming Roderick A. Hyde and Lowell L. Wood, Jr. as inventors, filed Aug. 1, 2013, is related to the present application.

U.S. patent application Ser. No. 13/957,114, entitled SYSTEMS, METHODS, AND APPARATUSES RELATED TO VEHICLES WITH REDUCED EMISSIONS, naming Roderick A. Hyde and Lowell L. Wood, Jr. as inventors, filed Aug. 1, 2013, is related to the present application.

U.S. patent application Ser. No. 13/957,118, entitled SYSTEMS, METHODS, AND APPARATUSES RELATED TO VEHICLES WITH REDUCED EMISSIONS, naming Roderick A. Hyde and Lowell L. Wood, Jr. as inventors, filed Aug. 1, 2013, is related to the present application.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

TECHNICAL FIELD

This disclosure relates generally to vehicles with reduced emissions. More particularly, this disclosure relates to systems, methods, and apparatuses related to vehicles with reduced carbon dioxide emissions.

SUMMARY

This disclosure provides methods of sequestering emissions. A first method may comprise operating an engine of a vehicle and then combining carbon dioxide from an exhaust stream of the engine with a host material, and wherein the host material is compatible with forming carbon dioxide clathrates with the carbon dioxide of the exhaust stream. The first method may further comprise pressurizing and cooling the exhaust stream and host material sufficient to form carbon dioxide clathrates with the carbon dioxide and the host material. The first method may also further comprise storing formed carbon dioxide clathrates in an exhaust storage vessel of the vehicle during operation of the engine.

A second method may comprise storing gas clathrates in a clathrate storage vessel, separating stored gas clathrates into at least one gas and a host material, and operating an engine of a vehicle utilizing the at least one gas as fuel. The second method may further comprise combining carbon dioxide from an exhaust stream of the engine with host material, wherein the host material is compatible with forming carbon dioxide clathrates with the carbon dioxide of the exhaust stream. The second method may further comprise pressurizing and cooling the exhaust stream and the host material sufficient to form carbon dioxide clathrates with the carbon dioxide and the host material. The second method may also further comprise storing formed carbon dioxide clathrates in the clathrate storage vessel during operation of the engine.

A third method may comprise storing fuel as a liquid or gas and operating an engine of a vehicle using the fuel. The third method may further comprise combining an exhaust stream of the engine with a host material, wherein the exhaust stream comprises carbon dioxide and wherein the host material is compatible with forming carbon dioxide clathrates with the carbon dioxide of the exhaust stream. The third method may further comprise pressurizing and cooling the exhaust stream and host material sufficient to form carbon dioxide clathrates with the carbon dioxide and the host material. The third method may further comprise storing formed carbon dioxide clathrates in an exhaust storage vessel of the vehicle during operation of the engine.

This disclosure also provides vehicles with reduced emissions. In some embodiments, the vehicle comprises a separation system operably connected to the fuel storage vessel and configured to dissociate the gas clathrates into a host material and at least one gas. The vehicle may further comprise an engine operably connected to the separation system and configured to utilize the at least one gas as fuel. The vehicle may additionally comprise a clathrate formation system operably connected to the engine and configured to combine carbon dioxide from an exhaust stream from the engine with host material to form carbon dioxide clathrates. The vehicle may further comprise an exhaust storage vessel operably connected to the clathrate formation system and configured to store carbon dioxide clathrates.

In some embodiments, the vehicle comprises a clathrate storage vessel configured to store gas clathrates and carbon dioxide clathrates. The vehicle may further comprise a separation system configured to dissociate the gas clathrates into a host material and at least one gas and an engine configured to utilize the at least one gas as fuel. The vehicle may further comprise a clathrate formation system configured to combine carbon dioxide from an exhaust stream from the engine, with host material to form carbon dioxide clathrates.

In some embodiments, the vehicle comprises an engine, a supply of host material, and a clathrate formation system operably connected to the engine, operably connected to the supply of host material, and configured to combine carbon dioxide from an exhaust stream from the engine with the host material to form carbon dioxide clathrates. The vehicle may further comprise an exhaust storage vessel configured to store carbon dioxide clathrates.

In some embodiments, the vehicle comprises a clathrate storage vessel configured to store gas clathrates at a first temperature and a first pressure and an engine operably connected to the clathrate storage vessel and configured to receive discharged at least one gas from the clathrate storage vessel. The vehicle may further comprise an exhaust delivery system operably connected to the engine and configured to introduce carbon dioxide from an exhaust stream from the engine into the clathrate storage vessel at a temperature and pressure substantially the same as the first temperature and pressure. The clathrate storage vessel may be configured to discharge the at least one gas and store carbon dioxide clathrates.

In some embodiments, the vehicle comprises a fuel storage vessel configured to store gas clathrates and an exchange vessel operably connected to the fuel storage vessel and configured to receive the gas clathrates. The exchange vessel may be configured to maintain the gas clathrates at a first temperature and a first pressure and may be configured to exchange carbon dioxide for at least one gas within the gas clathrates. The exchange vessel may be configured to discharge the at least one gas and carbon dioxide clathrates. The vehicle may further comprise an engine operably connected to the exchange vessel and configured to receive discharged gas from the exchange vessel. The vehicle may further comprise an exhaust delivery system operably connected to the engine and configured to introduce carbon dioxide from an exhaust stream from the engine into the exchange vessel at a temperature and pressure substantially the same as the first temperature and pressure. The vehicle may further comprise an exhaust storage vessel configured to receive the carbon dioxide clathrates from the exchange vessel.

This disclosure also provides kits for reducing the emissions of existing vehicles. The kits may comprise a host material storage vessel and a clathrate formation system configured for operable connection to an engine of a vehicle, configured to be operably connected to the host material storage vessel, and configured to combine an exhaust stream from the engine with host material to form carbon dioxide clathrates. The kits may further comprise an exhaust storage vessel configured to store carbon dioxide clathrates.

DETAILED DESCRIPTION

Figure 1:
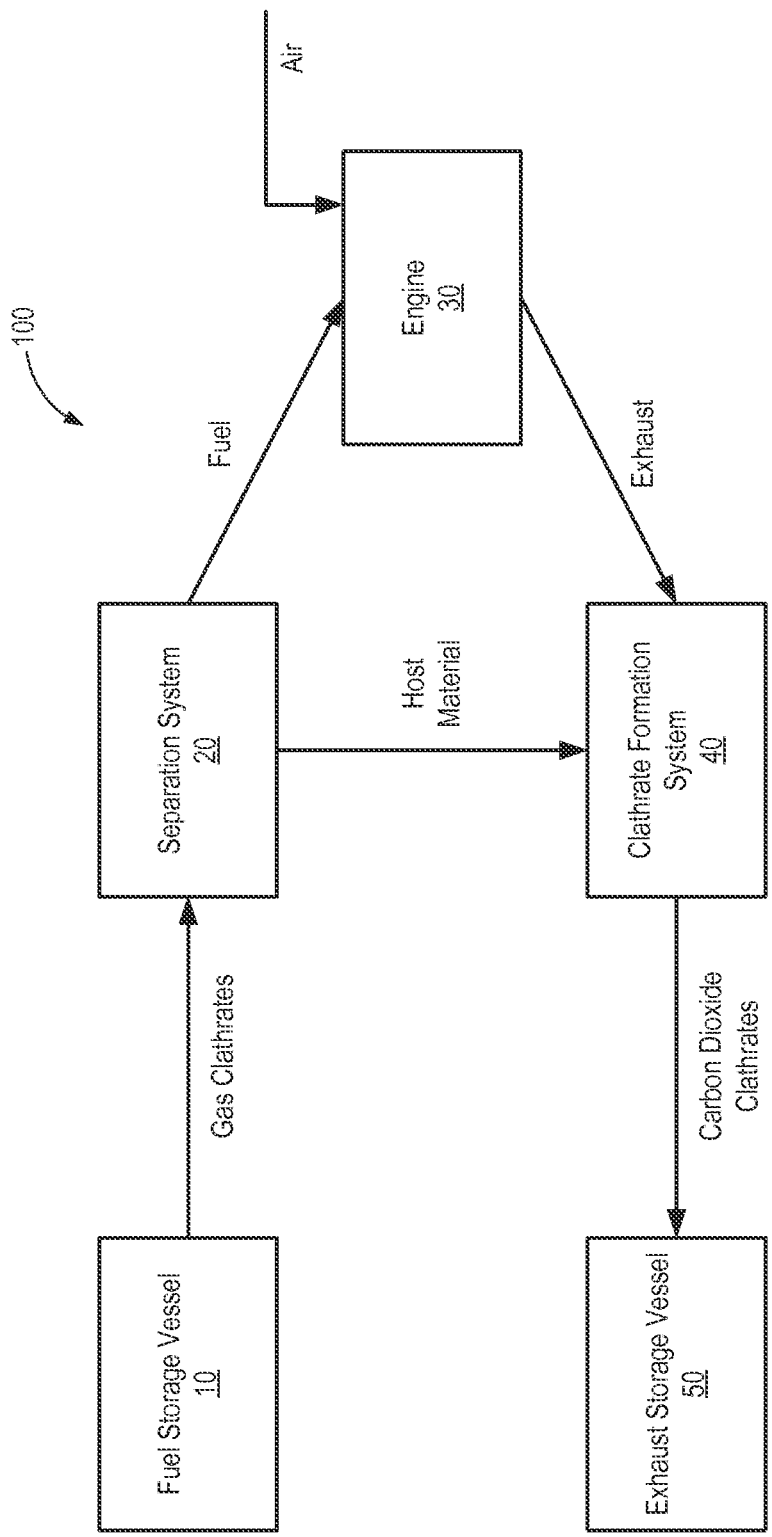
FIG. 1 illustrates an embodiment of a vehicle configured to sequester carbon dioxide emissions.

Natural gas is a cleaner-burning fuel compared to traditional fossil fuels. However, natural gas at ambient temperatures and atmospheric pressure is a high-volume gas. For an automobile to store a sufficient amount of natural gas for operation comparable to that of a gasoline or diesel engine, it has been necessary to increase the density of the natural gas. One approach has been to liquefy the natural gas by cooling the natural gas to about −162 degrees Centigrade. At that temperature, natural gas is a liquid at essentially ambient pressure. Storage of liquid natural gas (LNG) requires the use of special cryogenic equipment. Another approach has been to compress the natural gas to a pressure of about 200 to 248 bars. At that pressure and ambient temperature, natural gas occupies about 1/100th the volume of natural gas at general ambient temperatures and pressures. Storage of compressed natural gas (CNG) requires the use of high-pressure storage vessels.

Gas clathrates are chemical substances in which certain gas molecules are trapped in a cage or crystal lattice formed by certain host materials. In many cases, the gas molecules stabilize the crystal lattice or cage, such that the crystal lattice or cage may maintain its structure at a much higher temperature and lower pressure than would be possible without the presence of the gas molecules. Methane clathrates, for example, exist in nature, among other places, under sediments on the ocean floors. Gas clathrates may be able to store gases, such as methane, at volumes comparable to CNG, but at much lower pressures and at much higher temperatures than LNG.

Clathrates can also be formed with carbon dioxide. Carbon dioxide clathrates can be formed at temperatures and pressures similar to those that form gas clathrates and with similar host materials.

Combustion of gas clathrates refers to dissociation of gas(es) from the clathrate host material and then combustion of the gas(es). During the process of combustion of the gas(es) the host material may also be vaporized. This vaporization does not constitute combustion. However, in some embodiments, the host material may include elements that may be combustible under certain conditions. Dissociation of gas(es) from the clathrate host material includes any process for separating the gas(es) from the clathrate host material. This includes diffusion of the gas(es) away from the solid clathrate host material and/or melting of the clathrate host material to release the gas(es).

The phrases "operably connected to," "connected to," and "coupled to" refer to any form of interaction between two or more entities, including mechanical, electrical, magnetic, electromagnetic, fluid, and thermal interaction. Likewise, "fluidically connected to" refers to any form of fluidic interaction between two or more entities. Two entities may interact with each other even though they are not in direct contact with each other. For example, two entities may interact with each other through an intermediate entity.

The term "substantially" is used herein to mean almost and including 100%, including at least about 80%, at least about 90%, at least about 91%, at least about 92%, at least about 93%, at least about 94%, at least about 95%, at least about 96%, at least about 97%, at least about 98%, and at least about 99%.

This disclosure provides methods of sequestering emissions. A first method may comprise operating an engine of a vehicle and then combining carbon dioxide from an exhaust stream of the engine with a host material, and wherein the host material is compatible with forming carbon dioxide clathrates with the carbon dioxide of the exhaust stream. The first method may further comprise pressurizing and cooling the exhaust stream and host material sufficient to form carbon dioxide clathrates with the carbon dioxide and the host material. The first method may also further comprise storing formed carbon dioxide clathrates in an exhaust storage vessel of the vehicle during operation of the engine.

A second method may comprise storing gas clathrates in a clathrate storage vessel, separating stored gas clathrates into at least one gas and a host material, and operating an engine of a vehicle utilizing the at least one gas as fuel. The second method may further comprise combining carbon dioxide from an exhaust stream of the engine with host material, wherein the host material is compatible with forming carbon dioxide clathrates with the carbon dioxide of the exhaust stream. The second method may further comprise pressurizing and cooling the exhaust stream and the host material sufficient to form carbon dioxide clathrates with the carbon dioxide and the host material. The second method may also further comprise storing formed carbon dioxide clathrates in the clathrate storage vessel during operation of the engine.

A third method may comprise storing fuel as a liquid or gas and operating an engine of a vehicle using the fuel. The third method may further comprise combining an exhaust stream of the engine with a host material, wherein the exhaust stream comprises carbon dioxide and wherein the host material is compatible with forming carbon dioxide clathrates with the carbon dioxide of the exhaust stream. The third method may further comprise pressurizing and cooling the exhaust stream and host material sufficient to form carbon dioxide clathrates with the carbon dioxide and the host material. The third method may further comprise storing formed carbon dioxide clathrates in an exhaust storage vessel of the vehicle during operation of the engine.

The methods may further comprise removing stored carbon dioxide from the vehicle when the vehicle is otherwise not in use. The methods may further comprise reporting the amount of carbon dioxide removed from the vehicle. By way of non-limiting example, the reporting may comprise displaying the amount of carbon dioxide removed from the vehicle in a location visible to an operator of the vehicle. By way of non-limiting example, the reporting may comprise wirelessly reporting the amount of carbon dioxide removed from the vehicle to an external agency. Likewise, the methods may further comprise reporting the ratio of carbon dioxide removed from the vehicle to carbon dioxide produced by the engine. By way of non-limiting example, the reporting may comprise displaying the ratio of carbon dioxide removed from the vehicle to carbon dioxide produced by the engine in a location visible to an operator of the vehicle. By way of non-limiting example, the reporting may comprise wirelessly reporting the ratio of carbon dioxide removed from the vehicle to carbon dioxide produced by the engine to an external agency.

In some embodiments of the first and third methods, removing stored carbon dioxide from the vehicle comprises reducing the pressure and/or increasing the temperature of the exhaust storage vessel sufficient to dissociate the carbon dioxide clathrates stored therein back into carbon dioxide and host material and venting gaseous carbon dioxide from the exhaust storage vessel. For example, the exhaust storage vessel may be warmed sufficient to liquefy the host material and gasify the carbon dioxide for venting. Heat to warm the exhaust storage vessel may come at least partially from a source external to the vehicle. Heat to warm the exhaust storage vessel may come at least partially from a source internal to the vehicle, such as an electric resistance heater or from the engine. In some of such embodiments, the engine may or may not be operating while heat is transferred from the engine to the exhaust storage vessel. Engine coolant may be circulated from the engine to the exhaust storage vessel to transfer heat to the exhaust storage vessel. The exhaust stream may be diverted from the exhaust storage vessel, vented to atmosphere, and heat from the diverted exhaust stream transferred to the exhaust storage vessel to warm the exhaust storage vessel.

Likewise, in some embodiments of the second method, removing stored carbon dioxide from the vehicle comprises reducing the pressure and/or increasing the temperature of the clathrate storage vessel sufficient to dissociate the carbon dioxide clathrates stored therein back into carbon dioxide and host material and venting gaseous carbon dioxide from the clathrate storage vessel.

The first method may further comprise reusing the dissociated host material from the exhaust storage vessel to form gas clathrates with additional at least one gas. Likewise, the second method may further comprise reusing the host material in the clathrate storage vessel to form gas clathrates with additional at least one gas.

In some embodiments of the first and the third methods, removing stored carbon dioxide from the vehicle comprises removing solid carbon dioxide clathrates from the exhaust storage vessel. Likewise, in some embodiments of the second method, removing stored carbon dioxide from the vehicle comprises removing solid carbon dioxide clathrates from the clathrate storage vessel.

The first method may further comprise storing gas clathrates for use as fuel. The stored gas clathrates may be separated into at least one gas and a host material. The host material may be reused to form carbon dioxide clathrates. The at least one gas may be used as fuel. In the second method, the host material may also be reused to form carbon dioxide clathrates.

The second method may further comprise tracking which clathrates comprise gas clathrates and which clathrates comprise carbon dioxide clathrates. In some embodiments of the second method, separating stored gas clathrates comprises dissociating primarily only gas clathrates without substantially dissociating stored carbon dioxide clathrates.

The first and second methods may further comprise exchanging heat from the exhaust stream to stored gas clathrates in order to separate stored gas clathrates into the at least one gas and the host material and to also cool the exhaust stream. Pressurizing the exhaust stream may occur before or after exchanging heat with the stored gas clathrates. When the pressurizing occurs after, the first and second methods may further comprise exchanging heat a second time from the exhaust stream to the stored gas clathrates after the exhaust stream has been pressurized, in order to further cool the exhaust stream.

The methods may further comprise exchanging heat from the exhaust stream to a heat sink external to the vehicle, such as atmospheric air.

In some embodiments of the third method, the fuel comprises gasoline, diesel, compressed natural gas, and/or liquefied natural gas.

The gas clathrates may comprise natural gas clathrates, methane clathrates, ethane clathrates, propane clathrates, and hydrogen clathrates. Accordingly, the at least one gas may comprise natural gas, methane, ethane, propane, or hydrogen.

The host material may comprise water. The host material may further comprise clathrate stabilizers. Examples of clathrate stabilizers include but are not limited to carboxylic acids and/or carboxylate-containing compounds, such as lactic acid, acetic acid, the lactate ion, or the acetate ion; sodium hydroxide and/or a sodium ion; calcium hydroxide and/or a calcium ion; tetrahydrofuran; a surfactant, such as an anionic surfactant, such as alkyl sulfates or alkyl aryl sulfonates; an aphron; water soluble salts; clay; oxide particles, such as magnesium oxide particles; organic compounds, such as phenyl, phenol, alkoxyphenyl, or imidazole-containing compounds.

This disclosure also provides vehicles with reduced emissions. FIG. 1 illustrates a vehicle 100 comprising a fuel storage vessel 10 configured to store gas clathrates. Vehicle 100 also comprises a separation system 20 operably connected to the fuel storage vessel and configured to dissociate the gas clathrates into a host material and at least one gas. Vehicle 100 further comprises an engine 30 operably connected to the separation system 20 and configured to utilize the at least one gas as fuel. Vehicle 100 additionally comprises a clathrate formation system 40 operably connected to the engine 30 and configured to combine carbon dioxide from an exhaust stream from the engine 30 with host material to form carbon dioxide clathrates. Vehicle 100 further comprises an exhaust storage vessel 50 operably connected to the clathrate formation system 40 and configured to store carbon dioxide clathrates.

Fuel storage vessel 10 may be configured to receive the at least one gas and the host material and form the gas clathrates within the fuel storage vessel 10. The fuel storage vessel 10 may be configured to agitate the at least one gas and the host material at a first temperature and a first pressure compatible with forming the gas clathrates from the at least one gas and the host material. For example, the fuel storage vessel 10 may comprise a mixing element located within the fuel storage vessel 10 that is configured to agitate the at least one gas and the host material.

The fuel storage vessel 10 and the exhaust storage vessel 50 may each independently comprise high-surface-area materials configured for forming clathrates (i.e., gas clathrates in fuel storage vessel 10 and carbon dioxide clathrates in exhaust storage vessel 50) on the surface of the materials. By way of non-limiting example, the high-surface-area material may comprise a graphene-based material, an activated carbon, and/or a metal organic framework, such as a bidentate carboxylic comprising ligand, a tridentate carboxylic comprising ligand, an azole comprising ligand, or a squaric acid comprising ligand.

In some embodiments, the fuel storage vessel 10 is configured to be detachable and reattachable from the remainder of the vehicle 100. In such embodiments, the fuel storage vessel 10 may be configured to be exchanged with a different fuel storage vessel 10 that has been pre-filled with gas clathrates.

The fuel storage vessel 10 may be configured to receive gas clathrates as a solid and/or as a slurry. The fuel storage vessel 10 may be configured to maintain gas clathrates as a slurry during storage or as a solid during storage. The solid gas clathrates may be one cohesive solid or may be solid pellets and/or chunks.

The fuel storage vessel 10 and the exhaust storage vessel 50 may each independently comprise a refrigeration system configured to maintain an internal temperature of about 0 degrees Centigrade to about 25 degrees Centigrade. The fuel storage vessel 10 and/or the exhaust storage vessel 50 may be configured to maintain an internal temperature of about 0 degrees Centigrade to about 20 degrees Centigrade. The fuel storage vessel 10 and/or the exhaust storage vessel 50 may be configured to maintain an internal temperature of about 0 degrees Centigrade to about 15 degrees Centigrade. The fuel storage vessel 10 and/or the exhaust storage vessel 50 may be configured to maintain an internal temperature of about 0 degrees Centigrade to about 10 degrees Centigrade, including from about 4 degrees Centigrade to about 10 degrees Centigrade.

The refrigeration system for each vessel may independently comprise a heat pipe. The refrigeration system may also comprise a vapor compression system. The vapor compression system may utilize a chlorofluorocarbon, a chlorofluoroolefin, a hydrochlorofluorocarbon, a hydrochloro-fluoroolefin, a hydrofluoroolefin, a hydrochloroolefin, a hydroolefin, a hydrocarbon, a perfluoroolefin, a perfluorocarbon, a perchloroolefin, a perchlorocarbon, and/or a halon. The refrigeration system may comprise a vapor absorption system. The vapor absorption system may utilize water, ammonia, and/or lithium bromide. The refrigeration system may comprise a gas cycle refrigeration system, such as one that utilizes air. The refrigeration system may comprise a stirling cycle refrigeration system. The stirling cycle refrigeration system may utilize helium. The stirling cycle refrigeration system may comprise a free piston stirling cooler. The refrigeration system may comprise a thermoelectric refrigeration system.

The fuel storage vessel 10 and the exhaust storage vessel 50 may each independently comprise insulation. The insulation may comprise at least one material configured to and compatible with maintaining desired temperatures within each vessel. Examples of such materials include, but are not limited to, calcium silicate, cellular glass, elastomeric foam, fiberglass, polyisocyanurate, polystyrene, and polyurethane. The insulation may comprise at least one vacuum layer and/or multi-layer insulation. The insulation may releasably surround at least a portion of an outer surface of the vessel and/or the insulation may be attached to at least a portion of a surface of the vessel, including an outer and/or inner surface.

The fuel storage vessel 10 and the exhaust storage vessel 50 may each be comprised of structural materials configured to and compatible with maintaining desired temperatures and pressures within each respective vessel. The structural material may comprise aluminum, brass, copper, ferretic steel, carbon steel, stainless steel, polytetrafluoroethylene (PTFE), polychlorotrifluoroethylene (PCTFE), vinylidene polyfluoride (PVDF), polyamide (PA), polypropylene (PP), nitrile rubber (NBR), chloroprene (CR), chlorofluorocarbons (FKM), and/or composite materials, including composite materials comprising carbon fibers, glass fibers, and/or aramid fibers.

The fuel storage vessel 10 and the exhaust storage vessel 50 may each independently be designed to maintain an internal pressure of about 1 bar to about 30 bar, an internal pressure of about 10 bar to about 30 bar, an internal pressure of about 10 bar to about 15 bar, an internal pressure of about 15 bar to about 27 bar, or an internal pressure of about 20 bar to about 27 bar. Each of the vessels may be designed to leak or vent before burst. Each of the vessels may independently further comprise a pressure relief device operably connected to the vessel and configured to reduce pressure within the vessel. Examples of a pressure relief device include, but are not limited to, a pressure relief valve and a rupture disc.

Vehicle 100 may further comprise a pressurizing device operably connected to the fuel storage vessel 10 and configured to maintain pressure within the fuel storage vessel 10. Examples of a pressurizing device include a moveable press integrated with the vessel, wherein the moveable press is configured to maintain pressure within the vessel. For example, the moveable press may include, but is not limited to, a hydraulic press or an electromagnetically activated press. In other examples, the pressurizing device may comprise a compressor. Examples of a compressor include, but are not limited to, a centrifugal compressor, a mixed-flow compressor, an axial-flow compressor, a reciprocating compressor, a rotary screw compressor, a rotary vane compressor, a scroll compressor, and a diaphragm compressor.

Vehicle 100 may further comprise a pressurizing device operably connected to the exhaust storage vessel 50 and configured to maintain pressure within the exhaust storage vessel 50. Examples of a pressurizing device include a moveable press integrated with the vessel, wherein the moveable press is configured to maintain pressure within the vessel. For example, the moveable press may include, but is not limited to, a hydraulic press or an electromagnetically activated press. In other examples, the pressurizing device may comprise a compressor. Examples of a compressor include, but are not limited to, a centrifugal compressor, a mixed-flow compressor, an axial-flow compressor, a reciprocating compressor, a rotary screw compressor, a rotary vane compressor, a scroll compressor, and a diaphragm compressor.

Vehicle 100 may further comprise a pressure monitoring device operably connected to the fuel storage vessel 10 and configured to monitor an internal pressure of the fuel storage vessel 10. Vehicle 100 may further comprise a pressure monitoring device operably connected to the exhaust storage vessel 50 and configured to monitor an internal pressure of the exhaust storage vessel 50. In either embodiment, the pressure monitoring device may independently comprise a piezoresistive strain gauge, a capacitive sensor, an electromagnetic sensor, a piezoelectric sensor, an optical sensor, a potentiometric sensor, a thermal conductivity sensor, and/or an ionization sensor.

Vehicle 100 may further comprise a heating system configured and located to impart heat energy to the fuel storage vessel 10. The heating system may be located internal or external to the vessel. For example, the heating system may be integrated into or attached to a portion of a surface of the fuel storage vessel 10, including external or internal surfaces. The heating system may be configured to transfer heat energy from the coolant used to cool the engine 30. Likewise, the heating system may be configured to transfer heat energy from heat generated by the engine 30 in any fashion, such as from an exhaust stream generated by the engine 30. Alternatively or in addition thereto, the heating system may utilize solar energy, ambient temperatures, electric resistance heating elements, microwave heating, electromagnetic heating, and/or dielectric heating to impart heat energy.

Vehicle 100 may further comprise a temperature monitoring system configured to monitor the internal temperature of the fuel storage vessel 10 and/or the exhaust storage vessel 50. The temperature monitoring system may comprise a thermostat, a thermistor, a thermocouple, and/or a resistive temperature detector.

Vehicle 100 may further comprise an emergency cooling system configured to rapidly cool the fuel storage vessel 10.

Vehicle 100 may further comprise a control system configured to monitor both pressure and temperature of the fuel storage vessel and to regulate at least one of pressure and temperature in order to maintain the gas clathrate within a clathrate stability range.

The separation system 20 may comprise a separation vessel operably connected to the fuel storage vessel 10. In such embodiments, the separation system 20 may further comprise a valve operably connected between the separation vessel and the fuel storage vessel 10. The valve may comprise a passive valve, such as, for example, a ball check valve, a diaphragm check valve, a swing check valve, a stop check valve, or a lift check valve. The valve may comprise an active valve, such as, for example, a globe valve, a butterfly valve, a gate valve, or a ball valve.

Vehicle 100 may further comprise a transport device operably connected to the fuel storage vessel 10 and operably connected to the separation vessel and configured to transfer gas clathrates from the fuel storage vessel 10 to the separation vessel. The transport device may be configured to transport the gas clathrates as a slurry and/or as a solid, such as solid chunks or pellets.

The transport device may be at least partially located internally within the fuel storage vessel 10. Likewise, the transport device may be at least partially external to the fuel storage vessel 10. Accordingly, the transport device may be at least partially integrated into a portion of a surface, including an internal or external surface, of the fuel storage vessel 10. Additionally, the transport device may be at least partially integrated into a portion of a surface, including an internal or external surface, of the separation vessel. Likewise, the transport device may be at least partially internal and/or external to the separation vessel.

The transport device may be configured for moving solid gas clathrate. The transport device may be configured for moving gas clathrate slurry. The transport device may be configured to be hydraulically, mechanically, and/or electrically actuated.

The transport device may comprise an extruder and/or a pump. When the transport device comprises a pump, the inlet of the pump may be operably connected to the fuel storage vessel 10 and an outlet of the pump may be operably connected to the separation system 20. Examples of the pump include, but are not limited to, a positive displacement pump, a lobe pump, an external gear pump, an internal gear pump, a peristaltic pump, a screw pump, a progressive cavity pump, a flexible impeller pump, a rotary vane pump, and a centrifugal pump. The pump may be any pump compatible with pumping a gas clathrate slurry.

The separation system 20 may be configured to control the rate of dissociation of the gas clathrates by regulating at least one of the temperature and the pressure of the gas clathrates within the separation vessel. The separation vessel may be configured to operate at ambient temperature. The separation vessel may be configured to operate at a temperature that is about the same as an operating temperature of the fuel storage vessel 10. The separation vessel may be configured to operate at a temperature that is higher than an operating temperature of the fuel storage vessel 10.

The separation system 20 may comprise insulation configured to maintain an internal temperature of the separation vessel. The insulation may comprise at least one material configured to and compatible with maintaining refrigerated temperatures within the separation vessel. Examples of such materials include, but are not limited to, calcium silicate, cellular glass, elastomeric foam, fiberglass, polyisocyanurate, polystyrene, and polyurethane. The insulation may comprise at least one vacuum layer and/or multi-layer insulation. The insulation may be attached to at least a portion of a surface of the vessel, including an outer and/or inner surface.

Vehicle 100 may further comprise a refrigeration system configured to maintain an internal temperature of the separation vessel within a set range. The set range may be from about 0 degrees Centigrade to about 25 degrees Centigrade, including from about 0 degrees Centigrade to about 20 degrees Centigrade, including from about 0 degrees Centigrade to about 15 degrees Centigrade, including from about 0 degrees Centigrade to about 10 degrees Centigrade, and including from about 4 degrees Centigrade to about 10 degrees Centigrade.

The refrigeration system may comprise a heat pipe configured and located to control the temperature of the separation vessel. The refrigeration system may also comprise a vapor compression system. The vapor compression system may utilize a chlorofluorocarbon, a chlorofluoroolefin, a hydrochlorofluorocarbon, a hydrochloro-fluoroolefin, a hydrofluoroolefin, a hydrochloroolefin, a hydroolefin, a hydrocarbon, a perfluoroolefin, a perfluorocarbon, a perchloroolefin, a perchlorocarbon, and/or a halon. The refrigeration system may comprise a vapor absorption system. The vapor absorption system may utilize water, ammonia, and/or lithium bromide. The refrigeration system may comprise a gas cycle refrigeration system, such as one that utilizes air. The refrigeration system may comprise a stirling cycle refrigeration system. The stirling cycle refrigeration system may utilize helium. The stirling cycle refrigeration system may comprise a free piston stirling cooler. The refrigeration system may comprise a thermoelectric refrigeration system.

The separation system 20 may comprise a heating system configured and located to impart heat energy to the separation vessel. The heating system may be located internal or external to the vessel. For example, the heating system may be integrated into or attached to a portion of a surface of the separation vessel, including external or internal surfaces. The heating system may be independently configured to transfer heat energy from the coolant used to cool the engine 30. Likewise, the heating system may be configured to transfer heat energy from heat generated by the engine 30 in any fashion, such as from an exhaust stream generated by the engine 30. In some embodiments, the separation system 20 and the clathrate formation system 40 may be thermally linked (e.g., by a heat exchanger, a heat pump, or a heat pipe). This thermal link may be configured to transfer heat released during formation of carbon dioxide clathrates (thereby helping to cool the clathrate formation system 40) to the separation system 20 to supply heat to aid in dissociating gas clathrates. Alternatively or in addition thereto, the heating system may utilize solar energy, ambient temperatures, electric resistance heating elements, microwave heating, electromagnetic heating, and/or dielectric heating to impart heat energy.

The separation system 20 may be configured to maintain a lower pressure in the separation vessel than a pressure maintained in the fuel storage vessel 10. The separation system 20 may be configured to maintain a pressure in the separation vessel sufficient to dissociate at least some of the gas clathrates into the at least one gas and the host material and also maintain a pressure greater than the pressure required for delivering fuel to the engine 30.

The separation system 20 may be configured to maintain an internal pressure in the separation vessel of about ambient pressure to about 30 bar. Separation system 20 may be configured to maintain an internal pressure in the separation vessel of about 5 bar to about 20 bar. Separation system 20 may be configured to maintain an internal pressure in the separation vessel of about 10 bar to about 15 bar. Separation system 20 may be configured to maintain an internal pressure in the separation vessel of about ambient pressure to about 10 bar. Separation system 20 may be configured to maintain an internal pressure in the separation vessel of about ambient pressure. The separation vessel may be designed to leak or vent before burst.

The separation system 20 may further comprise a pressure reducing valve operably connected to the fuel storage vessel 10 and the separation vessel, wherein the pressure reducing valve is configured to reduce the pressure of gas clathrates transferred from the fuel storage vessel 10 to the separation vessel.

Separation system 20 may be configured to receive a continuous supply of gas clathrates while vehicle 100 is operating. Alternatively, separation system 20 may be configured to periodically receive a batch of gas clathrates while vehicle 100 is operating. Furthermore, separation system 20 may be configured to receive a variable supply of gas clathrates based on fuel requirements of the engine 30. Likewise, the separation system 20 may be configured to control the rate of dissociation of the gas clathrates based on fuel requirements of the 30, such as by regulating at least one of the temperature and the pressure of the gas clathrates within the separation vessel.

The separation vessel may comprise a chamber configured to dissociate the gas clathrates into at least one gas and host material. Alternatively or in addition thereto, the separation vessel may comprise a conduit configured to continuously dissociate the gas clathrates into at least one gas and host material.

The separation vessel comprises a host material outlet configured for removing the host material from the separation vessel.

The separation system 20 may further comprise a temperature monitoring system configured to monitor the internal temperature of the separation vessel. The temperature monitoring system may comprise a thermostat, a thermistor, a thermocouple, and/or a resistive temperature detector.

Vehicle 100 may further comprise an emergency cooling system configured to rapidly cool the separation vessel.

The separation system 20 may further comprise a pressure monitoring device operably connected to the separation vessel and configured to monitor an internal pressure of the separation vessel. The pressure monitoring device may independently comprise a piezoresistive strain gauge, a capacitive sensor, an electromagnetic sensor, a piezoelectric sensor, an optical sensor, a potentiometric sensor, a thermal conductivity sensor, and/or an ionization sensor.

The separation system 20 may further comprise a pressure relief device operably connected to the separation vessel and configured to reduce pressure within the separation vessel. Examples of a pressure relief device include, but are not limited to, a pressure relief valve and a rupture disc.

The separation system 20 may further comprise a pressurizing device operably connected to the separation vessel and configured to maintain pressure within the separation vessel. Examples of a pressurizing device include a moveable press integrated with the vessel, wherein the moveable press is configured to maintain pressure within the vessel. For example, the moveable press may include, but is not limited to, a hydraulic press or an electromagnetically activated press. In other examples, the pressurizing device may comprise a compressor. Examples of a compressor include, but are not limited to, a centrifugal compressor, a mixed-flow compressor, an axial-flow compressor, a reciprocating compressor, a rotary screw compressor, a rotary vane compressor, a scroll compressor, and a diaphragm compressor.

The separation vessel may comprise a gas outlet configured for removing dissociated at least one gas from the separation vessel. The separation system 20 may further comprise a control valve operably connected to the gas outlet and to the engine 30, wherein the control valve is configured to control release of stored at least one gas from the separation vessel. The separation system 20 may further comprise a metering system configured to control introduction of stored at least one gas to the engine 30. The metering system may comprise a gas flow meter configured to measure the flow rate of the stored at least one gas released from the separation vessel. The separation system 20 may further comprise a transport device configured to transport the dissociated at least one gas from the separation vessel to the engine 30, wherein the transport device is operably connected to the separation vessel and to the engine 30. The transport device may be configured to control the transport of the dissociated at least one gas based on fuel requirements of the engine 30. The transport device may comprise a compressor. Examples of a compressor include, but are not limited to, a centrifugal compressor, a mixed-flow compressor, an axial-flow compressor, a reciprocating compressor, a rotary screw compressor, a rotary vane compressor, a scroll compressor, and a diaphragm compressor.

Vehicle 100 may further comprise a gas storage vessel configured to store the dissociated at least one gas removed from the separation system 20, wherein the gas storage vessel is operably connected to the separation system 20 and is operably connected to the engine 30. In such embodiments, the vehicle 100 may further comprise a control valve operably connected to the gas storage vessel and to the engine 30, wherein the control valve is configured to control release of stored at least one gas from the gas storage vessel. Vehicle 100 may further comprise a metering system configured to control introduction of stored at least one gas to the engine 30. The metering system may comprise a gas flow meter configured to measure the flow rate of the stored at least one gas released from the gas storage vessel. Vehicle 100 may further comprise a transport device configured to transport the dissociated at least one gas from the gas storage vessel to the engine 30, wherein the transport device is operably connected to the gas storage vessel and to the engine 30. The transport device may be configured to control the transport of the dissociated at least one gas based on fuel requirements of the engine 30. The transport device may comprise a compressor. Examples of a compressor include, but are not limited to, a centrifugal compressor, a mixed-flow compressor, an axial-flow compressor, a reciprocating compressor, a rotary screw compressor, a rotary vane compressor, a scroll compressor, and a diaphragm compressor.

Vehicle 100 may further comprise a control valve operably connected to the separation system 20 and to the gas storage vessel, wherein the control valve is configured to control release of stored at least one gas from the separation vessel. Vehicle 100 may further comprise a metering system configured to control introduction of stored at least one gas from the separation system to the gas storage vessel. The metering system may comprise a gas flow meter configured to measure the flow rate of the stored at least one gas released from the separation vessel. Vehicle 100 may further comprise a transport device configured to transport the dissociated at least one gas from the separation vessel to the gas storage vessel, wherein the transport device is operably connected to the separation vessel and to the gas storage vessel. The transport device may be configured to control the transport of the dissociated at least one gas based on fuel requirements of the engine 30. The transport device may comprise a compressor. Examples of a compressor include, but are not limited to, a centrifugal compressor, a mixed-flow compressor, an axial-flow compressor, a reciprocating compressor, a rotary screw compressor, a rotary vane compressor, a scroll compressor, and a diaphragm compressor.

In some embodiments, the separation system 20 is integrated with the fuel storage vessel 10 and the separation system 20 is configured to control the rate of dissociation of the gas clathrates by regulating at least one of the temperature and the pressure of the gas clathrates within the fuel storage vessel 10. For example, the temperature and the pressure may be varied to a second temperature and a second pressure during dissociation of the gas clathrates. The second temperature may be about 0 degrees Centigrade to about 25 degrees Centigrade, about 0 degrees Centigrade to about 20 degrees Centigrade, about 0 degrees Centigrade to about 15 degrees Centigrade, about 0 degrees Centigrade to about 10 degrees Centigrade, or about 4 degrees Centigrade to about 10 degrees Centigrade. The second pressure may be about ambient pressure to about 30 bar, about 5 bar to about 20 bar, about 10 bar to about 15 bar, or about ambient pressure to about 10 bar.

In such embodiments, the fuel storage vessel 10 may comprise a gas outlet configured and located for removing gas from the fuel storage vessel 10. The gas may comprise dissociated at least one gas located within the fuel storage vessel 10.

The separation system 20 may further comprise a heat pipe configured and located to modulate the temperature of the fuel storage vessel 10. The separation system 20 may further comprise a heating system configured and located to impart heat energy to the fuel storage vessel 10. The heating system may be configured to transfer heat energy from the coolant used to cool the engine 30. Likewise, the heating system may be configured to transfer heat energy from heat generated by the engine 30 in any fashion, such as from an exhaust stream generated by the engine 30. Alternatively or in addition thereto, the heating system may utilize solar energy, ambient temperatures, electric resistance heating elements, microwave heating, electromagnetic heating, and/or dielectric heating to impart heat energy. The heating system may be located internal or external to the fuel storage vessel 10. For example, the heating system may be integrated into or attached to a portion of a surface of the fuel storage vessel 10, including external or internal surfaces.

The separation system 20 may be configured to reduce the pressure in the fuel storage vessel 10 sufficient to dissociate at least some of the gas clathrates into the at least one gas and the host material, but still maintain a pressure greater than the pressure required for delivering dissociated gas to the engine 30.

The vehicle 100 may comprise a cooling device configured to reduce the temperature of the dissociated at least one gas prior to introduction of the dissociated at least one gas to the engine 30. The cooling device may comprise a heat exchanger. The heat exchanger may be configured to be cooled by ambient air. The heat exchanger may be configured to be cooled by a coolant also used to cool the engine 30. The heat exchanger may be configured to be cooled by the fuel storage vessel 10. The heat exchanger may be configured to be cooled by the separation system 20. The cooling device may comprise a refrigerated coil configured to cool the at least one gas.

The vehicle 100 may comprise a transport device configured to transport the dissociated at least one gas from the separation system 20 to the engine 30, wherein the transport device is operably connected to the separation system 20 and to the engine 30. The transport device may be configured to control the transport of the dissociated at least one gas based on fuel requirements of the engine 30. The transport device may comprise a compressor. Examples of a compressor include, but are not limited to, a centrifugal compressor, a mixed-flow compressor, an axial-flow compressor, a reciprocating compressor, a rotary screw compressor, a rotary vane compressor, a scroll compressor, and a diaphragm compressor. In such embodiments, the vehicle 100 may further comprise a cooling device, such as the cooling device disclosed above, configured to reduce the temperature of the dissociated at least one gas prior to introduction of the dissociated at least one gas to the engine 30.

The vehicle 100 may comprise a moisture-removal system configured to remove water from the dissociated at least one gas prior to introduction of the dissociated at least one gas to the engine 30. The moisture-removal system may comprise, by way of non-limiting example, a dehumidifier, a dryer, or a molecular sieve column. In some embodiments, the moisture-removal system is part of the separation system 20.

The vehicle 100 may comprise a host material storage vessel configured to supply host material to the clathrate formation system 40, wherein the host material storage vessel is operably connected to the clathrate formation system 40. The vehicle 100 may comprise a transport device configured to transport host material from the host material storage vessel to the clathrate formation system 40. The transport device may further be configured to transport host material from the separation system 20 to the host material storage vessel. The host material storage vessel may be configured to store previously unused host material.

The vehicle 100 may comprise a filter configured to separate non-carbon products from the exhaust stream.

The vehicle 100 may comprise a catalytic converter configured to convert carbon monoxide and uncombusted hydrocarbons to carbon dioxide.

The clathrate formation system 40 may be configured to utilize combustion produced water as at least a portion of the host material in the formation of carbon dioxide clathrates. In addition to carbon dioxide clathrates, the clathrate formation system 40 may be configured to also form carbon monoxide clathrates and partially combusted hydrocarbon clathrates. For example, the clathrate formation system 40 may be configured to control the pressure and temperature of the exhaust stream and the host material sufficient to form partially combusted hydrocarbon clathrates with partially combusted hydrocarbons and host material, to form carbon monoxide clathrates with carbon monoxide and host material, and/or to form carbon dioxide clathrates with carbon dioxide and host material. Likewise, the exhaust storage vessel 50 may also be configured to store carbon monoxide clathrates and partially combusted hydrocarbon clathrates in addition to carbon dioxide clathrates.

The clathrate formation system 40 may comprise a cooling system configured to cool the exhaust stream. The cooling system may be operably connected with the separation system 20 and may be configured to transfer heat from the exhaust stream to the separation system 20. The cooling system may comprise a heat exchanger configured to transfer heat from the exhaust stream to an external heat sink, such as ambient air.

The clathrate formation system 40 may comprise a pressurization system. The pressurization system may comprise a compressor. Examples of a compressor include, but are not limited to, a centrifugal compressor, a mixed-flow compressor, an axial-flow compressor, a reciprocating compressor, a rotary screw compressor, a rotary vane compressor, a scroll compressor, and a diaphragm compressor.

The clathrate formation system 40 may comprise a formation vessel operably connected to the exhaust storage vessel 50.

The clathrate formation system 40 may further comprise a carbon dioxide removal system configured to separate carbon dioxide from the exhaust stream and deliver the removed carbon dioxide to the formation vessel. The carbon dioxide removal system may comprise a removal vessel operably connected to the exhaust stream and the formation vessel.

The removal vessel may be configured to contact the exhaust stream with at least one separation fluid. The separation fluid may comprise a chemical solvent. The separation fluid may comprise a physical solvent. Examples of the separation fluid include fluids comprising an alkanolamine, a monoethanolamine, a diethanolamine, a methyldiethanolamine, a triethanolamine, and/or piperazine. The separation fluid may be a liquid. The separation fluid may comprise host material.

The vehicle 100 may further comprise a regeneration system configured to separate carbon dioxide from the separation fluid and operably coupled to the removal vessel. The regeneration system may comprise a regeneration vessel operably coupled to the removal vessel and configured to heat the separation fluid. The regeneration vessel may be configured to operate on a batch basis. The regeneration vessel may be configured to operate on a continuous basis. The regeneration vessel may comprise a tank. The regeneration vessel may comprise a conduit.

In some embodiments, the removal vessel is configured to contact the exhaust stream with an alkali carbonate, such as sodium carbonate and/or potassium carbonate. In such embodiments, the vehicle 100 may further comprise a regeneration system configured to separate carbon dioxide from the alkali carbonate and operably coupled to the removal vessel. The regeneration system may comprise a regeneration vessel operably coupled to the removal vessel and configured to heat the alkali carbonate. The regeneration vessel may be configured to operate on a batch basis or on a continuous basis. The regeneration vessel may comprise a tank and/or a conduit.

In some embodiments, the removal vessel comprises a membrane configured to separate carbon dioxide from the exhaust stream. The membrane may comprise a polymer, such as a cellulose acetate polymer, a polyimide polymer, a polyamide polymer, a polycarbonate polymer, a polysulfone polymer, and/or a polyetherimide polymer. The membrane may comprise flat sheets. The flat sheets may be spiral-wound. The membrane may comprise hollow fibers.

The removal vessel may be configured to operate on a batch basis. For example, the removal vessel may comprise a tank. The removal vessel may be configured to operate on a continuous basis. For example, the removal vessel may comprise a conduit.

The clathrate formation system 40 may be configured to control the rate of formation of the carbon dioxide clathrates by regulating at least one of the temperature and the pressure of exhaust gases within the formation vessel. The formation vessel may be configured to operate at a temperature and/or a pressure that is about the same as an operating temperature of the fuel storage vessel 10.

The formation vessel may further comprise insulation configured to maintain an internal temperature of the formation vessel. The insulation may comprise at least one material configured to and compatible with maintaining desired temperatures within the formation vessel. Examples of such materials include, but are not limited to, calcium silicate, cellular glass, elastomeric foam, fiberglass, polyisocyanurate, polystyrene, and polyurethane. The insulation may comprise at least one vacuum layer and/or multi-layer insulation. The insulation may releasably surround at least a portion of an outer surface of the vessel and/or the insulation may be attached to at least a portion of a surface of the vessel, including an outer and/or inner surface.

The vehicle 100 may further comprise a refrigeration system configured to maintain an internal temperature of the formation vessel within a set range. The refrigeration system may also be configured to cool the exhaust stream. The refrigeration system may be integrated with a refrigeration system of the fuel storage vessel 10, if present. The set range may be from about 0 degrees Centigrade to about 25 degrees Centigrade, including from about 0 degrees Centigrade to about 20 degrees Centigrade, including from about 0 degrees Centigrade to about 15 degrees Centigrade, including from about 0 degrees Centigrade to about 10 degrees Centigrade, and including from about 4 degrees Centigrade to about 10 degrees Centigrade.

The refrigeration system may comprise a heat pipe configured and located to control the temperature of the formation vessel. The heat pipe may be operably connected to the separation system. The refrigeration system may also comprise a vapor compression system. The vapor compression system may utilize a chlorofluorocarbon, a chlorofluoroolefin, a hydrochlorofluorocarbon, a hydrochloro-fluoroolefin, a hydrofluoroolefin, a hydrochloroolefin, a hydroolefin, a hydrocarbon, a perfluoroolefin, a perfluorocarbon, a perchloroolefin, a perchlorocarbon, and/or a halon. The refrigeration system may comprise a vapor absorption system. The vapor absorption system may utilize water, ammonia, and/or lithium bromide. The refrigeration system may comprise a gas cycle refrigeration system, such as one that utilizes air. The refrigeration system may comprise a stirling cycle refrigeration system. The stirling cycle refrigeration system may utilize helium. The stirling cycle refrigeration system may comprise a free piston stirling cooler. The refrigeration system may comprise a thermoelectric refrigeration system.

The clathrate formation system 40 may be configured to generate an internal pressure in the formation vessel of about ambient pressure to about 30 bar, an internal pressure of about 10 bar to about 30 bar, an internal pressure of about 10 bar to about 15 bar, an internal pressure of about 15 bar to about 27 bar, or an internal pressure of about 20 bar to about 27 bar. The formation vessel may be designed to leak or vent before burst. Each of the vessels may independently further comprise a pressure relief device operably connected to the vessel and configured to reduce pressure within the vessel. Examples of a pressure relief device include, but are not limited to, a pressure relief valve and a rupture disc.

The clathrate formation system 40 may be configured to pressurize the exhaust stream in the formation vessel without substantially increasing back pressure on the exhaust ports of the engine 30. In such embodiments, the clathrate formation system 40 may comprise a valve operably connected to the formation vessel, wherein the valve is configured to control introduction of the exhaust stream to the formation vessel. The clathrate formation system 40 may be configured to sequentially introduce batches of the exhaust stream to the formation vessel. For example, introduction of the exhaust stream batches to the formation vessel may be timed to coincide with the closing of exhaust ports of the engine 30.

The clathrate formation system 40 may further comprise at least one holding vessel for temporarily storing the exhaust stream at a low pressure prior to introduction of the exhaust stream to the formation vessel for pressurizing. The low pressure may be less than the pressure at which carbon dioxide clathrates are formed in the formation vessel. The low pressure may be substantially equal to what the pressure of the exhaust stream at an exhaust port of the engine 30 would be if the clathrate formation system 40 and the exhaust storage vessel 50 were not connected to the engine 30. The low pressure may be about equal to atmospheric pressure.

The clathrate formation system 40 may comprise a compressor, wherein an inlet of the compressor is operably connected to exhaust ports of the engine 30 and an outlet of the compressor is operably connected to the formation vessel. The compressor may be configured to reduce back pressure on exhaust ports of the engine 30 to be substantially equal to what the pressure at the exhaust ports would be if the clathrate formation system 40 and exhaust storage vessel 50 were not connected to the exhaust stream. The compressor may be configured to minimize back pressure on the exhaust ports of the engine 30 while pressurizing the formation vessel. Examples of a compressor include, but are not limited to, a centrifugal compressor, a mixed-flow compressor, an axial-flow compressor, a reciprocating compressor, a rotary screw compressor, a rotary vane compressor, a scroll compressor, and a diaphragm compressor.

The formation vessel may comprise a chamber configured to form batches of carbon dioxide clathrates and/or the formation vessel may comprise a conduit operably connected to the exhaust storage vessel 50 and configured to continuously form carbon dioxide clathrates.

The clathrate formation system 40 may comprise a moveable press integrated with the formation vessel and configured to pressurize the formation vessel. For example, the moveable press may include, but is not limited to, a hydraulic press or an electromagnetically activated press.

The clathrate formation system 40 may further comprise a temperature monitoring system configured to monitor the internal temperature of the formation vessel. The temperature monitoring system may comprise a thermostat, a thermistor, a thermocouple, and/or a resistive temperature detector.

The clathrate formation system 40 may further comprise a pressure monitoring device operably connected to the formation vessel and configured to monitor an internal pressure of the formation vessel. For example, the pressure monitoring device may comprise a piezoresistive strain gauge, a capacitive sensor, an electromagnetic sensor, a piezoelectric sensor, an optical sensor, a potentiometric sensor, a thermal conductivity sensor, and/or an ionization sensor.

The clathrate formation system 40 may further comprise a pressure relief device operably connected to the formation vessel and configured to reduce pressure within the formation vessel. Examples of a pressure relief device include, but are not limited to, a pressure relief valve and a rupture disc.

The vehicle 100 may further comprise a transport device operably connected to the formation vessel and the exhaust storage vessel 50 and configured to transfer carbon dioxide clathrates from the formation vessel to the exhaust storage vessel 50. The transport device may be configured to transport the carbon dioxide clathrates as a slurry and/or as a solid, such as solid chunks or pellets.

The transport device may be at least partially located internally within the formation vessel. Likewise, the transport device may be at least partially external to the formation vessel. Accordingly, the transport device may be at least partially integrated into a portion of a surface, including an internal or external surface, of the formation vessel. Additionally, the transport device may be at least partially integrated into a portion of a surface, including an internal or external surface, of the exhaust storage vessel 50. Likewise, the transport device may be at least partially internal and/or external to the exhaust storage vessel 50.

The transport device may be configured for moving solid carbon dioxide clathrate. The transport device may be configured for moving solid carbon dioxide slurry. The transport device may be configured to be hydraulically, mechanically, and/or electrically actuated.

The transport device may comprise an extruder and/or a pump. When the transport device comprises a pump, the inlet of the pump may be operably connected to the formation vessel and an outlet of the pump may be operably connected to the exhaust storage vessel 50. Examples of the pump include, but are not limited to, a positive displacement pump, a lobe pump, an external gear pump, an internal gear pump, a peristaltic pump, a screw pump, a progressive cavity pump, a flexible impeller pump, a rotary vane pump, and a centrifugal pump. The pump may be any pump compatible with pumping a carbon dioxide clathrate slurry.

The clathrate formation system 40 may be integrated with the exhaust storage vessel 50. The clathrate formation system 40 may be configured to form carbon dioxide clathrates by regulating at least one of the temperature and the pressure of carbon dioxide and host material within the exhaust storage vessel 50 to be compatible with forming carbon dioxide clathrates. For example, the temperature may be regulated to be about 0 degrees Centigrade to about 25 degrees Centigrade, may be regulated to be about 0 degrees Centigrade to about 20 degrees Centigrade, may be regulated to be about 0 degrees Centigrade to about 15 degrees Centigrade, may be regulated to be about 0 degrees Centigrade to about 10 degrees Centigrade, or may be regulated to be about 4 degrees Centigrade to about 10 degrees Centigrade. In another example, the pressure may be regulated to be about 1 bar to about 30 bar, the pressure may be regulated to be about 10 bar to about 30 bar, the pressure may be regulated to be about 10 bar to about 15 bar, the pressure may be regulated to be about 15 bar to about 27 bar, or the pressure may be regulated to be about 20 bar to about 27 bar.

Likewise, the exhaust storage vessel 50 may be configured to agitate the carbon dioxide and the host material at a temperature and a pressure compatible with forming the carbon dioxide clathrates. For example, the exhaust storage vessel 50 may comprise a mixing element located within the exhaust storage vessel 50 and configured to agitate the carbon dioxide and the host material.

The clathrate formation system 40 may further comprise a heat pipe configured and located to modulate the temperature of the exhaust storage vessel 50.

The clathrate formation system 40 may be configured to receive a continuous supply of carbon dioxide or may be configured to periodically receive a batch of carbon dioxide, while the vehicle 100 is operating. The clathrate formation system 40 may be configured to receive a variable supply of the exhaust stream based on the quantity of exhaust produced by the engine 30.

The exhaust storage vessel 50 may be configured to receive the carbon dioxide clathrates as a solid and/or as a slurry.

The exhaust storage vessel 50 may be configured for removal of stored carbon dioxide from the vehicle 100 when the vehicle 100 is otherwise not in use. The exhaust storage vessel 50 may be configured to reduce the pressure and/or increase the temperature of the exhaust storage vessel 50 sufficient to dissociate the stored carbon dioxide clathrates into carbon dioxide and host material. For example, the exhaust storage vessel 50 may be configured to sufficiently warm stored carbon dioxide clathrates so as to liquefy the host material and gasify the carbon dioxide. The exhaust storage vessel 50 may comprise an outlet configured for removal of dissociated carbon dioxide. The exhaust storage vessel 50 may also comprise an outlet configured for removal of dissociated host material.

Vehicle 100 may further comprise a heating system configured and located to impart heat energy to the exhaust storage vessel 50. The heating system may be located internal or external to the vessel. For example, the heating system may be integrated into or attached to a portion of a surface of the exhaust storage vessel 50, including external or internal surfaces. The heating system may be independently configured to transfer heat energy from the coolant used to cool the engine 30. Likewise, the heating system may be configured to transfer heat energy from heat generated by the engine 30 in any fashion, such as from an exhaust stream generated by the engine 30. For example, the heating system may be configured to divert the exhaust stream from the clathrate formation system 40 and also configured to transfer heat from the diverted exhaust stream to the exhaust storage vessel 50. In that example, the heating system may be further configured to divert the exhaust stream from the exhaust storage vessel 50 and vent the exhaust stream to atmosphere. Alternatively or in addition thereto, the heating system may utilize solar energy, ambient temperatures, electric resistance heating elements, microwave heating, electromagnetic heating, and/or dielectric heating to impart heat energy.

The vehicle 100 may further comprise a recycle system configured to transfer dissociated host material from the exhaust storage vessel 50 to the fuel storage vessel 10. The recycle system may comprise a filter configured to clean dissociated host material prior to transfer of the dissociated host material to the fuel storage vessel 10. The recycle system may comprise a transfer device configured to transfer the dissociated host material to the fuel storage vessel 10.

The exhaust storage vessel 50 may be configured for removal of solid and/or slurry carbon dioxide clathrates from the exhaust storage vessel 50.

The exhaust storage vessel 50 may be configured to maintain carbon dioxide clathrates as a solid and/or slurry until removal of carbon dioxide from the vehicle 100 is intended.

The exhaust storage vessel 50 may be configured to be detachable and reattachable from the remainder of the vehicle 100. For example, the exhaust storage vessel 50 may be configured to be exchanged with a different exhaust storage vessel 50 that has been emptied of carbon dioxide clathrates.

The vehicle 100 may further comprise a sensor configured to monitor the amount of carbon dioxide clathrates in the exhaust storage vessel 50. The sensor may be configured to measure a mass of the carbon dioxide clathrates. The sensor may be configured to measure a vapor pressure of carbon dioxide gas present in the exhaust storage vessel 50. The sensor may be configured to determine a concentration of carbon dioxide present in the exhaust storage vessel 50. The sensor may be configured to monitor the amount of carbon dioxide removed from the exhaust storage vessel 50.

The vehicle 100 may alternatively comprise a dissociation vessel operably connected to the exhaust storage vessel 50 and configured to receive carbon dioxide clathrates from the exhaust storage vessel 50. The dissociation vessel may be configured for removal of stored carbon dioxide from the vehicle 100 when the vehicle 100 is otherwise not in use. The dissociation vessel may be configured to reduce the pressure and/or increase the temperature of the dissociation vessel sufficient to dissociate the stored carbon dioxide clathrates into carbon dioxide and host material.

The vehicle 100 may further comprise a temperature monitoring system configured to monitor the internal temperature of the exhaust storage vessel 50. The temperature monitoring system may comprise a thermostat, a thermistor, a thermocouple, and/or a resistive temperature detector.

The vehicle 100 may further comprise a control system configured to monitor both pressure and temperature of the exhaust storage vessel 50 and configured to regulate at least one of pressure and temperature in order to maintain the carbon dioxide clathrate within a clathrate stability range.

The vehicle 100 may further comprise a recycle system configured to transfer dissociated host material from the separation system 20 to the clathrate formation system 40. The recycle system may further comprise a host material storage vessel configured to store dissociated host material from the separation system 20. The recycle system may comprise a transfer device configured to transfer the dissociated host material to the clathrate formation system 40. The recycle system may comprise a filter configured to clean dissociated host material prior to transfer of the dissociated host material to the clathrate formation system 40; e.g., to remove a clathrate stabilizer more suitable for gas clathrates than for carbon dioxide clathrates. The recycle system may comprise a supply reservoir configured to add a component to the host material prior to transfer of the dissociated host material to the clathrate formation system 40; e.g., to add a clathrate stabilizer more suitable for carbon dioxide clathrates than for gas clathrates.

Figure 2:
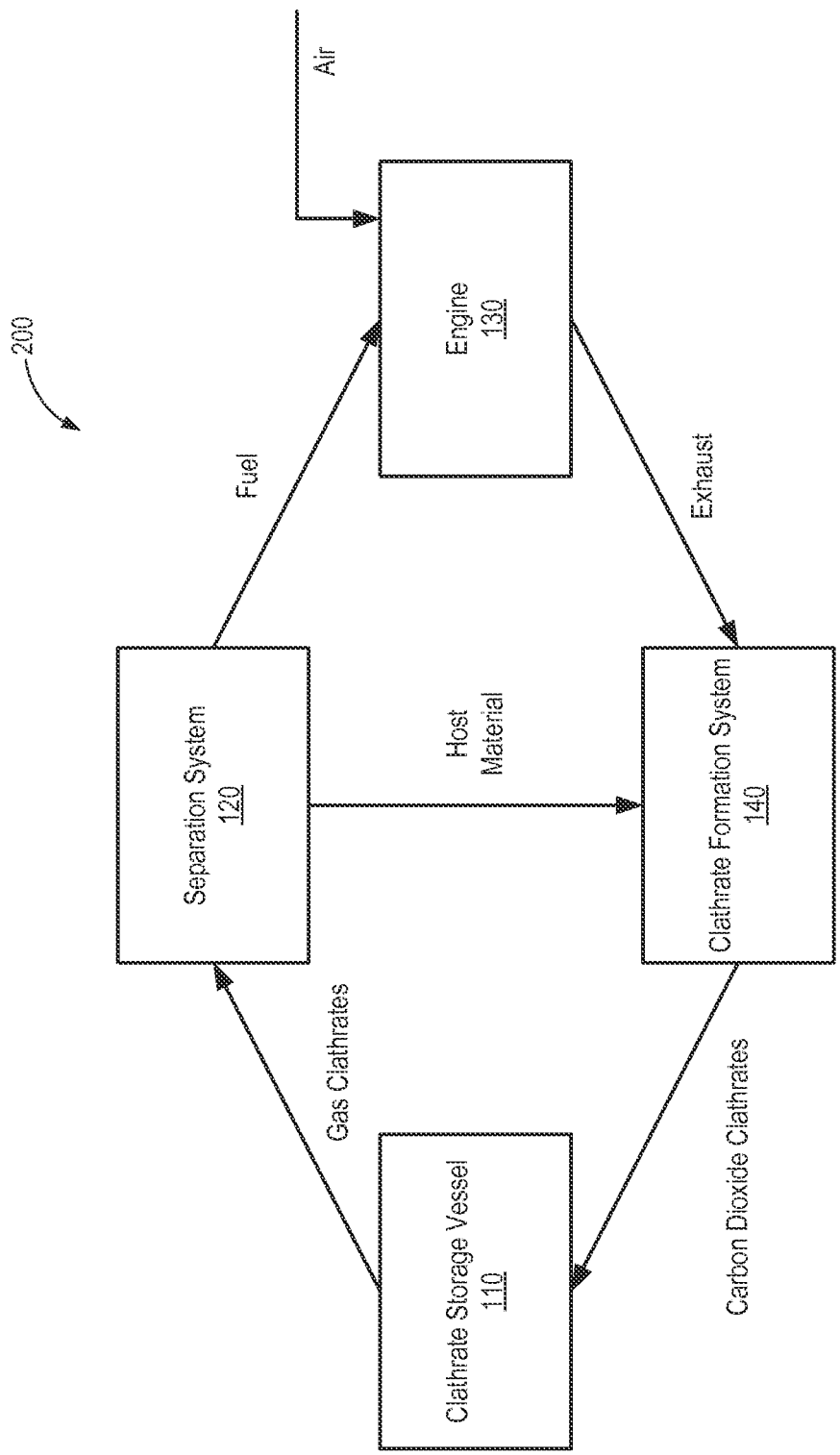
FIG. 2 illustrates another embodiment of a vehicle configured to sequester carbon dioxide emissions.

FIG. 2 illustrates an additional embodiment of a vehicle with reduced emissions. FIG. 2 illustrates a vehicle 200 comprising a clathrate storage vessel 110 configured to store gas clathrates and carbon dioxide clathrates. The gas clathrates and the carbon dioxiode clathrates may be stored within a common compartment or within separate compartments within the clathrate storage vessel 110. For example, separate compartments may have fixed, predefined volumes and locations, or may be variably partitioned, e.g., by a flexible bladder or by a slidable partition. The functions of the fuel storage vessel 10 and the exhaust storage vessel 50 of the vehicle 100 may be performed by the clathrate storage vessel 110 of the vehicle 200. Accordingly, the disclosure regarding the fuel storage vessel 10 and the disclosure regarding the exhaust storage vessel 50 may be applicable to the clathrate storage vessel 110 and vice versa. Likewise, the disclosure regarding the separation system 20 and the clathrate formation system 40 may apply to the separation system 120 and the clathrate formation system 140 of the vehicle 200 and vice versa.

The separation system 120 may be configured to dissociate the gas clathrates into a host material and at least one gas. The vehicle 200 may further comprise an engine 130 configured to utilize the at least one gas as fuel. The clathrate formation system 140 may be configured to combine carbon dioxide from an exhaust stream from the engine 130 with host material to form carbon dioxide clathrates.

The vehicle 200 may further comprise a control system configured to feed primarily stored gas clathrates to the separation system 120 without feeding stored carbon dioxide clathrates to the separation system 120.

The vehicle 200 may further comprise a tracking system configured to monitor which clathrates comprise gas clathrates and which clathrates comprise carbon dioxide clathrates. The tracking system may comprise an optical tracking system, a mechanical tracking system, a magnetic sensor, and/or a hall effect sensor.

The clathrate storage vessel 110 may be configured to receive the at least one gas and the host material and configured to form the gas clathrates within the clathrate storage vessel 110, similar as disclosed above for the fuel storage vessel 10. The clathrate storage vessel 110 may comprise high-surface-area materials configured for forming clathrates on the surface of the materials. The high-surface-area materials may be configured for forming gas clathrates and carbon dioxide clathrates, where formation depends upon the conditions within the clathrate storage vessel 110 and the gases present. The high-surface-area materials may be the same as disclosed above for the fuel storage vessel 10. The high-surface-area materials may comprise part of a moveable surface operably connected to the separation system 120, such as a conveyor belt, rotatable drum or disk, and/or moveable string.

The clathrate storage vessel 110 may be configured to be detachable and reattachable from the remainder of the vehicle 200. For example, the clathrate storage vessel 110 may be configured to be exchanged with a different clathrate storage vessel 110 that has had carbon dioxide clathrates removed and been pre-filled with gas clathrates.

The clathrate storage vessel 110 may be configured to receive the gas clathrates as a slurry or a solid. The clathrate storage vessel 110 may be configured to maintain the gas clathrates as a slurry or a solid, such as solid pellets or chunks.

The clathrate storage vessel 110 may comprise insulation. The disclosure regarding insulation options for the fuel storage vessel 10 also apply to the insulation options for the clathrate storage vessel 110. Likewise, the clathrate storage vessel 110 may comprise a refrigeration system configured to maintain an internal temperature of the clathrate storage vessel 110 within a set range. The disclosure regarding refrigeration system options and set range options for the fuel storage vessel 10 also applies to refrigeration system options and set range options for the clathrate storage vessel 110. Similarly, the structural material options disclosed for the fuel storage vessel 10 also apply to the structural material options for the clathrate storage vessel 110.

The vehicle 200 may further comprise a sensor configured to monitor the amount of gas clathrates and/or carbon dioxide clathrates in the clathrate storage vessel 110. The disclosure regarding sensor options for vehicle 100 also applies to the sensor options for vehicle 200.

The clathrate storage vessel 110 may be designed to maintain an internal pressure of about 1 bar to about 30 bar, including the narrower ranges disclosed for the fuel storage vessel 10. The disclosure regarding options for the fuel storage vessel 10 also apply to the options for the clathrate storage vessel 110. For example, the clathrate storage vessel 110 may be designed to leak or vent before burst. In other examples, the clathrate storage vessel 110 may be operably connected to a pressure monitoring device, a pressurizing device, and/or a pressure relief device. The disclosure regarding pressure monitoring device, pressurizing device, and/or pressure relief device options for the vehicle 100 also applies to pressure monitoring device, pressurizing device, and/or pressure relief device options for the vehicle 200.

The vehicle 200 may further comprise a heating system configured and located to impart heat energy to the clathrate storage vessel 110. The vehicle 200 may further comprise a temperature monitoring system configured to monitor the internal temperature of the clathrate storage vessel 110. The vehicle 200 may further comprise an emergency cooling system configured to rapidly cool the clathrate storage vessel 110. The vehicle 200 may further comprise a control system configured to monitor both pressure and temperature and to regulate at least one of the pressure and temperature in order to maintain clathrate within a clathrate stability range. The disclosure regarding a heating system, a temperature monitoring system, an emergency cooling system, and a control system for the vehicle 100 and the fuel storage vessel 10 also applies to the same for the vehicle 200 and the clathrate storage vessel 110.

In some embodiments of the vehicle 200, the separation system 120 comprises a separation vessel operably connected to the clathrate storage vessel 110. The separation system 120 may further comprise a valve operably connected between the separation vessel 120 and the clathrate storage vessel 110. The valve may comprise a passive valve, such as, for example, a ball check valve, a diaphragm check valve, a swing check valve, a stop check valve, or a lift check valve. The valve may comprise an active valve, such as, for example, a globe valve, a butterfly valve, a gate valve, or a ball valve.

The vehicle 200 may further comprise a transport device operably connected to the clathrate storage vessel 110 and operably connected to the separation vessel and configured to transfer gas clathrates from the clathrate storage vessel 110 to the separation vessel. The transport device may comprise a moveable surface, such as a conveyor belt, a rotating drum, a string, and/or a rotating disk. The moveable surface may comprise a high-surface-area material, such as the high-surface-area materials disclosed above for the fuel storage vessel 10. The disclosure regarding options for a transport device operably connected to the fuel storage vessel 10 and the separation vessel of vehicle 100 also applies to options for a transport device operably connected to the clathrate storage vessel 110 and the separation vessel of the vehicle 200.

The separation system 120 may be configured to control the rate of dissociation of the gas clathrates by regulating at least one of the temperature and the pressure of the gas clathrates within the separation vessel. The separation vessel may be configured to operate at ambient temperature. The separation vessel may be configured to operate at a temperature that is about the same as an operating temperature of the clathrate storage vessel 110. The separation vessel may be configured to operate at a temperature that is higher than an operating temperature of the clathrate storage vessel 110.

The separation system 120 may further comprise insulation configured to maintain an internal temperature of the separation vessel. The vehicle 200 may further comprise a refrigeration system configured to maintain an internal temperature of the separation vessel within a set range. The refrigeration system may be integrated with the refrigeration system of the clathrate storage vessel 110. The disclosure regarding options for insulation and a refrigeration system, including the set range, for the separation vessel of vehicle 100 also applies to options for insulation and a refrigeration system for the separation vessel of the vehicle 200.

The separation system 120 may further comprise a heat pipe configured and located to control the temperature of the separation vessel. The separation system 120 may further comprise a heating system configured and located to impart heat energy to the separation vessel. In some embodiments, the separation system 120 and the clathrate formation system 140 may be thermally linked (e.g., by a heat exchanger, a heat pump, or a heat pipe). This thermal link may be configured to transfer heat released during formation of carbon dioxide clathrates (thereby helping to cool the clathrate formation system 140) to the separation system 120 to supply heat to aid in dissociating gas clathrates. The disclosure regarding options for a heating system of the separation vessel of vehicle 100 also applies to options for a heating system of the separation vessel of the vehicle 200.

The separation system 120 may be configured to maintain a lower pressure in the separation vessel than a pressure maintained in the clathrate storage vessel 110. The separation system 120 may be configured to maintain a pressure in the separation vessel sufficient to dissociate at least some of the gas clathrates into the at least one gas and the host material and also maintain a pressure greater than the pressure required for delivering fuel to the engine 130.

The separation system 120 may be configured to maintain an internal pressure in the separation vessel of about ambient pressure to about 30 bar. Separation system 120 may be configured to maintain an internal pressure in the separation vessel of about 5 bar to about 20 bar. Separation system 120 may be configured to maintain an internal pressure in the separation vessel of about 10 bar to about 15 bar. Separation system 120 may be configured to maintain an internal pressure in the separation vessel of about ambient pressure to about 10 bar. Separation system 120 may be configured to maintain an internal pressure in the separation vessel of about ambient pressure. The separation vessel may be designed to leak or vent before burst.

The separation system 120 may further comprise a pressure reducing valve operably connected to the clathrate storage vessel 110 and the separation vessel, wherein the pressure reducing valve is configured to reduce the pressure of gas clathrates transferred from the clathrate storage vessel 110 to the separation vessel.

The separation vessel of the separation system 120 may comprise a chamber configured to dissociate the gas clathrates into the at least one gas and the host material. The separation vessel of the separation system 120 may comprise a conduit configured to continuously dissociate the gas clathrates into the at least one gas and the host material.

The separation vessel of the separation system 120 may comprise a host material outlet configured for removing the host material from the separation vessel.

The separation system 120 may further comprise a temperature monitoring system configured to monitor the internal temperature of the separation vessel. The separation system 120 may further comprise an emergency cooling system configured to rapidly cool the separation vessel. The separation system 120 may further comprise a pressure monitoring device operably connected to the separation vessel and configured to monitor an internal pressure of the separation vessel. The separation system 120 may further comprise a pressure relief device operably connected to the separation vessel and configured to reduce pressure within the separation vessel. The separation system 120 may further comprise a pressurizing device operably connected to the separation vessel and configured to maintain pressure within the separation vessel. The disclosure regarding options for a temperature monitoring system, an emergency cooling system, a pressure monitoring device, a pressure relief device, and a pressurizing device for the separation system 10 also apply to options for the same for the separation system 120.

The separation vessel of the separation system 120 may comprise a gas outlet configured for removing dissociated at least one gas from the separation vessel. The separation system 120 may further comprise a control valve operably connected to the gas outlet and to the engine 130, wherein the control valve is configured to control release of stored at least one gas from the separation vessel. The separation system 120 may further comprise a metering system configured to control introduction of stored at least one gas to the engine 130. The metering system may comprise a gas flow meter configured to measure the flow rate of the stored at least one gas released from the separation vessel. The separation system 120 may further comprise a transport device configured to transport the dissociated at least one gas from the separation vessel to the engine 130, wherein the transport device is operably connected to the separation vessel and to the engine 130. The transport device may be configured to control the transport of the dissociated at least one gas based on fuel requirements of the engine 130. The transport device may comprise a compressor, including, but not limited to, a compressor exemplified in the disclosure regarding the separation system 20.

The vehicle 200 may further comprise a gas storage vessel configured to store the dissociated at least one gas removed from the separation system 120, wherein the gas storage vessel is operably connected to the separation system 120 and is operably connected to the engine 130. In such embodiments, the vehicle 200 may further comprise a control valve operably connected to the gas storage vessel and to the engine 130, wherein the control valve is configured to control release of stored at least one gas from the gas storage vessel. The vehicle 200 may further comprise a metering system configured to control introduction of stored at least one gas to the engine 130. The metering system may comprise a gas flow meter configured to measure the flow rate of the stored at least one gas released from the gas storage vessel. The vehicle 200 may further comprise a transport device configured to transport the dissociated at least one gas from the gas storage vessel to the engine 130, wherein the transport device is operably connected to the gas storage vessel and to the engine 130. The transport device may be configured to control the transport of the dissociated at least one gas based on fuel requirements of the engine 130. The transport device may comprise a compressor, including, but not limited to, a compressor exemplified in the disclosure regarding the separation system 20.

The vehicle 200 may further comprise a control valve operably connected to the separation system 120 and to the gas storage vessel, wherein the control valve is configured to control release of stored at least one gas from the separation vessel. The vehicle 200 may further comprise a metering system configured to control introduction of stored at least one gas from the separation system to the gas storage vessel. The metering system may comprise a gas flow meter configured to measure the flow rate of the stored at least one gas released from the separation vessel. The vehicle 200 may further comprise a transport device configured to transport the dissociated at least one gas from the separation vessel to the gas storage vessel, wherein the transport device is operably connected to the separation vessel and to the gas storage vessel. The transport device may be configured to control the transport of the dissociated at least one gas based on fuel requirements of the engine 130. The transport device may comprise a compressor, including, but not limited to, a compressor exemplified in the disclosure regarding the separation system 20.

The vehicle 200 may further comprise a cooling device configured to reduce the temperature of the dissociated at least one gas prior to introduction of the dissociated at least one gas to the engine 130. The cooling device may comprise a heat exchanger. The heat exchanger may be configured to be cooled by ambient air. The heat exchanger may be configured to be cooled by a coolant also used to cool the engine 130. The heat exchanger may be configured to be cooled by the clathrate storage vessel 110. The heat exchanger may be configured to be cooled by the separation system 120. The cooling device may comprise a refrigerated coil configured to cool the at least one gas.

The vehicle 200 may further comprise a transport device configured to transport the dissociated at least one gas from the separation system 120 to the engine 130, wherein the transport device is operably connected to the separation system 120 and to the engine 130. The transport device may be configured to control the transport of the dissociated at least one gas based on fuel requirements of the engine 130. The transport device may comprise a compressor. Examples of a compressor include, but are not limited to, a centrifugal compressor, a mixed-flow compressor, an axial-flow compressor, a reciprocating compressor, a rotary screw compressor, a rotary vane compressor, a scroll compressor, and a diaphragm compressor. In such embodiments, the vehicle 200 may further comprise a cooling device, such as the cooling device disclosed above, configured to reduce the temperature of the dissociated at least one gas prior to introduction of the dissociated at least one gas to the engine 130.

The vehicle 200 may comprise a moisture-removal system configured to remove water from the dissociated at least one gas prior to introduction of the dissociated at least one gas to the engine 130. The moisture-removal system may comprise, by way of non-limiting example, a dehumidifier, a dryer, or a molecular sieve column. In some embodiments, the moisture-removal system is part of the separation system 120.

The separation system 120 may be configured to receive a continuous supply of gas clathrates while the vehicle 200 is operating. The separation system 120 may be configured to periodically receive a batch of gas clathrates while the vehicle 200 is operating. The separation system 120 may be configured to receive a variable supply of gas clathrates based on fuel requirements of the engine 130. The separation system 120 may be configured to control the rate of dissociation of the gas clathrates based on fuel requirements of the engine 130.

The vehicle 200 may comprise a host material storage vessel configured to supply host material to the clathrate formation system 140, wherein the host material storage vessel is operably connected to the clathrate formation system 140. The vehicle 200 may comprise a transport device configured to transport host material from the host material storage vessel to the clathrate formation system 140. The transport device may further be configured to transport host material from the separation system 120 to the host material storage vessel. The host material storage vessel may be configured to store previously unused host material.

The vehicle 200 may comprise a filter configured to separate non-carbon products from the exhaust stream.

The vehicle 200 may comprise a catalytic converter configured to convert carbon monoxide and uncombusted hydrocarbons to carbon dioxide. Examples of partially combusted hydrocarbons include hydrocarbons with one, two, or three carbons.

The clathrate formation system 140 may be configured to utilize combustion produced water as at least a portion of the host material in the formation of carbon dioxide clathrates. In addition to carbon dioxide clathrates, the clathrate formation system 140 may be configured to also form carbon monoxide clathrates and partially combusted hydrocarbon clathrates. For example, the clathrate formation system 140 may be configured to control the pressure and temperature of the exhaust stream and the host material sufficient to form partially combusted hydrocarbon clathrates with partially combusted hydrocarbons and host material, to form carbon monoxide clathrates with carbon monoxide and host material, and/or to form carbon dioxide clathrates with carbon dioxide and host material.

The clathrate formation system 140 may comprise a cooling system configured to cool the exhaust stream. The cooling system may be operably connected with the separation system 120 and may be configured to transfer heat from the exhaust stream to the separation system 120. The cooling system may comprise a heat exchanger configured to transfer heat from the exhaust stream to an external heat sink, such as ambient air.

The clathrate formation system 140 may comprise a pressurization system. The pressurization system may comprise a compressor. Examples of a compressor include, but are not limited to, a centrifugal compressor, a mixed-flow compressor, an axial-flow compressor, a reciprocating compressor, a rotary screw compressor, a rotary vane compressor, a scroll compressor, and a diaphragm compressor.

The clathrate formation system 140 may comprise a formation vessel operably connected to the clathrate storage vessel 110.

The clathrate formation system 140 may further comprise a carbon dioxide removal system configured to separate carbon dioxide from the exhaust stream and deliver the removed carbon dioxide to the formation vessel. The carbon dioxide removal system may comprise a removal vessel operably connected to the exhaust stream and the formation vessel.

The removal vessel may be configured to contact the exhaust stream with at least one separation fluid. The separation fluid may comprise a chemical solvent. The separation fluid may comprise a physical solvent. Examples of the separation fluid include fluids comprising an alkanolamine, a monoethanolamine, a diethanolamine, a methyldiethanolamine, a triethanolamine, and/or piperazine. The separation fluid may be a liquid. The separation fluid may comprise host material.

The vehicle 200 may further comprise a regeneration system configured to separate carbon dioxide from the separation fluid and operably coupled to the removal vessel. The regeneration system may comprise a regeneration vessel operably coupled to the removal vessel and configured to heat the separation fluid. The regeneration vessel may be configured to operate on a batch basis. The regeneration vessel may be configured to operate on a continuous basis. The regeneration vessel may comprise a tank. The regeneration vessel may comprise a conduit.

In some embodiments, the removal vessel is configured to contact the exhaust stream with an alkali carbonate, such as sodium carbonate and/or potassium carbonate. In such embodiments, the vehicle 200 may further comprise a regeneration system configured to separate carbon dioxide from the alkali carbonate and operably coupled to the removal vessel. The regeneration system may comprise a regeneration vessel operably coupled to the removal vessel and configured to heat the alkali carbonate. The regeneration vessel may be configured to operate on a batch basis or on a continuous basis. The regeneration vessel may comprise a tank and/or a conduit.

In some embodiments, the removal vessel comprises a membrane configured to separate carbon dioxide from the exhaust stream. The membrane may comprise a polymer, such as a cellulose acetate polymer, a polyimide polymer, a polyamide polymer, a polycarbonate polymer, a polysulfone polymer, and/or a polyetherimide polymer. The membrane may comprise flat sheets. The flat sheets may be spiral-wound. The membrane may comprise hollow fibers.

The removal vessel may be configured to operate on a batch basis. For example, the removal vessel may comprise a tank. The removal vessel may be configured to operate on a continuous basis. For example, the removal vessel may comprise a conduit.

The clathrate formation system 140 may be configured to control the rate of formation of the carbon dioxide clathrates by regulating at least one of the temperature and the pressure of exhaust gases within the formation vessel. The formation vessel may be configured to operate at a temperature and/or a pressure that is about the same as an operating temperature of the clathrate storage vessel 110.

The formation vessel may further comprise insulation configured to maintain an internal temperature of the formation vessel. The insulation may comprise at least one material configured to and compatible with maintaining desired temperatures within the formation vessel. Examples of such materials include, but are not limited to, calcium silicate, cellular glass, elastomeric foam, fiberglass, polyisocyanurate, polystyrene, and polyurethane. The insulation may comprise at least one vacuum layer and/or multi-layer insulation. The insulation may releasably surround at least a portion of an outer surface of the vessel and/or the insulation may be attached to at least a portion of a surface of the vessel, including an outer and/or inner surface.

The vehicle 200 may further comprise a refrigeration system configured to maintain an internal temperature of the formation vessel within a set range. The refrigeration system may also be configured to cool the exhaust stream. The refrigeration system may be integrated with a refrigeration system of the clathrate storage vessel 110, if present. The set range may be from about 0 degrees Centigrade to about 25 degrees Centigrade, including from about 0 degrees Centigrade to about 20 degrees Centigrade, including from about 0 degrees Centigrade to about 15 degrees Centigrade, including from about 0 degrees Centigrade to about 10 degrees Centigrade, and including from about 4 degrees Centigrade to about 10 degrees Centigrade.

The refrigeration system may comprise a heat pipe configured and located to control the temperature of the formation vessel. The heat pipe may be operably connected to the separation system. The refrigeration system may also comprise a vapor compression system. The vapor compression system may utilize a chlorofluorocarbon, a chlorofluoroolefin, a hydrochlorofluorocarbon, a hydrochloro-fluoroolefin, a hydrofluoroolefin, a hydrochloroolefin, a hydroolefin, a hydrocarbon, a perfluoroolefin, a perfluorocarbon, a perchloroolefin, a perchlorocarbon, and/or a halon. The refrigeration system may comprise a vapor absorption system. The vapor absorption system may utilize water, ammonia, and/or lithium bromide. The refrigeration system may comprise a gas cycle refrigeration system, such as one that utilizes air. The refrigeration system may comprise a stirling cycle refrigeration system. The stirling cycle refrigeration system may utilize helium. The stirling cycle refrigeration system may comprise a free piston stirling cooler. The refrigeration system may comprise a thermoelectric refrigeration system.

The clathrate formation system 140 may be configured to generate an internal pressure in the formation vessel of about ambient pressure to about 30 bar, an internal pressure of about 10 bar to about 30 bar, an internal pressure of about 10 bar to about 15 bar, an internal pressure of about 15 bar to about 27 bar, or an internal pressure of about 20 bar to about 27 bar. The formation vessel may be designed to leak or vent before burst. Each of the vessels may independently further comprise a pressure relief device operably connected to the vessel and configured to reduce pressure within the vessel. Examples of a pressure relief device include, but are not limited to, a pressure relief valve and a rupture disc.

The clathrate formation system 140 may be configured to pressurize the exhaust stream in the formation vessel without substantially increasing back pressure on the exhaust ports of the engine 130. In such embodiments, the clathrate formation system 140 may comprise a valve operably connected to the formation vessel, wherein the valve is configured to control introduction of the exhaust stream to the formation vessel. The clathrate formation system 140 may be configured to sequentially introduce batches of the exhaust stream to the formation vessel. For example, introduction of the exhaust stream batches to the formation vessel may be timed to coincide with the closing of exhaust ports of the engine 130.

The clathrate formation system 140 may further comprise at least one holding vessel for temporarily storing the exhaust stream at a low pressure prior to introduction of the exhaust stream to the formation vessel for pressurizing. The low pressure may be less than the pressure at which carbon dioxide clathrates are formed in the formation vessel. The low pressure may be substantially equal to what the pressure of the exhaust stream at an exhaust port of the engine 130 would be if the clathrate formation system 140 and clathrate storage vessel 110 were not connected to the engine 130. The low pressure may be about equal to atmospheric pressure.

The clathrate formation system 140 may comprise a compressor, wherein an inlet of the compressor is operably connected to exhaust ports of the engine 130 and an outlet of the compressor is operably connected to the formation vessel. The compressor may be configured to reduce back pressure on exhaust ports of the engine 130 to be substantially equal to what the pressure at the exhaust ports would be if the clathrate formation system 140 and clathrate storage vessel 110 were not connected to the exhaust stream. The compressor may be configured to minimize back pressure on the exhaust ports of the engine 130 while pressurizing the formation vessel. Examples of a compressor include, but are not limited to, a centrifugal compressor, a mixed-flow compressor, an axial-flow compressor, a reciprocating compressor, a rotary screw compressor, a rotary vane compressor, a scroll compressor, and a diaphragm compressor.

The formation vessel may comprise a chamber configured to form batches of carbon dioxide clathrates and/or the formation vessel may comprise a conduit operably connected to the clathrate storage vessel 110 and configured to continuously form carbon dioxide clathrates.

The clathrate formation system 140 may comprise a moveable press integrated with the formation vessel and configured to pressurize the formation vessel. For example, the moveable press may include, but is not limited to, a hydraulic press or an electromagnetically activated press.

The clathrate formation system 140 may further comprise a temperature monitoring system configured to monitor the internal temperature of the formation vessel. The temperature monitoring system may comprise a thermostat, a thermistor, a thermocouple, and/or a resistive temperature detector.

The clathrate formation system 140 may further comprise a pressure monitoring device operably connected to the formation vessel and configured to monitor an internal pressure of the formation vessel. For example, the pressure monitoring device may comprise a piezoresistive strain gauge, a capacitive sensor, an electromagnetic sensor, a piezoelectric sensor, an optical sensor, a potentiometric sensor, a thermal conductivity sensor, and/or an ionization sensor.

The clathrate formation system 140 may further comprise a pressure relief device operably connected to the formation vessel and configured to reduce pressure within the formation vessel. Examples of a pressure relief device include, but are not limited to, a pressure relief valve and a rupture disc.

The vehicle 200 may further comprise a transport device operably connected to the clathrate storage vessel 110, operably connected to the formation vessel, and operably connected to the separation vessel, wherein the transport device is configured to transfer gas clathrates from the clathrate storage vessel 110 to the separation vessel and is also configured to transfer carbon dioxide clathrates from the formation vessel to the clathrate storage vessel 110.

The transport device may comprise a moveable surface, such as a conveyor belt, a rotating drum, a string, and/or a rotating disk. The moveable surface may comprise a high-surface-area material, such as the high-surface-area materials disclosed above for the fuel storage vessel 10. The transport device may be configured to transport the gas clathrates and carbon dioxide clathrates as a solid.

The vehicle 200 may further comprise a tracking system configured to monitor the position of the moveable surface to determine which clathrates comprise gas clathrates and which clathrates comprise carbon dioxide clathrates. The tracking system may comprise an optical tracking system, a mechanical tracking system, a magnetic sensor, and/or a hall effect sensor.

Additionally, the separation system 120 may be configured to dissociate substantially all of the gas clathrates located on a portion of the moveable surface transported to the separation system 120, such that when that portion of the moveable surface is transported to the clathrate formation system 140, then that portion of the moveable surface is substantially free from gas clathrates.

Alternatively, the vehicle 200 may further comprise a transport device operably connected to the clathrate storage vessel 140 and operably connected to the formation vessel and configured to transfer carbon dioxide clathrates from the formation vessel to the clathrate storage vessel 140. In this embodiment, the transport device is independent of the separation vessel. In this embodiment, the transport device may also comprise a moveable surface, such as a conveyor belt, a rotating drum, a string, and/or a rotating disk. The moveable surface may comprise a high-surface-area material, such as the high-surface-area materials disclosed above for the fuel storage vessel 10. The transport device may be configured to transport the carbon dioxide clathrates as a slurry and/or as a solid, such as solid chunks or pellets.

The transport device may be at least partially located internally within the formation vessel. Likewise, the transport device may be at least partially external to the formation vessel. Accordingly, the transport device may be at least partially integrated into a portion of a surface, including an internal or external surface, of the formation vessel. Additionally, the transport device may be at least partially integrated into a portion of a surface, including an internal or external surface, of the clathrate storage vessel 110. Likewise, the transport device may be at least partially internal and/or external to the clathrate storage vessel 110.

The transport device may be configured for moving solid carbon dioxide clathrate. The transport device may be configured for moving carbon dioxide clathrate slurry. The transport device may be configured to be hydraulically, mechanically, and/or electrically actuated.

The transport device may comprise an extruder and/or a pump. When the transport device comprises a pump, the inlet of the pump may be operably connected to the formation vessel and an outlet of the pump may be operably connected to the clathrate storage vessel 110. Examples of the pump include, but are not limited to, a positive displacement pump, a lobe pump, an external gear pump, an internal gear pump, a peristaltic pump, a screw pump, a progressive cavity pump, a flexible impeller pump, a rotary vane pump, and a centrifugal pump. The pump may be any pump compatible with pumping a carbon dioxide clathrate slurry.

The clathrate formation system 140 may be configured to receive a continuous supply of carbon dioxide or may be configured to periodically receive a batch of carbon dioxide, while the vehicle 200 is operating. The clathrate formation system 40 may be configured to receive a variable supply of the exhaust stream based on the quantity of exhaust produced by the engine 130.

The clathrate storage vessel 110 may be configured to receive the carbon dioxide clathrates as a solid and/or as a slurry.

The clathrate storage vessel 110 may be configured for removal of stored carbon dioxide from the vehicle 200 when the vehicle 200 is otherwise not in use. The clathrate storage vessel 110 may be configured to reduce the pressure and/or increase the temperature of the clathrate storage vessel 110 sufficient to dissociate the stored carbon dioxide clathrates into carbon dioxide and host material. For example, the clathrate storage vessel 110 may be configured to sufficiently warm stored carbon dioxide clathrates so as to liquefy the host material and gasify the carbon dioxide. The clathrate storage vessel 110 may comprise an outlet configured for removal of dissociated carbon dioxide. The clathrate storage vessel 110 may also comprise an outlet configured for removal of dissociated host material.

The vehicle 200 may further comprise a heating system configured and located to impart heat energy to the clathrate storage vessel 110. The heating system may be located internal or external to the vessel. For example, the heating system may be integrated into or attached to a portion of a surface of the clathrate storage vessel 110, including external or internal surfaces. The heating system may be independently configured to transfer heat energy from the coolant used to cool the engine 130. Likewise, the heating system may be configured to transfer heat energy from heat generated by the engine 130 in any fashion, such as from an exhaust stream generated by the engine 130. For example, the heating system may be configured to divert the exhaust stream from the clathrate formation system 140 and also configured to transfer heat from the diverted exhaust stream to the clathrate storage vessel 110. In that example, the heating system may be further configured to divert the exhaust stream from the clathrate storage vessel 110 and vent the exhaust stream to atmosphere. Alternatively or in addition thereto, the heating system may utilize solar energy, ambient temperatures, electric resistance heating elements, microwave heating, electromagnetic heating, and/or dielectric heating to impart heat energy.

The clathrate storage vessel 110 may be configured for removal of solid and/or slurry carbon dioxide clathrates from the clathrate storage vessel 110.

The clathrate storage vessel 110 may be configured to maintain carbon dioxide clathrates as a solid and/or slurry until removal of carbon dioxide from the vehicle 200 is intended.

The vehicle 200 may comprise a dissociation vessel operably connected to the clathrate storage vessel 110 and configured to receive carbon dioxide clathrates from the clathrate storage vessel 110. The dissociation vessel may be configured for removal of stored carbon dioxide from the vehicle 200 when the vehicle 200 is otherwise not in use. The dissociation vessel may be configured to reduce the pressure and/or increase the temperature of the dissociation vessel sufficient to dissociate the stored carbon dioxide clathrates into carbon dioxide and host material.

The vehicle 200 may further comprise a recycle system configured to transfer dissociated host material from the separation system 120 to the clathrate formation system 140. The recycle system may further comprise a host material storage vessel configured to store dissociated host material from the separation system 120. The recycle system may comprise a transfer device configured to transfer the dissociated host material to the clathrate formation system 140. The recycle system may comprise a filter configured to clean dissociated host material prior to transfer of the dissociated host material to the clathrate formation system 140; e.g., to remove a clathrate stabilizer more suitable for gas clathrates than for carbon dioxide clathrates. The recycle system may comprise a supply reservoir configured to add a component to the host material prior to transfer of the dissociated host material to the clathrate formation system 140; e.g., to add a clathrate stabilizer more suitable for carbon dioxide clathrates than for gas clathrates.

Figure 3:
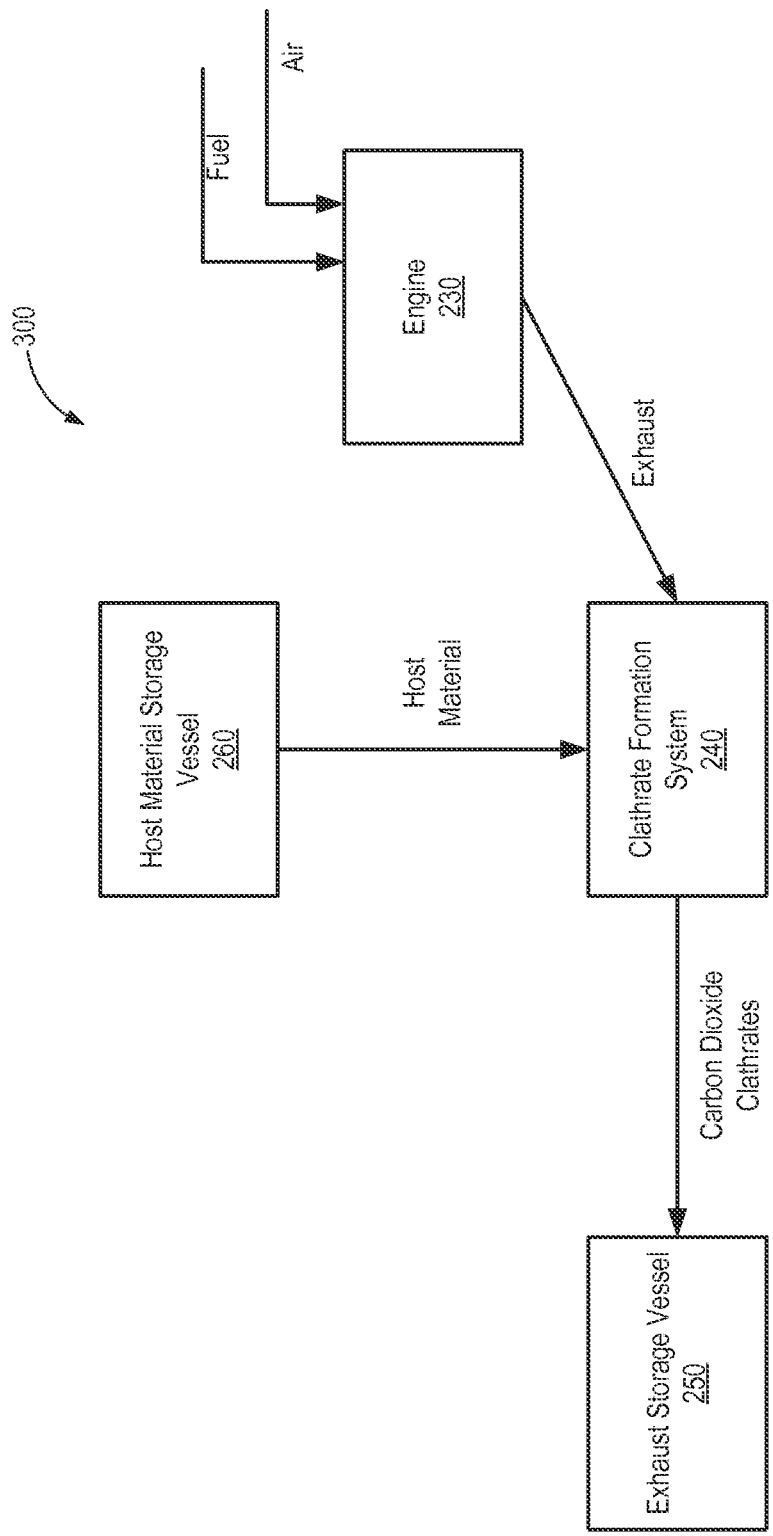
FIG. 3 illustrates another embodiment of a vehicle configured to sequester carbon dioxide emissions.

FIGS. 1 and 2 illustrate vehicles that utilize gas clathrates to store fuel for the vehicles. FIG. 3 illustrates an additional embodiment of a vehicle with reduced emissions, but where gas clathrates are not used to store the fuel for the vehicle.

FIG. 3 illustrates a vehicle with a conventional fuel source, such as gasoline or diesel, that utilizes clathrates to capture carbon dioxide emissions. FIG. 3 illustrates a vehicle 300 comprising a clathrate formation system 240 and an exhaust storage vessel 250. Accordingly, the disclosure regarding the clathrate formation system 40 and the exhaust storage vessel 50 may apply to the clathrate formation system 240 and the exhaust storage vessel 250 of the vehicle 300 and vice versa.

The vehicle 300 comprises an engine 230, a supply of host material, a clathrate formation system 240 operably connected to the engine 230, operably connected to the supply of host material, and configured to combine carbon dioxide from an exhaust stream from the engine with the host material to form carbon dioxide clathrates. The vehicle 300 may further comprise an exhaust storage vessel configured to store carbon dioxide clathrates.

The vehicle 300 may be any number of conventional vehicles, such as, for example, a locomotive, a tractor configured for attachment to a semi-trailer, a bus, a car, or a pick-up truck. The engine 230 may be any number of conventional engines, such as, for example, a gasoline engine, a diesel engine, or a natural gas engine.

The disclosure regarding the host materials of the vehicles 100 and 200 applies equally to the host material of the vehicle 300. The vehicle 300 may further comprise a host material storage vessel 260 configured to supply host material to the clathrate formation system 240, wherein the host material storage vessel 260 is operably connected to the clathrate formation system 240. The vehicle 300 may further comprise a transport device configured to transport host material from the host material storage vessel 260 to the clathrate formation system 240. The host material storage vessel 260 may be configured to receive previously unused and/or recycled host material.

The vehicle 300 may comprise a filter configured to separate non-carbon products from the exhaust stream.

The vehicle 300 may comprise a catalytic converter configured to convert carbon monoxide and uncombusted hydrocarbons to carbon dioxide.

The clathrate formation system 240 may be configured to utilize combustion produced water as at least a portion of the host material in the formation of carbon dioxide clathrates. In addition to carbon dioxide clathrates, the clathrate formation system 240 may be configured to also form carbon monoxide clathrates and partially combusted hydrocarbon clathrates. For example, the clathrate formation system 240 may be configured to control the pressure and temperature of the exhaust stream and the host material sufficient to form partially combusted hydrocarbon clathrates with partially combusted hydrocarbons and host material, to form carbon monoxide clathrates with carbon monoxide and host material, and/or to form carbon dioxide clathrates with carbon dioxide and host material. Likewise, the exhaust storage vessel 250 may also be configured to form carbon monoxide clathrates and partially combusted hydrocarbon clathrates in addition to carbon dioxide clathrates.

The clathrate formation system 240 may comprise a cooling system configured to cool the exhaust stream. The cooling system may comprise a heat exchanger configured to transfer heat from the exhaust stream to an external heat sink, such as ambient air.

The clathrate formation system 240 may comprise a pressurization system. The pressurization system may comprise a compressor. Examples of a compressor include, but are not limited to, a centrifugal compressor, a mixed-flow compressor, an axial-flow compressor, a reciprocating compressor, a rotary screw compressor, a rotary vane compressor, a scroll compressor, and a diaphragm compressor.

The clathrate formation system 240 may comprise a formation vessel operably connected to the exhaust storage vessel 250.

The clathrate formation system 240 may further comprise a carbon dioxide removal system configured to separate carbon dioxide from the exhaust stream and deliver the removed carbon dioxide to the formation vessel. The carbon dioxide removal system may comprise a removal vessel operably connected to the exhaust stream and the formation vessel.

The removal vessel may be configured to contact the exhaust stream with at least one separation fluid. The separation fluid may comprise a chemical solvent. The separation fluid may comprise a physical solvent. Examples of the separation fluid include fluids comprising an alkanolamine, a monoethanolamine, a diethanolamine, a methyldiethanolamine, a triethanolamine, and/or piperazine. The separation fluid may be a liquid. The separation fluid may comprise host material.

The vehicle 300 may further comprise a regeneration system configured to separate carbon dioxide from the separation fluid and operably coupled to the removal vessel. The regeneration system may comprise a regeneration vessel operably coupled to the removal vessel and configured to heat the separation fluid. The regeneration vessel may be configured to operate on a batch basis. The regeneration vessel may be configured to operate on a continuous basis. The regeneration vessel may comprise a tank. The regeneration vessel may comprise a conduit.

In some embodiments, the removal vessel is configured to contact the exhaust stream with an alkali carbonate, such as sodium carbonate and/or potassium carbonate. In such embodiments, the vehicle 300 may further comprise a regeneration system configured to separate carbon dioxide from the alkali carbonate and operably coupled to the removal vessel. The regeneration system may comprise a regeneration vessel operably coupled to the removal vessel and configured to heat the alkali carbonate. The regeneration vessel may be configured to operate on a batch basis or on a continuous basis. The regeneration vessel may comprise a tank and/or a conduit.

In some embodiments, the removal vessel comprises a membrane configured to separate carbon dioxide from the exhaust stream. The membrane may comprise a polymer, such as a cellulose acetate polymer, a polyimide polymer, a polyamide polymer, a polycarbonate polymer, a polysulfone polymer, and/or a polyetherimide polymer. The membrane may comprise flat sheets. The flat sheets may be spiral-wound. The membrane may comprise hollow fibers.

The removal vessel may be configured to operate on a batch basis. For example, the removal vessel may comprise a tank. The removal vessel may be configured to operate on a continuous basis. For example, the removal vessel may comprise a conduit.

The clathrate formation system 240 may be configured to control the rate of formation of the carbon dioxide clathrates by regulating at least one of the temperature and the pressure of exhaust gases within the formation vessel. The formation vessel may further comprise insulation configured to maintain an internal temperature of the formation vessel. The insulation may comprise at least one material configured to and compatible with maintaining desired temperatures within the formation vessel. Examples of such materials include, but are not limited to, calcium silicate, cellular glass, elastomeric foam, fiberglass, polyisocyanurate, polystyrene, and polyurethane. The insulation may comprise at least one vacuum layer and/or multi-layer insulation. The insulation may releasably surround at least a portion of an outer surface of the vessel and/or the insulation may be attached to at least a portion of a surface of the vessel, including an outer and/or inner surface.

The vehicle 300 may further comprise a refrigeration system configured to maintain an internal temperature of the formation vessel within a set range. The refrigeration system may also be configured to cool the exhaust stream. The set range may be from about 0 degrees Centigrade to about 25 degrees Centigrade, including from about 0 degrees Centigrade to about 20 degrees Centigrade, including from about 0 degrees Centigrade to about 15 degrees Centigrade, including from about 0 degrees Centigrade to about 10 degrees Centigrade, and including from about 4 degrees Centigrade to about 10 degrees Centigrade.

The refrigeration system may comprise a heat pipe configured and located to control the temperature of the formation vessel. The refrigeration system may also comprise a vapor compression system. The vapor compression system may utilize a chlorofluorocarbon, a chlorofluoroolefin, a hydrochlorofluorocarbon, a hydrochloro-fluoroolefin, a hydrofluoroolefin, a hydrochloroolefin, a hydroolefin, a hydrocarbon, a perfluoroolefin, a perfluorocarbon, a perchloroolefin, a perchlorocarbon, and/or a halon. The refrigeration system may comprise a vapor absorption system. The vapor absorption system may utilize water, ammonia, and/or lithium bromide. The refrigeration system may comprise a gas cycle refrigeration system, such as one that utilizes air. The refrigeration system may comprise a stirling cycle refrigeration system. The stirling cycle refrigeration system may utilize helium. The stirling cycle refrigeration system may comprise a free piston stirling cooler. The refrigeration system may comprise a thermoelectric refrigeration system.

The clathrate formation system 240 may be configured to generate an internal pressure in the formation vessel of about ambient pressure to about 30 bar, an internal pressure of about 10 bar to about 30 bar, an internal pressure of about 10 bar to about 15 bar, an internal pressure of about 15 bar to about 27 bar, or an internal pressure of about 20 bar to about 27 bar. The formation vessel may be designed to leak or vent before burst. The formation vessel may further comprise a pressure relief device operably connected to the vessel and configured to reduce pressure within the vessel. Examples of a pressure relief device include, but are not limited to, a pressure relief valve and a rupture disc.

The clathrate formation system 240 may be configured to pressurize the exhaust stream in the formation vessel without substantially increasing back pressure on the exhaust ports of the engine 230. In such embodiments, the clathrate formation system 240 may comprise a valve operably connected to the formation vessel, wherein the valve is configured to control introduction of the exhaust stream to the formation vessel. The clathrate formation system 240 may be configured to sequentially introduce batches of the exhaust stream to the formation vessel. For example, introduction of the exhaust stream batches to the formation vessel may be timed to coincide with the closing of exhaust ports of the engine 230.

The clathrate formation system 240 may further comprise at least one holding vessel for temporarily storing the exhaust stream at a low pressure prior to introduction of the exhaust stream to the formation vessel for pressurizing. The low pressure may be less than the pressure at which carbon dioxide clathrates are formed in the formation vessel. The low pressure may be substantially equal to what the pressure of the exhaust stream at an exhaust port of the engine 230 would be if the clathrate formation system 240 and the exhaust storage vessel 250 were not connected to the engine 230. The low pressure may be about equal to atmospheric pressure.

The clathrate formation system 240 may comprise a compressor, wherein an inlet of the compressor is operably connected to exhaust ports of the engine 230 and an outlet of the compressor is operably connected to the formation vessel. The compressor may be configured to reduce back pressure on exhaust ports of the engine 230 to be substantially equal to what the pressure at the exhaust ports would be if the clathrate formation system 240 and exhaust storage vessel 250 were not connected to the exhaust stream. The compressor may be configured to minimize back pressure on the exhaust ports of the engine 230 while pressurizing the formation vessel. Examples of a compressor include, but are not limited to, a centrifugal compressor, a mixed-flow compressor, an axial-flow compressor, a reciprocating compressor, a rotary screw compressor, a rotary vane compressor, a scroll compressor, and a diaphragm compressor.

The formation vessel may comprise a chamber configured to form batches of carbon dioxide clathrates and/or the formation vessel may comprise a conduit operably connected to the exhaust storage vessel 250 and configured to continuously form carbon dioxide clathrates.

The clathrate formation system 240 may comprise a moveable press integrated with the formation vessel and configured to pressurize the formation vessel. For example, the moveable press may include, but is not limited to, a hydraulic press or an electromagnetically activated press.

The clathrate formation system 240 may further comprise a temperature monitoring system configured to monitor the internal temperature of the formation vessel. The temperature monitoring system may comprise a thermostat, a thermistor, a thermocouple, and/or a resistive temperature detector.

The clathrate formation system 240 may further comprise a pressure monitoring device operably connected to the formation vessel and configured to monitor an internal pressure of the formation vessel. For example, the pressure monitoring device may comprise a piezoresistive strain gauge, a capacitive sensor, an electromagnetic sensor, a piezoelectric sensor, an optical sensor, a potentiometric sensor, a thermal conductivity sensor, and/or an ionization sensor.

The clathrate formation system 240 may further comprise a pressure relief device operably connected to the formation vessel and configured to reduce pressure within the formation vessel. Examples of a pressure relief device include, but are not limited to, a pressure relief valve and a rupture disc.

The vehicle 300 may further comprise a transport device operably connected to the formation vessel and the exhaust storage vessel and configured to transfer carbon dioxide clathrates from the formation vessel to the exhaust storage vessel. The transport device may be configured to transport the carbon dioxide clathrates as a slurry and/or as a solid, such as solid chunks or pellets.

The transport device may be at least partially located internally within the formation vessel. Likewise, the transport device may be at least partially external to the formation vessel. Accordingly, the transport device may be at least partially integrated into a portion of a surface, including an internal or external surface, of the formation vessel. Additionally, the transport device may be at least partially integrated into a portion of a surface, including an internal or external surface, of the exhaust storage vessel 250. Likewise, the transport device may be at least partially internal and/or external to the exhaust storage vessel 250.

The transport device may be configured for moving solid carbon dioxide clathrate. The transport device may be configured for moving carbon dioxide clathrate slurry. The transport device may be configured to be hydraulically, mechanically, and/or electrically actuated.

The transport device may comprise an extruder and/or a pump. When the transport device comprises a pump, the inlet of the pump may be operably connected to the formation vessel and an outlet of the pump may be operably connected to the exhaust storage vessel 250. Examples of the pump include, but are not limited to, a positive displacement pump, a lobe pump, an external gear pump, an internal gear pump, a peristaltic pump, a screw pump, a progressive cavity pump, a flexible impeller pump, a rotary vane pump, and a centrifugal pump. The pump may be any pump compatible with pumping a carbon dioxide clathrate slurry.

The clathrate formation system 240 may be integrated with the exhaust storage vessel 250. The clathrate formation system 240 may be configured to form carbon dioxide clathrates by regulating at least one of the temperature and the pressure of carbon dioxide and host material within the exhaust storage vessel 250 to be compatible with forming carbon dioxide clathrates. For example, the temperature may be regulated to be about 0 degrees Centigrade to about 25 degrees Centigrade, may be regulated to be about 0 degrees Centigrade to about 20 degrees Centigrade, may be regulated to be about 0 degrees Centigrade to about 15 degrees Centigrade, may be regulated to be about 0 degrees Centigrade to about 10 degrees Centigrade, or may be regulated to be about 4 degrees Centigrade to about 10 degrees Centigrade. In another example, the pressure may be regulated to be about 1 bar to about 30 bar, the pressure may be regulated to be about 10 bar to about 30 bar, the pressure may be regulated to be about 10 bar to about 15 bar, the pressure may be regulated to be about 15 bar to about 27 bar, or the pressure may be regulated to be about 20 bar to about 27 bar.

Likewise, the exhaust storage vessel 250 may be configured to agitate the carbon dioxide and the host material at a temperature and a pressure compatible with forming the carbon dioxide clathrates. For example, the exhaust storage vessel 250 may comprise a mixing element located within the exhaust storage vessel 250 and configured to agitate the carbon dioxide and the host material.

Additionally, the exhaust storage vessel 250 may comprise high-surface-area materials configured for forming carbon dioxide clathrates on the surface thereof. By way of non-limiting example, the high-surface-area material may comprise a graphene-based material, an activated carbon, and/or a metal organic framework, such as a bidentate carboxylic comprising ligand, a tridentate carboxylic comprising ligand, an azole comprising ligand, or a squaric acid comprising ligand.

The clathrate formation system 240 may further comprise a heat pipe configured and located to modulate the temperature of the exhaust storage vessel 250.

The clathrate formation system 240 may be configured to receive a continuous supply of carbon dioxide or may be configured to periodically receive a batch of carbon dioxide, while the vehicle 300 is operating. The clathrate formation system 240 may be configured to receive a variable supply of the exhaust stream based on the quantity of exhaust produced by the engine 230.

The exhaust storage vessel 250 may be configured to receive the carbon dioxide clathrates as a solid and/or as a slurry.

The exhaust storage vessel 250 may be configured for removal of stored carbon dioxide from the vehicle 300 when the vehicle 300 is otherwise not in use. The exhaust storage vessel 250 may be configured to reduce the pressure and/or increase the temperature of the exhaust storage vessel 250 sufficient to dissociate the stored carbon dioxide clathrates into carbon dioxide and host material. For example, the exhaust storage vessel 250 may be configured to sufficiently warm stored carbon dioxide clathrates so as to liquefy the host material and gasify the carbon dioxide. The exhaust storage vessel 250 may comprise an outlet configured for removal of dissociated carbon dioxide. The exhaust storage vessel 250 may also comprise an outlet configured for removal of dissociated host material.

Vehicle 300 may further comprise a heating system configured and located to impart heat energy to the exhaust storage vessel 250. The heating system may be located internal or external to the vessel. For example, the heating system may be integrated into or attached to a portion of a surface of the exhaust storage vessel 250, including external or internal surfaces. The heating system may be independently configured to transfer heat energy from the coolant used to cool the engine 230. Likewise, the heating system may be configured to transfer heat energy from heat generated by the engine 230 in any fashion, such as from an exhaust stream generated by the engine 230. For example, the heating system may be configured to divert the exhaust stream from the clathrate formation system 240 and also configured to transfer heat from the diverted exhaust stream to the exhaust storage vessel 250. In that example, the heating system may be further configured to divert the exhaust stream from the exhaust storage vessel 250 and vent the exhaust stream to atmosphere. Alternatively or in addition thereto, the heating system may utilize solar energy, ambient temperatures, electric resistance heating elements, microwave heating, electromagnetic heating, and/or dielectric heating to impart heat energy.

The vehicle 300 may further comprise a recycle system configured to transfer dissociated host material from the exhaust storage vessel 250 to the host material storage vessel 260. The recycle system may comprise a filter configured to clean dissociated host material prior to transfer of the dissociated host material to the host material storage vessel 260. The recycle system may comprise a transfer device configured to transfer the dissociated host material to the host material storage vessel 260.

The exhaust storage vessel 250 may be configured for removal of solid and/or slurry carbon dioxide clathrates from the exhaust storage vessel 250.

The exhaust storage vessel 250 may be configured to maintain carbon dioxide clathrates as a solid and/or slurry until removal of carbon dioxide from the vehicle 300 is intended.

The exhaust storage vessel 250 may be configured to be detachable and reattachable from the remainder of the vehicle 300. For example, the exhaust storage vessel 250 may be configured to be exchanged with a different exhaust storage vessel 250 that has been emptied of carbon dioxide clathrates.

The vehicle 300 may further comprise a sensor configured to monitor the amount of carbon dioxide clathrates in the exhaust storage vessel 250. The sensor may be configured to measure a mass of the carbon dioxide clathrates. The sensor may be configured to measure a vapor pressure of carbon dioxide gas present in the exhaust storage vessel 250. The sensor may be configured to determine a concentration of carbon dioxide present in the exhaust storage vessel 250. The sensor may be configured to monitor the amount of carbon dioxide removed from the exhaust storage vessel 250.

The vehicle 300 may alternatively comprise a dissociation vessel operably connected to the exhaust storage vessel 250 and configured to receive carbon dioxide clathrates from the exhaust storage vessel 250. The dissociation vessel may be configured for removal of stored carbon dioxide from the vehicle 300 when the vehicle 300 is otherwise not in use. The dissociation vessel may be configured to reduce the pressure and/or increase the temperature of the dissociation vessel sufficient to dissociate the stored carbon dioxide clathrates into carbon dioxide and host material.

The vehicle 300 may further comprise a temperature monitoring system configured to monitor the internal temperature of the exhaust storage vessel 250. The temperature monitoring system may comprise a thermostat, a thermistor, a thermocouple, and/or a resistive temperature detector.

The vehicle 300 may further comprise a control system configured to monitor both pressure and temperature of the exhaust storage vessel 250 and configured to regulate at least one of pressure and temperature in order to maintain the carbon dioxide clathrate within a clathrate stability range.

The exhaust storage vessel 250 may comprise insulation. The insulation may comprise at least one material configured to and compatible with maintaining desired temperatures within each vessel. Examples of such materials include, but are not limited to, calcium silicate, cellular glass, elastomeric foam, fiberglass, polyisocyanurate, polystyrene, and polyurethane. The insulation may comprise at least one vacuum layer and/or multi-layer insulation. The insulation may releasably surround at least a portion of an outer surface of the vessel and/or the insulation may be attached to at least a portion of a surface of the vessel, including an outer and/or inner surface.

The exhaust storage vessel 250 may comprise a refrigeration system configured to maintain an internal temperature of about 0 degrees Centigrade to about 25 degrees Centigrade. The exhaust storage vessel 250 may be configured to maintain an internal temperature of about 0 degrees Centigrade to about 20 degrees Centigrade. The exhaust storage vessel 250 may be configured to maintain an internal temperature of about 0 degrees Centigrade to about 15 degrees Centigrade. The exhaust storage vessel 250 may be configured to maintain an internal temperature of about 0 degrees Centigrade to about 10 degrees Centigrade, including from about 4 degrees Centigrade to about 10 degrees Centigrade.

The refrigeration system may comprise a heat pipe. The refrigeration system may also comprise a vapor compression system. The vapor compression system may utilize a chlorofluorocarbon, a chlorofluoroolefin, a hydrochlorofluorocarbon, a hydrochloro-fluoroolefin, a hydrofluoroolefin, a hydrochloroolefin, a hydroolefin, a hydrocarbon, a perfluoroolefin, a perfluorocarbon, a perchloroolefin, a perchlorocarbon, and/or a halon. The refrigeration system may comprise a vapor absorption system. The vapor absorption system may utilize water, ammonia, and/or lithium bromide. The refrigeration system may comprise a gas cycle refrigeration system, such as one that utilizes air. The refrigeration system may comprise a stirling cycle refrigeration system. The stirling cycle refrigeration system may utilize helium. The stirling cycle refrigeration system may comprise a free piston stirling cooler. The refrigeration system may comprise a thermoelectric refrigeration system.

The formation vessel, if present, and the exhaust storage vessel 250 may each be comprised of structural materials configured to and compatible with maintaining desired temperatures and pressures within each respective vessel. The structural material may comprise aluminum, brass, copper, ferretic steel, carbon steel, stainless steel, polytetrafluoroethylene (PTFE), polychlorotrifluoroethylene (PCTFE), vinylidene polyfluoride (PVDF), polyamide (PA), polypropylene (PP), nitrile rubber (NBR), chloroprene (CR), chlorofluorocarbons (FKM), and/or composite materials, including composite materials comprising carbon fibers, glass fibers, and/or aramid fibers.

The exhaust storage vessel 250 may be designed to maintain an internal pressure of about 1 bar to about 30 bar, an internal pressure of about 10 bar to about 30 bar, an internal pressure of about 10 bar to about 15 bar, an internal pressure of about 15 bar to about 27 bar, an internal pressure of about 20 bar to about 27 bar. The vessel may be designed to leak or vent before burst. The vessel may further comprise a pressure relief device operably connected to the vessel and configured to reduce pressure within the vessel. Examples of a pressure relief device include, but are not limited to, a pressure relief valve and a rupture disc.

The vehicle 300 may further comprise a pressurizing device operably connected to the exhaust storage vessel 250 and configured to maintain pressure within the exhaust storage vessel 250. Examples of a pressurizing device include a moveable press integrated with the vessel, wherein the moveable press is configured to maintain pressure within the vessel. For example, the moveable press may include, but is not limited to, a hydraulic press or an electromagnetically activated press. In other examples, the pressurizing device may comprise a compressor. Examples of a compressor include, but are not limited to, a centrifugal compressor, a mixed-flow compressor, an axial-flow compressor, a reciprocating compressor, a rotary screw compressor, a rotary vane compressor, a scroll compressor, and a diaphragm compressor.

Vehicle 300 may further comprise a pressure monitoring device operably connected to the exhaust storage vessel 250 and configured to monitor an internal pressure of the exhaust storage vessel 250. The pressure monitoring device may comprise a piezoresistive strain gauge, a capacitive sensor, an electromagnetic sensor, a piezoelectric sensor, an optical sensor, a potentiometric sensor, a thermal conductivity sensor, and/or an ionization sensor.

This disclosure also provides kits for reducing the emissions of existing vehicles. The kits may comprise the host material storage vessel 260, the clathrate formation system 240, and the exhaust storage vessel 250 disclosed above for the vehicle 300. The clathrate formation system 240 may be configured for operable connection to an engine of a vehicle, configured to be operably connected to the host material storage vessel 260, and configured to combine an exhaust stream from the engine with host material to form carbon dioxide clathrates. The exhaust storage vessel 250 may be configured to store carbon dioxide clathrates. It should be understood that any and all of the disclosure above regarding the vehicle 300, other than the disclosure specific to the engine 230, may apply to the kits. Additionally, the kits include the option that any components disclosed for the vehicle 300 as being operably connected to another component may instead be configured for operable connection.

In some embodiments, the kits are configured to be mounted underneath the trunk area of a vehicle. In other embodiments, the kits are configured to be mounted in the trunk of the vehicle.

The kits may be for any number of conventional vehicles, such as, for example, a locomotive, a tractor configured for attachment to a semi-trailer, a bus, a car, or a pick-up truck. The kits may be used with any number of conventional engines, such as, for example, a gasoline engine, a diesel engine, or a natural gas engine.

The kits may comprise a host material storage vessel 260 configured to supply host material to the clathrate formation system 240, wherein the host material storage vessel 260 is operably connected to the clathrate formation system 240. The kits may further comprise a transport device configured to transport host material from the host material storage vessel 260 to the clathrate formation system 240. The host material storage vessel 260 may be configured to receive previously unused and/or recycled host material.

The kits may comprise a filter configured to separate non-carbon products from the exhaust stream.

The kits may comprise a catalytic converter configured to convert carbon monoxide and uncombusted hydrocarbons to carbon dioxide. Alternatively, the kits may be configured to utilize an existing catalytic converter of a vehicle to convert carbon monoxide and uncombusted hydrocarbons to carbon dioxide.

The clathrate formation system 240 of the kits may be configured to utilize combustion produced water as at least a portion of the host material in the formation of carbon dioxide clathrates. In addition to carbon dioxide clathrates, the clathrate formation system 240 may be configured to also form carbon monoxide clathrates and partially combusted hydrocarbon clathrates. For example, the clathrate formation system 240 may be configured to control the pressure and temperature of the exhaust stream and the host material sufficient to form partially combusted hydrocarbon clathrates with partially combusted hydrocarbons and host material, to form carbon monoxide clathrates with carbon monoxide and host material, and/or to form carbon dioxide clathrates with carbon dioxide and host material. Likewise, the exhaust storage vessel 250 may also be configured to form carbon monoxide clathrates and partially combusted hydrocarbon clathrates in addition to carbon dioxide clathrates.

The clathrate formation system 240 of the kits may comprise a cooling system configured to cool the exhaust stream. The cooling system may comprise a heat exchanger configured to transfer heat from the exhaust stream to an external heat sink, such as ambient air.

The clathrate formation system 240 of the kits may comprise a pressurization system. The pressurization system may comprise a compressor. Examples of a compressor include, but are not limited to, a centrifugal compressor, a mixed-flow compressor, an axial-flow compressor, a reciprocating compressor, a rotary screw compressor, a rotary vane compressor, a scroll compressor, and a diaphragm compressor.

The clathrate formation system 240 of the kits may comprise a formation vessel operably connected to the exhaust storage vessel 250.

The clathrate formation system 240 of the kits may further comprise a carbon dioxide removal system configured to separate carbon dioxide from the exhaust stream and deliver the removed carbon dioxide to the formation vessel. The carbon dioxide removal system may comprise a removal vessel configured to be operably connected to the exhaust stream and the formation vessel.

The removal vessel of the kits may be configured to contact the exhaust stream with at least one separation fluid. The separation fluid may comprise a chemical solvent. The separation fluid may comprise a physical solvent. Examples of the separation fluid include fluids comprising an alkanolamine, a monoethanolamine, a diethanolamine, a methyldiethanolamine, a triethanolamine, and/or piperazine. The separation fluid may be a liquid. The separation fluid may comprise host material.

The kits may further comprise a regeneration system configured to separate carbon dioxide from the separation fluid and operably coupled to the removal vessel. The regeneration system may comprise a regeneration vessel operably coupled to the removal vessel and configured to heat the separation fluid. The regeneration vessel may be configured to operate on a batch basis. The regeneration vessel may be configured to operate on a continuous basis. The regeneration vessel may comprise a tank. The regeneration vessel may comprise a conduit.

In some embodiments of the kits, the removal vessel is configured to contact the exhaust stream with an alkali carbonate, such as sodium carbonate and/or potassium carbonate. In such embodiments, the vehicle 300 may further comprise a regeneration system configured to separate carbon dioxide from the alkali carbonate and operably coupled to the removal vessel. The regeneration system may comprise a regeneration vessel operably coupled to the removal vessel and configured to heat the alkali carbonate. The regeneration vessel may be configured to operate on a batch basis or on a continuous basis. The regeneration vessel may comprise a tank and/or a conduit.

In some embodiments of the kits, the removal vessel comprises a membrane configured to separate carbon dioxide from the exhaust stream. The membrane may comprise a polymer, such as a cellulose acetate polymer, a polyimide polymer, a polyamide polymer, a polycarbonate polymer, a polysulfone polymer, and/or a polyetherimide polymer. The membrane may comprise flat sheets. The flat sheets may be spiral-wound. The membrane may comprise hollow fibers.

The removal vessel of the kits may be configured to operate on a batch basis. For example, the removal vessel may comprise a tank. The removal vessel may be configured to operate on a continuous basis. For example, the removal vessel may comprise a conduit.

The clathrate formation system 240 of the kits may be configured to control the rate of formation of the carbon dioxide clathrates by regulating at least one of the temperature and the pressure of exhaust gases within the formation vessel. The formation vessel may further comprise insulation configured to maintain an internal temperature of the formation vessel. The insulation may comprise at least one material configured to and compatible with maintaining desired temperatures within the formation vessel. Examples of such materials include, but are not limited to, calcium silicate, cellular glass, elastomeric foam, fiberglass, polyisocyanurate, polystyrene, and polyurethane. The insulation may comprise at least one vacuum layer and/or multi-layer insulation. The insulation may releasably surround at least a portion of an outer surface of the vessel and/or the insulation may be attached to at least a portion of a surface of the vessel, including an outer and/or inner surface.

The kits may further comprise a refrigeration system configured to maintain an internal temperature of the formation vessel within a set range. The refrigeration system may also be configured to cool the exhaust stream. The set range may be from about 0 degrees Centigrade to about 25 degrees Centigrade, including from about 0 degrees Centigrade to about 20 degrees Centigrade, including from about 0 degrees Centigrade to about 15 degrees Centigrade, including from about 0 degrees Centigrade to about 10 degrees Centigrade, and including from about 4 degrees Centigrade to about 10 degrees Centigrade.

The refrigeration system may comprise a heat pipe configured and located to control the temperature of the formation vessel. The refrigeration system may also comprise a vapor compression system. The vapor compression system may utilize a chlorofluorocarbon, a chlorofluoroolefin, a hydrochlorofluorocarbon, a hydrochloro-fluoroolefin, a hydrofluoroolefin, a hydrochloroolefin, a hydroolefin, a hydrocarbon, a perfluoroolefin, a perfluorocarbon, a perchloroolefin, a perchlorocarbon, and/or a halon. The refrigeration system may comprise a vapor absorption system. The vapor absorption system may utilize water, ammonia, and/or lithium bromide. The refrigeration system may comprise a gas cycle refrigeration system, such as one that utilizes air. The refrigeration system may comprise a stirling cycle refrigeration system. The stirling cycle refrigeration system may utilize helium. The stirling cycle refrigeration system may comprise a free piston stirling cooler. The refrigeration system may comprise a thermoelectric refrigeration system.

The clathrate formation system 240 of the kits may be configured to generate an internal pressure in the formation vessel of about ambient pressure to about 30 bar, an internal pressure of about 10 bar to about 30 bar, an internal pressure of about 10 bar to about 15 bar, an internal pressure of about 15 bar to about 27 bar, or an internal pressure of about 20 bar to about 27 bar. The formation vessel may be designed to leak or vent before burst. The formation vessel may further comprise a pressure relief device operably connected to the vessel and configured to reduce pressure within the vessel. Examples of a pressure relief device include, but are not limited to, a pressure relief valve and a rupture disc.

The clathrate formation system 240 of the kits may be configured to pressurize the exhaust stream in the formation vessel without substantially increasing back pressure on the exhaust ports of the engine 230. In such embodiments, the clathrate formation system 240 may comprise a valve operably connected to the formation vessel, wherein the valve is configured to control introduction of the exhaust stream to the formation vessel. The clathrate formation system 240 may be configured to sequentially introduce batches of the exhaust stream to the formation vessel. For example, introduction of the exhaust stream batches to the formation vessel may be timed to coincide with the closing of exhaust ports of the engine 230.

The clathrate formation system 240 of the kits may further comprise at least one holding vessel for temporarily storing the exhaust stream at a low pressure prior to introduction of the exhaust stream to the formation vessel for pressurizing. The low pressure may be less than the pressure at which carbon dioxide clathrates are formed in the formation vessel. The low pressure may be substantially equal to what the pressure of the exhaust stream at an exhaust port of the engine 230 would be if the clathrate formation system 240 and the exhaust storage vessel 250 were not connected to the engine 230. The low pressure may be about equal to atmospheric pressure.

The clathrate formation system 240 of the kits may comprise a compressor, wherein an inlet of the compressor is configured to be operably connected to exhaust ports of the engine 230 and an outlet of the compressor is configured to be operably connected to the formation vessel. The compressor may be configured to reduce back pressure on exhaust ports of the engine 230 to be substantially equal to what the pressure at the exhaust ports would be if the clathrate formation system 240 and exhaust storage vessel 250 were not connected to the exhaust stream. The compressor may be configured to minimize back pressure on the exhaust ports of the engine 230 while pressurizing the formation vessel. Examples of a compressor include, but are not limited to, a centrifugal compressor, a mixed-flow compressor, an axial-flow compressor, a reciprocating compressor, a rotary screw compressor, a rotary vane compressor, a scroll compressor, and a diaphragm compressor.

The formation vessel of the kits may comprise a chamber configured to form batches of carbon dioxide clathrates and/or the formation vessel may comprise a conduit operably connected to the exhaust storage vessel 250 and configured to continuously form carbon dioxide clathrates.

The clathrate formation system 240 of the kits may comprise a moveable press integrated with the formation vessel and configured to pressurize the formation vessel. For example, the moveable press may include, but is not limited to, a hydraulic press or an electromagnetically activated press.

The clathrate formation system 240 of the kits may further comprise a temperature monitoring system configured to monitor the internal temperature of the formation vessel. The temperature monitoring system may comprise a thermostat, a thermistor, a thermocouple, and/or a resistive temperature detector.

The clathrate formation system 240 of the kits may further comprise a pressure monitoring device operably connected to the formation vessel and configured to monitor an internal pressure of the formation vessel. For example, the pressure monitoring device may comprise a piezoresistive strain gauge, a capacitive sensor, an electromagnetic sensor, a piezoelectric sensor, an optical sensor, a potentiometric sensor, a thermal conductivity sensor, and/or an ionization sensor.

The clathrate formation system 240 of the kits may further comprise a pressure relief device operably connected to the formation vessel and configured to reduce pressure within the formation vessel. Examples of a pressure relief device include, but are not limited to, a pressure relief valve and a rupture disc.

The kits may further comprise a transport device operably connected to the formation vessel and the exhaust storage vessel and configured to transfer carbon dioxide clathrates from the formation vessel to the exhaust storage vessel. The transport device may be configured to transport the carbon dioxide clathrates as a slurry and/or as a solid, such as solid chunks or pellets.

The transport device may be at least partially located internally within the formation vessel. Likewise, the transport device may be at least partially external to the formation vessel. Accordingly, the transport device may be at least partially integrated into a portion of a surface, including an internal or external surface, of the formation vessel. Additionally, the transport device may be at least partially integrated into a portion of a surface, including an internal or external surface, of the exhaust storage vessel 250. Likewise, the transport device may be at least partially internal and/or external to the exhaust storage vessel 250.

The transport device may be configured for moving solid carbon dioxide clathrate. The transport device may be configured for moving carbon dioxide clathrate slurry. The transport device may be configured to be hydraulically, mechanically, and/or electrically actuated.

The transport device may comprise an extruder and/or a pump. When the transport device comprises a pump, the inlet of the pump may be operably connected to the formation vessel and an outlet of the pump may be operably connected to the exhaust storage vessel 250. Examples of the pump include, but are not limited to, a positive displacement pump, a lobe pump, an external gear pump, an internal gear pump, a peristaltic pump, a screw pump, a progressive cavity pump, a flexible impeller pump, a rotary vane pump, and a centrifugal pump. The pump may be any pump compatible with pumping a carbon dioxide clathrate slurry.

The clathrate formation system 240 of the kits may be integrated with the exhaust storage vessel 250. The clathrate formation system 240 may be configured to form carbon dioxide clathrates by regulating at least one of the temperature and the pressure of carbon dioxide and host material within the exhaust storage vessel 250 to be compatible with forming carbon dioxide clathrates. For example, the temperature may be regulated to be about 0 degrees Centigrade to about 25 degrees Centigrade, may be regulated to be about 0 degrees Centigrade to about 20 degrees Centigrade, may be regulated to be about 0 degrees Centigrade to about 15 degrees Centigrade, may be regulated to be about 0 degrees Centigrade to about 10 degrees Centigrade, or may be regulated to be about 4 degrees Centigrade to about 10 degrees Centigrade. In another example, the pressure may be regulated to be about 1 bar to about 30 bar, the pressure may be regulated to be about 10 bar to about 30 bar, the pressure may be regulated to be about 10 bar to about 15 bar, the pressure may be regulated to be about 15 bar to about 27 bar, or the pressure may be regulated to be about 20 bar to about 27 bar.

Likewise, the exhaust storage vessel 250 of the kits may be configured to agitate the carbon dioxide and the host material at a temperature and a pressure compatible with forming the carbon dioxide clathrates. For example, the exhaust storage vessel 250 may comprise a mixing element located within the exhaust storage vessel 250 and configured to agitate the carbon dioxide and the host material.

Additionally, the exhaust storage vessel 250 of the kits may comprise high-surface-area materials configured for forming carbon dioxide clathrates on the surface thereof. By way of non-limiting example, the high-surface-area material may comprise a graphene-based material, an activated carbon, and/or a metal organic framework, such as a bidentate carboxylic comprising ligand, a tridentate carboxylic comprising ligand, an azole comprising ligand, or a squaric acid comprising ligand.

The clathrate formation system 240 of the kits may further comprise a heat pipe configured and located to modulate the temperature of the exhaust storage vessel 250.

The clathrate formation system 240 of the kits may be configured to receive a continuous supply of carbon dioxide or may be configured to periodically receive a batch of carbon dioxide, while the vehicle 300 is operating. The clathrate formation system 240 may be configured to receive a variable supply of the exhaust stream based on the quantity of exhaust produced by the engine 230.

The exhaust storage vessel 250 of the kits may be configured to receive the carbon dioxide clathrates as a solid and/or as a slurry.

The exhaust storage vessel 250 of the kits may be configured for removal of stored carbon dioxide from the vehicle 300 when the vehicle 300 is otherwise not in use. The exhaust storage vessel 250 may be configured to reduce the pressure and/or increase the temperature of the exhaust storage vessel 250 sufficient to dissociate the stored carbon dioxide clathrates into carbon dioxide and host material. For example, the exhaust storage vessel 250 may be configured to sufficiently warm stored carbon dioxide clathrates so as to liquefy the host material and gasify the carbon dioxide. The exhaust storage vessel 250 may comprise an outlet configured for removal of dissociated carbon dioxide. The exhaust storage vessel 250 may also comprise an outlet configured for removal of dissociated host material.

The kits may further comprise a heating system configured and located to impart heat energy to the exhaust storage vessel 250. The heating system may be located internal or external to the vessel. For example, the heating system may be integrated into or attached to a portion of a surface of the exhaust storage vessel 250, including external or internal surfaces. The heating system may be independently configured to transfer heat energy from the coolant used to cool the engine 230. Likewise, the heating system may be configured to transfer heat energy from heat generated by the engine 230 in any fashion, such as from an exhaust stream generated by the engine 230. For example, the heating system may be configured to divert the exhaust stream from the clathrate formation system 240 and also configured to transfer heat from the diverted exhaust stream to the exhaust storage vessel 250. In that example, the heating system may be further configured to divert the exhaust stream from the exhaust storage vessel 250 and vent the exhaust stream to atmosphere. Alternatively or in addition thereto, the heating system may utilize solar energy, ambient temperatures, electric resistance heating elements, microwave heating, electromagnetic heating, and/or dielectric heating to impart heat energy.

The kits may further comprise a recycle system configured to transfer dissociated host material from the exhaust storage vessel 250 to the host material storage vessel 260. The recycle system may comprise a filter configured to clean dissociated host material prior to transfer of the dissociated host material to the host material storage vessel 260. The recycle system may comprise a transfer device configured to transfer the dissociated host material to the host material storage vessel 260.

The exhaust storage vessel 250 of the kits may be configured for removal of solid and/or slurry carbon dioxide clathrates from the exhaust storage vessel 250.

The exhaust storage vessel 250 of the kits may be configured to maintain carbon dioxide clathrates as a solid and/or slurry until removal of carbon dioxide from the vehicle 300 is intended.

The exhaust storage vessel 250 of the kits may be configured to be detachable and reattachable from the remainder of the vehicle 300. For example, the exhaust storage vessel 250 may be configured to be exchanged with a different exhaust storage vessel 250 that has been emptied of carbon dioxide clathrates.

The kits may further comprise a sensor configured to monitor the amount of carbon dioxide clathrates in the exhaust storage vessel 250. The sensor may be configured to measure a mass of the carbon dioxide clathrates. The sensor may be configured to measure a vapor pressure of carbon dioxide gas present in the exhaust storage vessel 250. The sensor may be configured to determine a concentration of carbon dioxide present in the exhaust storage vessel 250. The sensor may be configured to monitor the amount of carbon dioxide removed from the exhaust storage vessel 250.

The kits may alternatively comprise a dissociation vessel operably connected to the exhaust storage vessel 250 and configured to receive carbon dioxide clathrates from the exhaust storage vessel 250. The dissociation vessel may be configured for removal of stored carbon dioxide from the vehicle 300 when the vehicle 300 is otherwise not in use. The dissociation vessel may be configured to reduce the pressure and/or increase the temperature of the dissociation vessel sufficient to dissociate the stored carbon dioxide clathrates into carbon dioxide and host material.

The kits may further comprise a temperature monitoring system configured to monitor the internal temperature of the exhaust storage vessel 250. The temperature monitoring system may comprise a thermostat, a thermistor, a thermocouple, and/or a resistive temperature detector.

The kits may further comprise a control system configured to monitor both pressure and temperature of the exhaust storage vessel 250 and configured to regulate at least one of pressure and temperature in order to maintain the carbon dioxide clathrate within a clathrate stability range.

The exhaust storage vessel 250 of the kits may comprise insulation. The insulation may comprise at least one material configured to and compatible with maintaining desired temperatures within each vessel. Examples of such materials include, but are not limited to, calcium silicate, cellular glass, elastomeric foam, fiberglass, polyisocyanurate, polystyrene, and polyurethane. The insulation may comprise at least one vacuum layer and/or multi-layer insulation. The insulation may releasably surround at least a portion of an outer surface of the vessel and/or the insulation may be attached to at least a portion of a surface of the vessel, including an outer and/or inner surface.

The exhaust storage vessel 250 of the kits may comprise a refrigeration system configured to maintain an internal temperature of about 0 degrees Centigrade to about 25 degrees Centigrade. The exhaust storage vessel 250 may be configured to maintain an internal temperature of about 0 degrees Centigrade to about 20 degrees Centigrade. The exhaust storage vessel 250 may be configured to maintain an internal temperature of about 0 degrees Centigrade to about 15 degrees Centigrade. The exhaust storage vessel 250 may be configured to maintain an internal temperature of about 0 degrees Centigrade to about 10 degrees Centigrade, including from about 4 degrees Centigrade to about 10 degrees Centigrade.

The refrigeration system may comprise a heat pipe. The refrigeration system may also comprise a vapor compression system. The vapor compression system may utilize a chlorofluorocarbon, a chlorofluoroolefin, a hydrochlorofluorocarbon, a hydrochloro-fluoroolefin, a hydrofluoroolefin, a hydrochloroolefin, a hydroolefin, a hydrocarbon, a perfluoroolefin, a perfluorocarbon, a perchloroolefin, a perchlorocarbon, and/or a halon. The refrigeration system may comprise a vapor absorption system. The vapor absorption system may utilize water, ammonia, and/or lithium bromide. The refrigeration system may comprise a gas cycle refrigeration system, such as one that utilizes air. The refrigeration system may comprise a stirling cycle refrigeration system. The stirling cycle refrigeration system may utilize helium. The stirling cycle refrigeration system may comprise a free piston stirling cooler. The refrigeration system may comprise a thermoelectric refrigeration system.

The formation vessel, if present, and the exhaust storage vessel 250 of the kits may each be comprised of structural materials configured to and compatible with maintaining desired temperatures and pressures within each respective vessel. The structural material may comprise aluminum, brass, copper, ferretic steel, carbon steel, stainless steel, polytetrafluoroethylene (PTFE), polychlorotrifluoroethylene (PCTFE), vinylidene polyfluoride (PVDF), polyamide (PA), polypropylene (PP), nitrile rubber (NBR), chloroprene (CR), chlorofluorocarbons (FKM), and/or composite materials, including composite materials comprising carbon fibers, glass fibers, and/or aramid fibers.

The exhaust storage vessel 250 of the kits may be designed to maintain an internal pressure of about 1 bar to about 30 bar, an internal pressure of about 10 bar to about 30 bar, an internal pressure of about 10 bar to about 15 bar, an internal pressure of about 15 bar to about 27 bar, an internal pressure of about 20 bar to about 27 bar. The vessel may be designed to leak or vent before burst. The vessel may further comprise a pressure relief device operably connected to the vessel and configured to reduce pressure within the vessel. Examples of a pressure relief device include, but are not limited to, a pressure relief valve and a rupture disc.

The kits may further comprise a pressurizing device operably connected to the exhaust storage vessel 250 and configured to maintain pressure within the exhaust storage vessel 250. Examples of a pressurizing device include a moveable press integrated with the vessel, wherein the moveable press is configured to maintain pressure within the vessel. For example, the moveable press may include, but is not limited to, a hydraulic press or an electromagnetically activated press. In other examples, the pressurizing device may comprise a compressor. Examples of a compressor include, but are not limited to, a centrifugal compressor, a mixed-flow compressor, an axial-flow compressor, a reciprocating compressor, a rotary screw compressor, a rotary vane compressor, a scroll compressor, and a diaphragm compressor.

The kits may further comprise a pressure monitoring device operably connected to the exhaust storage vessel 250 and configured to monitor an internal pressure of the exhaust storage vessel 250. The pressure monitoring device may comprise a piezoresistive strain gauge, a capacitive sensor, an electromagnetic sensor, a piezoelectric sensor, an optical sensor, a potentiometric sensor, a thermal conductivity sensor, and/or an ionization sensor.

Figure 4:
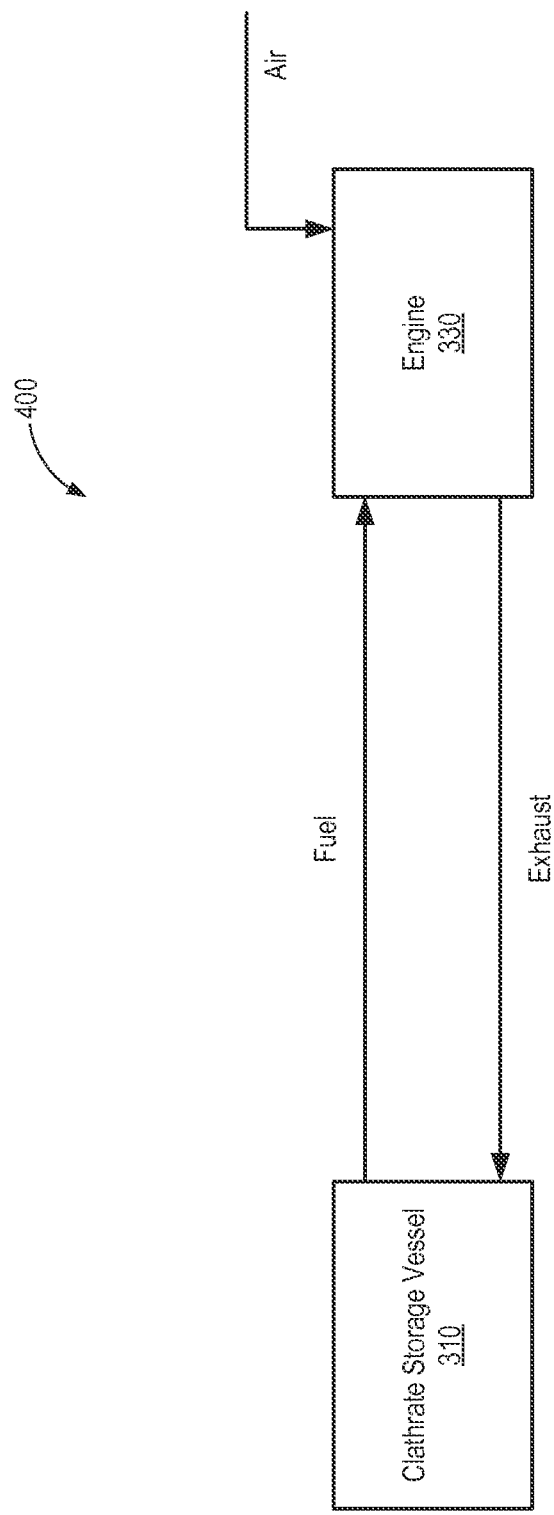
FIG. 4 illustrates another embodiment of a vehicle configured to sequester carbon dioxide emissions.
Figure 5:
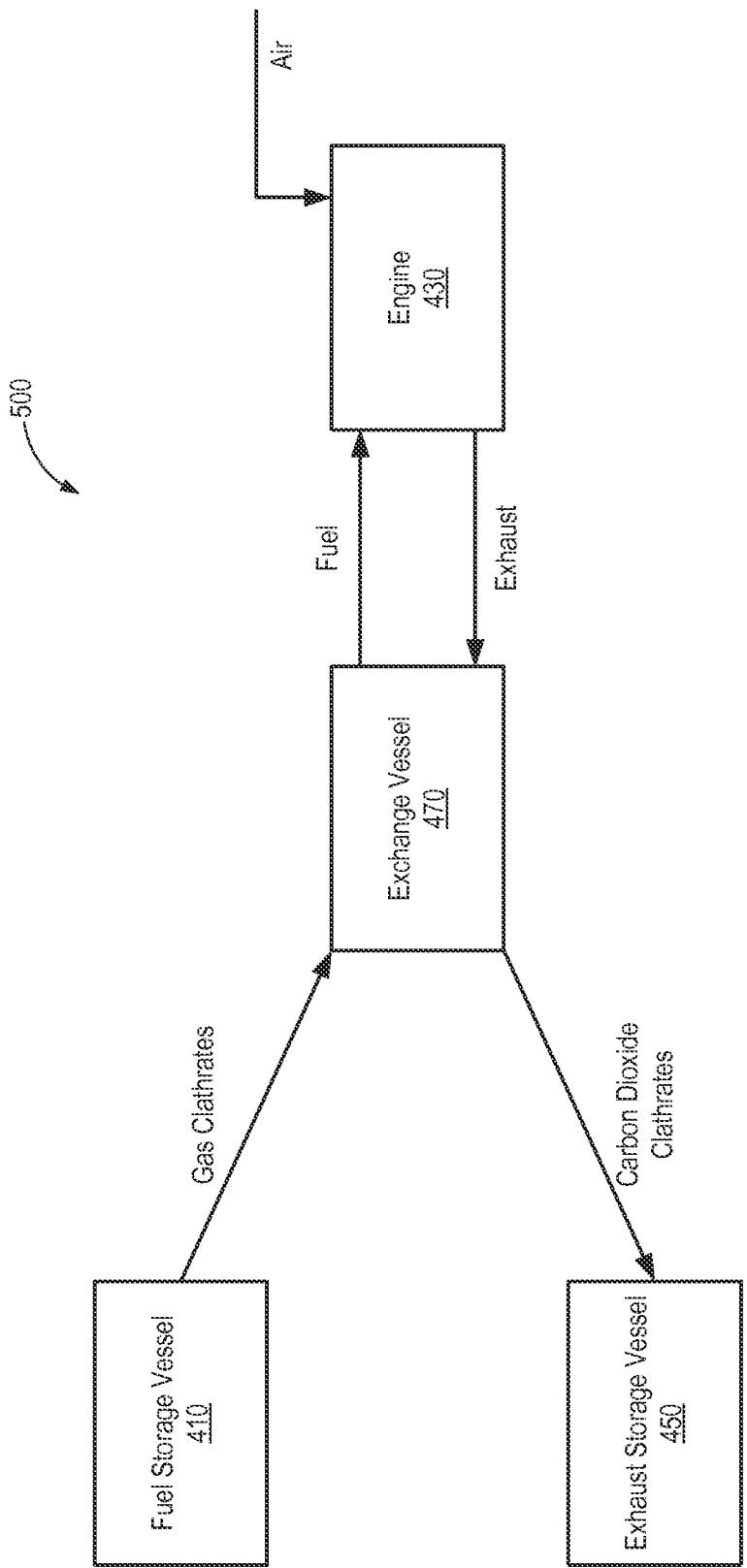
FIG. 5 illustrates another embodiment of a vehicle configured to sequester carbon dioxide emissions.

FIGS. 4 and 5 illustrate additional embodiments of a vehicle with reduced emissions. In the embodiments illustrated in FIGS. 4 and 5, the fuel is stored in gas clathrates, similar as in the embodiments illustrated in FIGS. 1 and 2. Unlike the embodiments illustrated in FIGS. 1 and 2, the gas clathrates do not undergo a dissociation process during the release of the fuel. Also unlike the embodiments illustrated in FIGS. 1-3, carbon dioxide clathrates are not formed by associating carbon dioxide with a liquid host material. Instead, in the embodiments illustrated in FIGS. 4 and 5, exhaust gas molecules, such as carbon dioxide, are exchanged with the fuel molecules, such as methane, without dissociating the clathrate structure. Without wishing to be bound by theory, it is believed that at appropriate temperatures and pressures, exhaust gas molecules, such as carbon dioxide, are thermodynamically favored over fuel molecules, such as methane, in the clathrate structure. Therefore, exhaust gas molecules, such as carbon dioxide, may diffuse into the gas clathrate structure and liberate fuel molecules, such as methane, without the host material changing phase to liquid. Therefore, although the exchange process may result in the formation of carbon dioxide clathrates, the carbon dioxide clathrates are not formed from liquid host material.

FIG. 4 illustrates a vehicle 400 with gas clathrates and carbon dioxide clathrates stored in the same vessel, clathrate storage vessel 310. Accordingly, the disclosure regarding the clathrate storage vessel 110 of the vehicle 200 may be applicable to the clathrate storage vessel 310 and vice versa.

FIG. 5 illustrates a vehicle 500 comprising a fuel storage vessel 410 and an exhaust storage vessel 450 for separately storing the gas clathrates and the carbon dioxide clathrates. Accordingly, the disclosure regarding the fuel storage vessel 10 and the exhaust storage vessel 50 of the vehicle 100 may apply to the fuel storage vessel 410 and the exhaust storage vessel 450 of the vehicle 500 and vice versa. For example, the disclosure above regarding the chemical composition of the gas clathrates, the at least one gas, and the host material of the vehicle 100 and the vehicle 200 also applies to the same for the vehicle 400 and the vehicle 500.

The vehicle 400 comprises a clathrate storage vessel 310 configured to store gas clathrates at a first temperature and a first pressure. The vehicle 400 may further comprise an engine 330 operably connected to the clathrate storage vessel 310 and configured to receive discharged at least one gas from the clathrate storage vessel 310. The vehicle 400 may further comprise an exhaust delivery system operably connected to the engine 330 and configured to introduce carbon dioxide from an exhaust stream from the engine 330 into the clathrate storage vessel 310 at a temperature and pressure substantially the same as the first temperature and pressure. The clathrate storage vessel 310 may be configured to discharge the at least one gas and store carbon dioxide clathrates.

The clathrate storage vessel 310 may be configured to control the rate of exchange of carbon dioxide for the at least one gas by regulating at least one of the temperature and the pressure of the clathrate storage vessel 310.

The clathrate storage vessel 310 may be configured to spontaneously exchange carbon dioxide for the at least one gas within the gas clathrates without substantially melting any host material of the gas clathrates, wherein gas clathrates are converted to carbon dioxide clathrates and the at least one gas is released.

The clathrate storage vessel 310 may be configured to receive the at least one gas and the host material and configured to form the gas clathrates within the clathrate storage vessel 310, similar as disclosed above for the clathrate storage vessel 110. For example, the clathrate storage vessel 310 may be configured to agitate, such as with a mixing element, the at least one gas and the host material at a temperature and a pressure compatible with forming the gas clathrates from the at least one gas and the host material. The clathrate storage vessel 310 may comprise high-surface-area materials configured for forming clathrates on the surface of the materials. The high-surface-area materials may be configured for forming gas clathrates and carbon dioxide clathrates, where formation depends upon the conditions within the clathrate storage vessel 310 and the gases present. The high-surface-area materials may be the same as disclosed above for the fuel storage vessel 10 and the clathrate storage vessel 110.

The clathrate storage vessel 310 may be configured to be detachable and reattachable from the remainder of the vehicle 400. For example, the clathrate storage vessel 310 may be configured to be exchanged with a different clathrate storage vessel 310 that has had carbon dioxide clathrates removed and been pre-filled with gas clathrates.

The clathrate storage vessel 310 may be configured to receive the gas clathrates as a slurry or a solid. The clathrate storage vessel 310 may be configured to maintain the gas clathrates as a slurry or a solid, such as solid pellets or chunks.

The clathrate storage vessel 310 may comprise insulation. The disclosure regarding insulation options for the fuel storage vessel 10 and the clathrate storage vessel 110 also apply to the insulation options for the clathrate storage vessel 310.

Likewise, the clathrate storage vessel 310 may comprise a refrigeration system configured to maintain an internal temperature of the clathrate storage vessel 310 within a set range. The disclosure regarding refrigeration system options and set range options for the fuel storage vessel 10 and the clathrate storage vessel 110 also applies to refrigeration system options and set range options for the clathrate storage vessel 310. Similarly, the structural material options disclosed for the fuel storage vessel 10 and the clathrate storage vessel 110 also apply to the structural material options for the clathrate storage vessel 310.

The vehicle 400 may further comprise a sensor configured to monitor the amount of gas clathrates and/or carbon dioxide clathrates in the clathrate storage vessel 310. The disclosure regarding sensor options for the vehicle 100 and the vehicle 200 also apply to the sensor options for the vehicle 400.

The clathrate storage vessel 310 may be designed to maintain an internal pressure of about 1 bar to about 30 bar, including the narrower ranges disclosed for the fuel storage vessel 10 and the clathrate storage vessel 110. The clathrate storage vessel 310 may be designed to leak or vent before burst. The clathrate storage vessel 310 may be operably connected to a pressure monitoring device, a pressurizing device, and/or a pressure relief device. The disclosure regarding a pressure monitoring device, a pressurizing device, and/or a pressure relief device options for the vehicle 100 and the vehicle 200 also applies to pressure monitoring device, pressurizing device, and/or pressure relief device options for the vehicle 400.

The vehicle 400 may further comprise a heating system configured and located to impart heat energy to the clathrate storage vessel 310. The vehicle 400 may further comprise a temperature monitoring system configured to monitor the internal temperature of the clathrate storage vessel 310. The vehicle 400 may further comprise an emergency cooling system configured to rapidly cool the clathrate storage vessel 310. The vehicle 400 may further comprise a control system configured to monitor both pressure and temperature and to regulate at least one of the pressure and temperature in order to maintain clathrate within a clathrate stability range. The disclosure regarding a heating system, a temperature monitoring system, an emergency cooling system, and a control system for the vehicle 100 and the vehicle 200 and their respective vessels also applies to the same for the vehicle 400 and the clathrate storage vessel 310.

The clathrate storage vessel 310 may comprise a conduit configured as a plug flow reactor and/or a chamber configured as a batch reactor.

The clathrate storage vessel 310 may comprise a gas outlet configured for removing at least one gas from the clathrate storage vessel 310. The clathrate storage vessel 310 may further comprise a control valve operably connected to the gas outlet and to the engine 330, wherein the control valve is configured to control release of stored at least one gas from the clathrate storage vessel 310. The clathrate storage vessel 310 may further comprise a metering system configured to control introduction of stored at least one gas to the engine 330. The metering system may comprise a gas flow meter configured to measure the flow rate of the stored at least one gas released from the clathrate storage vessel 310. The vehicle 400 may further comprise a transport device configured to transport the at least one gas from the clathrate storage vessel 310 to the engine 330, wherein the transport device is operably connected to the clathrate storage vessel 310 and to the engine 330. The transport device may be configured to control the transport of the at least one gas based on fuel requirements of the engine 330. The transport device may comprise a compressor, including, but not limited to, a compressor exemplified in the disclosure regarding the separation system 20 and/or the separation system 120.

The vehicle 400 may further comprise a gas storage vessel configured to store the at least one gas removed from the clathrate storage vessel 310, wherein the gas storage vessel is operably connected to the clathrate storage vessel 310 and is operably connected to the engine 330. In such embodiments, the vehicle 400 may further comprise a control valve operably connected to the gas storage vessel and to the engine 330, wherein the control valve is configured to control release of stored at least one gas from the gas storage vessel. The vehicle 400 may further comprise a metering system configured to control introduction of stored at least one gas to the engine 330. The metering system may comprise a gas flow meter configured to measure the flow rate of the stored at least one gas released from the gas storage vessel. The vehicle 400 may further comprise a transport device configured to transport the at least one gas from the gas storage vessel to the engine 330, wherein the transport device is operably connected to the gas storage vessel and to the engine 330. The transport device may be configured to control the transport of the at least one gas based on fuel requirements of the engine 330. The transport device may comprise a compressor, including, but not limited to, a compressor exemplified in the disclosure regarding the separation system 20 and/or the separation system 120.

The vehicle 400 may further comprise a control valve operably connected to the clathrate storage vessel 310 and to the gas storage vessel, wherein the control valve is configured to control release of stored at least one gas from the clathrate storage vessel 310. The vehicle 400 may further comprise a metering system configured to control introduction of stored at least one gas from the clathrate storage vessel 310 to the gas storage vessel. The metering system may comprise a gas flow meter configured to measure the flow rate of the stored at least one gas released from the clathrate storage vessel 310. The vehicle 400 may further comprise a transport device configured to transport the at least one gas from the clathrate storage vessel 310 to the gas storage vessel, wherein the transport device is operably connected to the clathrate storage vessel 310 and to the gas storage vessel. The transport device may be configured to control the transport of the at least one gas based on fuel requirements of the engine 330. The transport device may comprise a compressor, including, but not limited to, a compressor exemplified in the disclosure regarding the separation system 20 and/or the separation system 120.

The vehicle 400 may further comprise a cooling device configured to reduce the temperature of the at least one gas prior to introduction of the at least one gas to the engine 330. The cooling device may comprise a heat exchanger. The heat exchanger may be configured to be cooled by ambient air. The heat exchanger may be configured to be cooled by a coolant also used to cool the engine 330. The cooling device may comprise a refrigerated coil configured to cool the at least one gas.

The vehicle 400 may comprise a moisture-removal system configured to remove water from the at least one gas prior to introduction of the at least one gas to the engine 330.

The moisture-removal system may comprise, by way of non-limiting example, a dehumidifier, a dryer, or a molecular sieve column.

In some embodiments of the vehicle 400 substantially all of the carbon dioxide in the exhaust stream is exchanged for the at least one gas. Therefore, substantially all of the carbon dioxide is captured in carbon dioxide clathrates.

In some embodiments of the vehicle 400 the exhaust stream further comprises nitrogen. The clathrate storage vessel 310 may be configured to exchange nitrogen for at least one gas within the gas clathrates without substantially melting any host material of the gas clathrates, wherein gas clathrates are converted to nitrogen clathrates and the at least one gas is released. The clathrate storage vessel 310 may be configured to spontaneously exchange nitrogen for at least one gas within the gas clathrates.

The vehicle 400 may comprise a filter configured to separate non-carbon products from the exhaust stream.

The vehicle 400 may comprise a catalytic converter configured to convert carbon monoxide and uncombusted hydrocarbons to carbon dioxide. Examples of partially combusted hydrocarbons include hydrocarbons with one, two, or three carbons.

The clathrate storage vessel 310 may also be configured to exchange carbon monoxide from the exhaust stream for at least one gas within the gas clathrates. Likewise, the clathrate storage vessel 310 may be configured to exchange partially combusted hydrocarbon from the exhaust stream for at least one gas within the gas clathrates.

The exhaust delivery system may comprise a cooling system configured to cool the exhaust stream. The cooling system may comprise a heat exchanger configured to transfer heat from the exhaust stream to an external heat sink, such as ambient air.

The exhaust delivery system may comprise a pressurization system. The pressurization system may comprise a compressor. Examples of a compressor include, but are not limited to, a centrifugal compressor, a mixed-flow compressor, an axial-flow compressor, a reciprocating compressor, a rotary screw compressor, a rotary vane compressor, a scroll compressor, and a diaphragm compressor.

The clathrate storage vessel 310 may be configured to receive a continuous supply of carbon dioxide while the vehicle 400 is operating. The clathrate storage vessel 310 may be configured to periodically receive a batch of carbon dioxide while the vehicle 400 is operating. The clathrate storage vessel 310 may be configured to receive a variable supply of the exhaust stream based on the quantity of exhaust produced by the engine 330. The exhaust stream including the carbon dioxide may be introduced to the clathrate storage vessel 310 with the carbon dioxide present in the exhaust stream. The carbon dioxide may be removed from the exhaust stream prior to introduction of the carbon dioxide to the clathrate storage vessel 310.

The vehicle 400 may further comprise a carbon dioxide removal system configured to separate carbon dioxide from the exhaust stream and deliver the removed carbon dioxide to the clathrate storage vessel 310. The carbon dioxide removal system may comprise a removal vessel operably connected to the exhaust stream and the clathrate storage vessel 310.

The removal vessel may be configured to contact the exhaust stream with at least one separation fluid. The separation fluid may comprise a chemical solvent. The separation fluid may comprise a physical solvent. Examples of the separation fluid include fluids comprising an alkanolamine, a monoethanolamine, a diethanolamine, a methyldiethanolamine, a triethanolamine, and/or piperazine. The separation fluid may be a liquid. The separation fluid may comprise host material.

The vehicle 400 may further comprise a regeneration system configured to separate carbon dioxide from the separation fluid and operably coupled to the removal vessel. The regeneration system may comprise a regeneration vessel operably coupled to the removal vessel and configured to heat the separation fluid. The regeneration vessel may be configured to operate on a batch basis. The regeneration vessel may be configured to operate on a continuous basis. The regeneration vessel may comprise a tank. The regeneration vessel may comprise a conduit.

In some embodiments, the removal vessel is configured to contact the exhaust stream with an alkali carbonate, such as sodium carbonate and/or potassium carbonate. In such embodiments, the vehicle 400 may further comprise a regeneration system configured to separate carbon dioxide from the alkali carbonate and operably coupled to the removal vessel. The regeneration system may comprise a regeneration vessel operably coupled to the removal vessel and configured to heat the alkali carbonate. The regeneration vessel may be configured to operate on a batch basis or on a continuous basis. The regeneration vessel may comprise a tank and/or a conduit.

In some embodiments, the removal vessel comprises a membrane configured to separate carbon dioxide from the exhaust stream. The membrane may comprise a polymer, such as a cellulose acetate polymer, a polyimide polymer, a polyamide polymer, a polycarbonate polymer, a polysulfone polymer, and/or a polyetherimide polymer. The membrane may comprise flat sheets. The flat sheets may be spiral-wound. The membrane may comprise hollow fibers.

The removal vessel may be configured to operate on a batch basis. For example, the removal vessel may comprise a tank. The removal vessel may be configured to operate on a continuous basis. For example, the removal vessel may comprise a conduit.

The clathrate storage vessel 310 may be configured for removal of stored carbon dioxide from the vehicle 400 when the vehicle 400 is otherwise not in use. The clathrate storage vessel 310 may be configured to reduce the pressure and/or increase the temperature of the clathrate storage vessel 310 sufficient to dissociate the stored carbon dioxide clathrates into carbon dioxide and host material. For example, the clathrate storage vessel 310 may be configured to sufficiently warm stored carbon dioxide clathrates so as to liquefy the host material and gasify the carbon dioxide. The clathrate storage vessel 310 may comprise an outlet configured for removal of dissociated carbon dioxide. The clathrate storage vessel 310 may also comprise an outlet configured for removal of dissociated host material. The vehicle 400 may further comprise a recycle system configured to reuse host material dissociated from the carbon dioxide clathrates. For example, the host material may be reused in the formation of gas clathrates during refueling of the clathrate storage vessel 310.

The clathrate storage vessel 310 may be configured for removal of solid and/or slurry carbon dioxide clathrates from the clathrate storage vessel 310.

The clathrate storage vessel 310 may be configured to maintain carbon dioxide clathrates as a solid and/or slurry until removal of carbon dioxide from the vehicle 400 is intended.

The vehicle 400 may comprise a dissociation vessel operably connected to the clathrate storage vessel 310 and configured to receive carbon dioxide clathrates from the clathrate storage vessel 310. The dissociation vessel may be configured for removal of stored carbon dioxide from the vehicle 400 when the vehicle 400 is otherwise not in use. The dissociation vessel may be configured to reduce the pressure and/or increase the temperature of the dissociation vessel sufficient to dissociate the stored carbon dioxide clathrates into carbon dioxide and host material.

The vehicle 500 comprises a fuel storage vessel 410 configured to store gas clathrates and an exchange vessel 470 operably connected to the fuel storage vessel 410 and configured to receive the gas clathrates. The exchange vessel 470 may be configured to maintain the gas clathrates at a first temperature and a first pressure and may be configured to exchange carbon dioxide for at least one gas within the gas clathrates. The exchange vessel 470 may be configured to discharge the at least one gas and also discharge the carbon dioxide clathrates. The vehicle 500 may further comprise an engine 430 operably connected to the exchange vessel 470 and configured to receive discharged gas from the exchange vessel 470.

The vehicle 500 may further comprise an exhaust delivery system operably connected to the engine 430 and configured to introduce carbon dioxide from an exhaust stream from the engine 430 into the exchange vessel 470 at a temperature and pressure substantially the same as the first temperature and pressure. The vehicle 500 may further comprise an exhaust storage vessel 450 configured to receive the carbon dioxide clathrates from the exchange vessel 470.

The carbon dioxide may be removed from the exhaust stream prior to introduction of the carbon dioxide to the exchange vessel 470. The exhaust stream including the carbon dioxide may be introduced to the exchange vessel 470 with the carbon dioxide present in the exhaust stream.

The exchange vessel 470 may be configured to control the rate of exchange of carbon dioxide for the at least one gas by regulating at least one of the temperature and the pressure of the exchange vessel 470.

The exchange vessel 470 may be configured to spontaneously exchange carbon dioxide for the at least one gas within the gas clathrates without substantially melting any host material of the gas clathrates, wherein gas clathrates are converted to carbon dioxide clathrates and the at least one gas is released.

The fuel storage vessel 410 may be configured to receive the at least one gas and the host material and configured to form the gas clathrates within the fuel storage vessel 410, similar as disclosed above for the clathrate storage vessel 110. For example, the fuel storage vessel 410 may be configured to agitate, such as with a mixing element, the at least one gas and the host material at a temperature and a pressure compatible with forming the gas clathrates from the at least one gas and the host material. The fuel storage vessel 410 may comprise high-surface-area materials configured for forming clathrates on the surface of the materials. The high-surface-area materials may be configured for forming gas clathrates and carbon dioxide clathrates, where formation depends upon the conditions within the fuel storage vessel 410 and the gases present. The high-surface-area materials may be the same as disclosed above for the fuel storage vessel 10 and the clathrate storage vessel 110.

The fuel storage vessel 410 may be configured to be detachable and reattachable from the remainder of the vehicle 500. For example, the fuel storage vessel 410 may be configured to be exchanged with a different fuel storage vessel 410 that has been pre-filled with gas clathrates.

The fuel storage vessel 410 may be configured to receive the gas clathrates as a slurry or a solid. The fuel storage vessel 410 may be configured to maintain the gas clathrates as a slurry or a solid, such as solid pellets or chunks.

The fuel storage vessel 410 may comprise insulation. The disclosure regarding insulation options for the fuel storage vessel 10 and the clathrate storage vessel 110 also apply to the insulation options for the fuel storage vessel 410.

Likewise, the fuel storage vessel 410 may comprise a refrigeration system configured to maintain an internal temperature of the fuel storage vessel 410 within a set range. The disclosure regarding refrigeration system options and set range options for the fuel storage vessel 10 and the clathrate storage vessel 110 also applies to refrigeration system options and set range options for the fuel storage vessel 410. Similarly, the structural material options disclosed for the fuel storage vessel 10 and the clathrate storage vessel 110 also apply to the structural material options for the fuel storage vessel 410.

The vehicle 400 may further comprise a sensor configured to monitor the amount of gas clathrates in the fuel storage vessel 410. The disclosure regarding sensor options for the vehicle 100 and the vehicle 200 also apply to the sensor options for the vehicle 400.

The fuel storage vessel 410 may be designed to maintain an internal pressure of about 1 bar to about 30 bar, including the narrower ranges disclosed for the fuel storage vessel 10 and the clathrate storage vessel 110. The fuel storage vessel 410 may be designed to leak or vent before burst. The fuel storage vessel 410 may be operably connected to a pressure monitoring device, a pressurizing device, and/or a pressure relief device. The disclosure regarding a pressure monitoring device, a pressurizing device, and/or a pressure relief device options for the vehicle 100 and the vehicle 200 also applies to pressure monitoring device, pressurizing device, and/or pressure relief device options for the vehicle 500.

The vehicle 500 may further comprise a heating system configured and located to impart heat energy to the fuel storage vessel 410. The vehicle 500 may further comprise a temperature monitoring system configured to monitor the internal temperature of the fuel storage vessel 410. The vehicle 500 may further comprise an emergency cooling system configured to rapidly cool the fuel storage vessel 410. The vehicle 500 may further comprise a control system configured to monitor both pressure and temperature and to regulate at least one of the pressure and temperature in order to maintain the gas clathrate within a clathrate stability range. The disclosure regarding a heating system, a temperature monitoring system, an emergency cooling system, and a control system for the vehicle 100 and the vehicle 200 and their respective vessels also applies to the same for the vehicle 500 and the fuel storage vessel 410.

The vehicle 500 may further comprise a valve operably connected between the exchange vessel 470 and the fuel storage vessel 410. The valve may comprise a passive valve, such as, for example, a ball check valve, a diaphragm check valve, a swing check valve, a stop check valve, or a lift check valve. The valve may comprise an active valve, such as, for example, a globe valve, a butterfly valve, a gate valve, or a ball valve.

The vehicle 500 may further comprise a transport device operably connected to the fuel storage vessel 410 and operably connected to the exchange vessel 470 and configured to transfer gas clathrates from the fuel storage vessel 410 to the exchange vessel 470. The transport device may be configured to transport the gas clathrates as a slurry and/or as a solid, such as solid chunks or pellets.

The transport device may be at least partially located internally within the fuel storage vessel 410. Likewise, the transport device may be at least partially external to the fuel storage vessel 410. Accordingly, the transport device may be at least partially integrated into a portion of a surface, including an internal or external surface, of the fuel storage vessel 410. Additionally, the transport device may be at least partially integrated into a portion of a surface, including an internal or external surface, of the exchange vessel 470. Likewise, the transport device may be at least partially internal and/or external to the separation vessel.

The transport device may be configured for moving solid gas clathrate. The transport device may be configured for moving gas clathrate slurry. The transport device may be configured to be hydraulically, mechanically, and/or electrically actuated.

The transport device may comprise an extruder and/or a pump. When the transport device comprises a pump, the inlet of the pump may be operably connected to the fuel storage vessel 410 and an outlet of the pump may be operably connected to the exchange vessel 470. Examples of the pump include, but are not limited to, a positive displacement pump, a lobe pump, an external gear pump, an internal gear pump, a peristaltic pump, a screw pump, a progressive cavity pump, a flexible impeller pump, a rotary vane pump, and a centrifugal pump. The pump may be any pump compatible with pumping a gas clathrate slurry.

The exchange vessel 470 may comprise insulation configured to maintain an internal temperature of the exchange vessel 470. The insulation may comprise at least one material configured to and compatible with maintaining refrigerated temperatures within the separation vessel. Examples of such materials include, but are not limited to, calcium silicate, cellular glass, elastomeric foam, fiberglass, polyisocyanurate, polystyrene, and polyurethane. The insulation may comprise at least one vacuum layer and/or multi-layer insulation. The insulation may be attached to at least a portion of a surface of the vessel, including an outer and/or inner surface.

The vehicle 500 may further comprise a refrigeration system configured to maintain an internal temperature of the exchange vessel 470 within a set range. The set range may be from about 0 degrees Centigrade to about 25 degrees Centigrade, including from about 0 degrees Centigrade to about 20 degrees Centigrade, including from about 0 degrees Centigrade to about 15 degrees Centigrade, including from about 0 degrees Centigrade to about 10 degrees Centigrade, and including from about 4 degrees Centigrade to about 10 degrees Centigrade.

The refrigeration system may comprise a heat pipe configured and located to control the temperature of the exchange vessel 470. The refrigeration system may also comprise a vapor compression system. The vapor compression system may utilize a chlorofluorocarbon, a chlorofluoroolefin, a hydrochlorofluorocarbon, a hydrochloro-fluoroolefin, a hydrofluoroolefin, a hydrochloroolefin, a hydroolefin, a hydrocarbon, a perfluoroolefin, a perfluorocarbon, a perchloroolefin, a perchlorocarbon, and/or a halon. The refrigeration system may comprise a vapor absorption system. The vapor absorption system may utilize water, ammonia, and/or lithium bromide. The refrigeration system may comprise a gas cycle refrigeration system, such as one that utilizes air. The refrigeration system may comprise a stirling cycle refrigeration system. The stirling cycle refrigeration system may utilize helium. The stirling cycle refrigeration system may comprise a free piston stirling cooler. The refrigeration system may comprise a thermoelectric refrigeration system.

The exchange vessel 470 may further comprise a heat pipe configured and located to control the temperature of the exchange vessel 470 separate from a refrigeration system.

The vehicle 500 may comprise a heating system configured and located to impart heat energy to the exchange vessel 470. The heating system may be located internal or external to the vessel. For example, the heating system may be integrated into or attached to a portion of a surface of the separation vessel, including external or internal surfaces. The heating system may be independently configured to transfer heat energy from the coolant used to cool the engine 430. Likewise, the heating system may be configured to transfer heat energy from heat generated by the engine 430 in any fashion, such as from an exhaust stream generated by the engine 430. Alternatively or in addition thereto, the heating system may utilize solar energy, ambient temperatures, electric resistance heating elements, microwave heating, electromagnetic heating, and/or dielectric heating to impart heat energy.

The exchange vessel 470 may be designed to leak or vent before burst.

The exchange vessel 470 may further comprise a pressure monitoring device operably connected to the exchange vessel 470 and configured to monitor an internal pressure of the exchange vessel 470. The pressure monitoring device may independently comprise a piezoresistive strain gauge, a capacitive sensor, an electromagnetic sensor, a piezoelectric sensor, an optical sensor, a potentiometric sensor, a thermal conductivity sensor, and/or an ionization sensor.

The exchange vessel 470 may further comprise a pressure relief device operably connected to the exchange vessel 470 and configured to reduce pressure within the exchange vessel 470. Examples of a pressure relief device include, but are not limited to, a pressure relief valve and a rupture disc.

The exchange vessel 470 may further comprise a pressurizing device operably connected to the separation vessel and configured to maintain pressure within the separation vessel. Examples of a pressurizing device include a moveable press integrated with the vessel, wherein the moveable press is configured to maintain pressure within the vessel. For example, the moveable press may include, but is not limited to, a hydraulic press or an electromagnetically activated press. In other examples, the pressurizing device may comprise a compressor. Examples of a compressor include, but are not limited to, a centrifugal compressor, a mixed-flow compressor, an axial-flow compressor, a reciprocating compressor, a rotary screw compressor, a rotary vane compressor, a scroll compressor, and a diaphragm compressor.

The exchange vessel 470 may further comprise a temperature monitoring system configured to monitor the internal temperature of the separation vessel. The temperature monitoring system may comprise a thermostat, a thermistor, a thermocouple, and/or a resistive temperature detector.

The vehicle 500 may further comprise an emergency cooling system configured to rapidly cool the separation vessel.

The vehicle 500 may further comprise a control system configured to monitor both pressure and temperature of the exchange vessel 470 and configured to regulate at least one of pressure and temperature in order to maintain the gas clathrate and carbon dioxide clathrate within a clathrate stability range.

The exchange vessel 470 may comprise a conduit configured as a plug flow reactor and/or a chamber configured as a batch reactor.

The exchange vessel 470 may comprise a gas outlet configured for removing at least one gas from the exchange vessel 470. The exchange vessel 470 may further comprise a control valve operably connected to the gas outlet and to the engine 430, wherein the control valve is configured to control release of stored at least one gas from the exchange vessel 470. The exchange vessel 470 may further comprise a metering system configured to control introduction of stored at least one gas to the engine 430. The metering system may comprise a gas flow meter configured to measure the flow rate of the stored at least one gas released from the exchange vessel 470. The vehicle 500 may further comprise a transport device configured to transport the at least one gas from the exchange vessel 470 to the engine 430, wherein the transport device is operably connected to the exchange vessel 470 and to the engine 430. The transport device may be configured to control the transport of the at least one gas based on fuel requirements of the engine 430. The transport device may comprise a compressor, including, but not limited to, a compressor exemplified in the disclosure regarding the separation system 20 and/or the separation system 120.

The vehicle 500 may further comprise a gas storage vessel configured to store the at least one gas removed from the exchange vessel 470, wherein the gas storage vessel is operably connected to the exchange vessel 470 and is operably connected to the engine 430. In such embodiments, the vehicle 500 may further comprise a control valve operably connected to the gas storage vessel and to the engine 430, wherein the control valve is configured to control release of stored at least one gas from the gas storage vessel. The vehicle 500 may further comprise a metering system configured to control introduction of stored at least one gas to the engine 430. The metering system may comprise a gas flow meter configured to measure the flow rate of the stored at least one gas released from the gas storage vessel. The vehicle 500 may further comprise a transport device configured to transport the at least one gas from the gas storage vessel to the engine 430, wherein the transport device is operably connected to the gas storage vessel and to the engine 430. The transport device may be configured to control the transport of the at least one gas based on fuel requirements of the engine 430. The transport device may comprise a compressor, including, but not limited to, a compressor exemplified in the disclosure regarding the separation system 20 and/or the separation system 120.

The vehicle 500 may further comprise a control valve operably connected to the exchange vessel 470 and to the gas storage vessel, wherein the control valve is configured to control release of stored at least one gas from the exchange vessel 470. The vehicle 500 may further comprise a metering system configured to control introduction of stored at least one gas from the exchange vessel 470 to the gas storage vessel. The metering system may comprise a gas flow meter configured to measure the flow rate of the stored at least one gas released from the exchange vessel 470. The vehicle 500 may further comprise a transport device configured to transport the at least one gas from the exchange vessel 470 to the gas storage vessel, wherein the transport device is operably connected to the exchange vessel 470 and to the gas storage vessel. The transport device may be configured to control the transport of the at least one gas based on fuel requirements of the engine 430. The transport device may comprise a compressor, including, but not limited to, a compressor exemplified in the disclosure regarding the separation system 20 and/or the separation system 120.

The vehicle 500 may further comprise a cooling device configured to reduce the temperature of the at least one gas prior to introduction of the at least one gas to the engine 430.

The cooling device may comprise a heat exchanger. The heat exchanger may be configured to be cooled by ambient air. The heat exchanger may be configured to be cooled by a coolant also used to cool the engine 430. The cooling device may comprise a refrigerated coil configured to cool the at least one gas.

The vehicle 500 may comprise a moisture-removal system configured to remove water from the at least one gas prior to introduction of the at least one gas to the engine 430. The moisture-removal system may comprise, by way of non-limiting example, a dehumidifier, a dryer, or a molecular sieve column.

The exchange vessel 470 may be configured to receive a continuous supply of gas clathrates while the vehicle 500 is operating. The exchange vessel 470 may be configured to periodically receive a batch of gas clathrates while the vehicle 500 is operating. The exchange vessel may be configured to receive a variable supply of gas clathrates based on fuel requirements of the engine 430.

In some embodiments of the vehicle 500 substantially all of the carbon dioxide in the exhaust stream is exchanged for the at least one gas. Therefore, substantially all of the carbon dioxide is captured in carbon dioxide clathrates.

In some embodiments of the vehicle 500 the exhaust stream further comprises nitrogen. The exchange vessel 470 may be configured to exchange nitrogen for at least one gas within the gas clathrates without substantially melting any host material of the gas clathrates, wherein gas clathrates are converted to nitrogen clathrates and the at least one gas is released. The exchange vessel 470 may be configured to spontaneously exchange nitrogen for at least one gas within the gas clathrates. The exhaust storage vessel 450 may be configured to store the nitrogen clathrates.

The vehicle 500 may comprise a filter configured to separate non-carbon products from the exhaust stream.

The vehicle 500 may comprise a catalytic converter configured to convert carbon monoxide and uncombusted hydrocarbons to carbon dioxide. Examples of partially combusted hydrocarbons include hydrocarbons with one, two, or three carbons.

The exchange vessel 470 may also be configured to exchange carbon monoxide from the exhaust stream for at least one gas within the gas clathrates. Likewise, the exchange vessel 470 may be configured to exchange partially combusted hydrocarbon from the exhaust stream for at least one gas within the gas clathrates.

The vehicle 500 may further comprise a carbon dioxide removal system configured to separate carbon dioxide from the exhaust stream and deliver the removed carbon dioxide to the exchange vessel 470. The carbon dioxide removal system may comprise a removal vessel operably connected to the exhaust stream and the exchange vessel 470.

The removal vessel may be configured to contact the exhaust stream with at least one separation fluid. The separation fluid may comprise a chemical solvent. The separation fluid may comprise a physical solvent. Examples of the separation fluid include fluids comprising an alkanolamine, a monoethanolamine, a diethanolamine, a methyldiethanolamine, a triethanolamine, and/or piperazine. The separation fluid may be a liquid. The separation fluid may comprise host material.

The vehicle 500 may further comprise a regeneration system configured to separate carbon dioxide from the separation fluid and operably coupled to the removal vessel. The regeneration system may comprise a regeneration vessel operably coupled to the removal vessel and configured to heat the separation fluid. The regeneration vessel may be configured to operate on a batch basis. The regeneration vessel may be configured to operate on a continuous basis. The regeneration vessel may comprise a tank. The regeneration vessel may comprise a conduit.

In some embodiments, the removal vessel is configured to contact the exhaust stream with an alkali carbonate, such as sodium carbonate and/or potassium carbonate. In such embodiments, the vehicle 500 may further comprise a regeneration system configured to separate carbon dioxide from the alkali carbonate and operably coupled to the removal vessel. The regeneration system may comprise a regeneration vessel operably coupled to the removal vessel and configured to heat the alkali carbonate. The regeneration vessel may be configured to operate on a batch basis or on a continuous basis. The regeneration vessel may comprise a tank and/or a conduit.

In some embodiments, the removal vessel comprises a membrane configured to separate carbon dioxide from the exhaust stream. The membrane may comprise a polymer, such as a cellulose acetate polymer, a polyimide polymer, a polyamide polymer, a polycarbonate polymer, a polysulfone polymer, and/or a polyetherimide polymer. The membrane may comprise flat sheets. The flat sheets may be spiral-wound. The membrane may comprise hollow fibers.

The removal vessel may be configured to operate on a batch basis. For example, the removal vessel may comprise a tank. The removal vessel may be configured to operate on a continuous basis. For example, the removal vessel may comprise a conduit.

The exchange vessel 470 may be configured to receive a continuous supply of carbon dioxide while the vehicle 500 is operating. The exchange vessel 470 may be configured to periodically receive a batch of carbon dioxide while the vehicle 500 is operating. The exchange vessel 470 may be configured to receive a variable supply of the exhaust stream based on the quantity of exhaust produced by the engine 430.

The exhaust delivery system may comprise a cooling system configured to cool the exhaust stream. The cooling system may comprise a heat exchanger configured to transfer heat from the exhaust stream to an external heat sink, such as ambient air.

The exhaust delivery system may comprise a pressurization system. The pressurization system may comprise a compressor. Examples of a compressor include, but are not limited to, a centrifugal compressor, a mixed-flow compressor, an axial-flow compressor, a reciprocating compressor, a rotary screw compressor, a rotary vane compressor, a scroll compressor, and a diaphragm compressor.

The vehicle 500 may further comprise a transport device operably connected to the exchange vessel 470 and the exhaust storage vessel 450 and configured to transfer carbon dioxide clathrates from the exchange vessel 470 to the exhaust storage vessel 450. The transport device may be configured to transport the carbon dioxide clathrates as a slurry and/or as a solid, such as solid chunks or pellets.

The transport device may be at least partially located internally within the exchange vessel 470. Likewise, the transport device may be at least partially external to the exchange vessel 470. Accordingly, the transport device may be at least partially integrated into a portion of a surface, including an internal or external surface, of the exchange vessel 470. Additionally, the transport device may be at least partially integrated into a portion of a surface, including an internal or external surface, of the exhaust storage vessel 450. Likewise, the transport device may be at least partially internal and/or external to the exhaust storage vessel 450.

The transport device may be configured for moving solid carbon dioxide clathrate. The transport device may be configured for moving carbon dioxide clathrate slurry. The transport device may be configured to be hydraulically, mechanically, and/or electrically actuated.

The transport device may comprise an extruder and/or a pump. When the transport device comprises a pump, the inlet of the pump may be operably connected to the exchange vessel 470 and an outlet of the pump may be operably connected to the exhaust storage vessel 450. Examples of the pump include, but are not limited to, a positive displacement pump, a lobe pump, an external gear pump, an internal gear pump, a peristaltic pump, a screw pump, a progressive cavity pump, a flexible impeller pump, a rotary vane pump, and a centrifugal pump. The pump may be any pump compatible with pumping a carbon dioxide clathrate slurry.

The exhaust storage vessel 450 may be configured for removal of stored carbon dioxide from the vehicle 500 when the vehicle 500 is otherwise not in use. The exhaust storage vessel 450 may be configured to reduce the pressure and/or increase the temperature of the exhaust storage vessel 450 sufficient to dissociate the stored carbon dioxide clathrates into carbon dioxide and host material. For example, the exhaust storage vessel 450 may be configured to sufficiently warm stored carbon dioxide clathrates so as to liquefy the host material and gasify the carbon dioxide. The exhaust storage vessel 450 may comprise an outlet configured for removal of dissociated carbon dioxide. The exhaust storage vessel 450 may also comprise an outlet configured for removal of dissociated host material. The vehicle 500 may further comprise a recycle system configured to reuse host material dissociated from the carbon dioxide clathrates. For example, the host material may be reused in the formation of gas clathrates in the fuel storage vessel 410.

The vehicle 500 may further comprise a heating system configured and located to impart heat energy to the exhaust storage vessel 450. The heating system may be located internal or external to the vessel. For example, the heating system may be integrated into or attached to a portion of a surface of the exhaust storage vessel 450, including external or internal surfaces. The heating system may be independently configured to transfer heat energy from the coolant used to cool the engine 430. Likewise, the heating system may be configured to transfer heat energy from heat generated by the engine 430 in any fashion, such as from an exhaust stream generated by the engine 430. Alternatively or in addition thereto, the heating system may utilize solar energy, ambient temperatures, electric resistance heating elements, microwave heating, electromagnetic heating, and/or dielectric heating to impart heat energy.

The exhaust storage vessel 450 may be configured for removal of solid and/or slurry carbon dioxide clathrates from the exhaust storage vessel 450.

The exhaust storage vessel 450 may be configured to maintain carbon dioxide clathrates as a solid and/or slurry until removal of carbon dioxide from the vehicle 500 is intended.

The exhaust storage vessel 450 may be configured to be detachable and reattachable from the remainder of the vehicle 500. For example, the exhaust storage vessel 450 may be configured to be exchanged with a different exhaust storage vessel 450 that has been emptied of carbon dioxide clathrates.

The vehicle 500 may further comprise a sensor configured to monitor the amount of carbon dioxide clathrates in the exhaust storage vessel 450. The sensor may be configured to measure a mass of the carbon dioxide clathrates. The sensor may be configured to measure a vapor pressure of carbon dioxide gas present in the exhaust storage vessel 450. The sensor may be configured to determine a concentration of carbon dioxide present in the exhaust storage vessel 450. The sensor may be configured to monitor the amount of carbon dioxide removed from the exhaust storage vessel 450.

The vehicle 500 may alternatively comprise a dissociation vessel operably connected to the exhaust storage vessel 450 and configured to receive carbon dioxide clathrates from the exhaust storage vessel 450. The dissociation vessel may be configured for removal of stored carbon dioxide from the vehicle 500 when the vehicle 500 is otherwise not in use. The dissociation vessel may be configured to reduce the pressure and/or increase the temperature of the dissociation vessel sufficient to dissociate the stored carbon dioxide clathrates into carbon dioxide and host material.

The exhaust storage vessel 450 may comprise insulation. The insulation may comprise at least one material configured to and compatible with maintaining desired temperatures within each vessel. Examples of such materials include, but are not limited to, calcium silicate, cellular glass, elastomeric foam, fiberglass, polyisocyanurate, polystyrene, and polyurethane. The insulation may comprise at least one vacuum layer and/or multi-layer insulation. The insulation may releasably surround at least a portion of an outer surface of the vessel and/or the insulation may be attached to at least a portion of a surface of the vessel, including an outer and/or inner surface.

The exhaust storage vessel 450 may comprise a refrigeration system configured to maintain an internal temperature of about 0 degrees Centigrade to about 25 degrees Centigrade. The exhaust storage vessel 450 may be configured to maintain an internal temperature of about 0 degrees Centigrade to about 20 degrees Centigrade. The exhaust storage vessel 450 may be configured to maintain an internal temperature of about 0 degrees Centigrade to about 15 degrees Centigrade. The exhaust storage vessel 450 may be configured to maintain an internal temperature of about 0 degrees Centigrade to about 10 degrees Centigrade, including from about 4 degrees Centigrade to about 10 degrees Centigrade.

The refrigeration system may comprise a heat pipe. The refrigeration system may also comprise a vapor compression system. The vapor compression system may utilize a chlorofluorocarbon, a chlorofluoroolefin, a hydrochlorofluorocarbon, a hydrochloro-fluoroolefin, a hydrofluoroolefin, a hydrochloroolefin, a hydroolefin, a hydrocarbon, a perfluoroolefin, a perfluorocarbon, a perchloroolefin, a perchlorocarbon, and/or a halon. The refrigeration system may comprise a vapor absorption system. The vapor absorption system may utilize water, ammonia, and/or lithium bromide. The refrigeration system may comprise a gas cycle refrigeration system, such as one that utilizes air. The refrigeration system may comprise a stirling cycle refrigeration system. The stirling cycle refrigeration system may utilize helium. The stirling cycle refrigeration system may comprise a free piston stirling cooler. The refrigeration system may comprise a thermoelectric refrigeration system.

The exhaust storage vessel 450 may be comprised of structural materials configured to and compatible with maintaining desired temperatures and pressures within the vessel. The structural material may comprise aluminum, brass, copper, ferretic steel, carbon steel, stainless steel, polytetrafluoroethylene (PTFE), polychlorotrifluoroethylene (PCTFE), vinylidene polyfluoride (PVDF), polyamide (PA), polypropylene (PP), nitrile rubber (NBR), chloroprene (CR), chlorofluorocarbons (FKM), and/or composite materials, including composite materials comprising carbon fibers, glass fibers, and/or aramid fibers.

The exhaust storage vessel 450 may be designed to maintain an internal pressure of about 1 bar to about 30 bar, an internal pressure of about 10 bar to about 30 bar, an internal pressure of about 10 bar to about 15 bar, an internal pressure of about 15 bar to about 27 bar, an internal pressure of about 20 bar to about 27 bar. The vessel may be designed to leak or vent before burst. The vessel may further comprise a pressure relief device operably connected to the vessel and configured to reduce pressure within the vessel. Examples of a pressure relief device include, but are not limited to, a pressure relief valve and a rupture disc.

The vehicle 500 may further comprise a pressurizing device operably connected to the exhaust storage vessel 450 and configured to maintain pressure within the exhaust storage vessel 450. Examples of a pressurizing device include a moveable press integrated with the vessel, wherein the moveable press is configured to maintain pressure within the vessel. For example, the moveable press may include, but is not limited to, a hydraulic press or an electromagnetically activated press. In other examples, the pressurizing device may comprise a compressor. Examples of a compressor include, but are not limited to, a centrifugal compressor, a mixed-flow compressor, an axial-flow compressor, a reciprocating compressor, a rotary screw compressor, a rotary vane compressor, a scroll compressor, and a diaphragm compressor.

Vehicle 500 may further comprise a pressure monitoring device operably connected to the exhaust storage vessel 450 and configured to monitor an internal pressure of the exhaust storage vessel 450. The pressure monitoring device may comprise a piezoresistive strain gauge, a capacitive sensor, an electromagnetic sensor, a piezoelectric sensor, an optical sensor, a potentiometric sensor, a thermal conductivity sensor, and/or an ionization sensor.

The vehicle 500 may further comprise a temperature monitoring system configured to monitor the internal temperature of the exhaust storage vessel 450. The temperature monitoring system may comprise a thermostat, a thermistor, a thermocouple, and/or a resistive temperature detector.

The vehicle 500 may further comprise a control system configured to monitor both pressure and temperature of the exhaust storage vessel 450 and configured to regulate at least one of pressure and temperature in order to maintain the carbon dioxide clathrate within a clathrate stability range.

Without further elaboration, it is believed that one skilled in the art can use the preceding description to utilize the invention to its fullest extent. The claims and embodiments disclosed herein are to be construed as merely illustrative and exemplary, and not a limitation of the scope of the present disclosure in any way. It will be apparent to those having ordinary skill in the art, with the aid of the present disclosure, that changes may be made to the details of the above-described embodiments without departing from the underlying principles of the disclosure herein. In other words, various modifications and improvements of the embodiments specifically disclosed in the description above are within the scope of the appended claims. The scope of the invention is therefore defined by the following claims.

The invention claimed is:

1. A method of sequestering emissions, the method comprising:

storing gas clathrates in a clathrate storage vessel;

separating stored gas clathrates into at least one gas and a host material, wherein separating stored gas clathrates comprises dissociating primarily only gas clathrates without substantially dissociating stored carbon dioxide clathrates;

operating an engine of a vehicle utilizing the at least one gas as fuel;

combining carbon dioxide from an exhaust stream of the engine with the host material, wherein the host material is compatible with forming carbon dioxide clathrates with the carbon dioxide of the exhaust stream;

pressurizing and cooling the exhaust stream and the host material sufficient to form carbon dioxide clathrates with the carbon dioxide and the host material; and storing formed carbon dioxide clathrates in the clathrate storage vessel during operation of the engine.

2. The method of claim 1, further comprising removing stored carbon dioxide from the clathrate storage vessel when the vehicle is otherwise not in use.

3. The method of claim 1, wherein the host material used to form carbon dioxide clathrates is at least partially host material that was previously separated from the gas clathrates.

4. The method of claim 1, further comprising tracking which clathrates comprise gas clathrates and which clathrates comprise carbon dioxide clathrates.

5. A vehicle with reduced emissions, the vehicle comprising:

a clathrate storage vessel configured to store gas clathrates and carbon dioxide clathrates;

a separation system configured to dissociate the gas clathrates into a host material and at least one gas;

an engine configured to utilize the at least one gas as fuel;

a clathrate formation system configured to combine carbon dioxide from an exhaust stream from the engine, with the host material to form carbon dioxide clathrates; and an electronic control system configured to feed primarily stored gas clathrates to the separation system without feeding stored carbon dioxide clathrates to the separation system.

6. The vehicle of claim 5, further comprising a tracking system configured to monitor which clathrates comprise gas clathrates and which clathrates comprise carbon dioxide clathrates.

7. The vehicle of claim 5, wherein the clathrate storage vessel is configured to receive the at least one gas and the host material and to form the gas clathrates within the clathrate storage vessel.

8. The vehicle of claim 5, wherein the clathrate storage vessel is configured to be detachable from and reattachable with the remainder of the vehicle.

9. The vehicle of claim 8, wherein the clathrate storage vessel is configured to be exchanged with a different clathrate storage vessel that has had carbon dioxide clathrates removed and been pre-filled with gas clathrates.

10. The vehicle of claim 5, further comprising a pressurizing device operably connected to the clathrate storage vessel and configured to maintain pressure within the clathrate storage vessel.

11. The vehicle of claim 5, further comprising a heating system configured and located to impart heat energy to the clathrate storage vessel.

12. The vehicle of claim 5, further comprising a control system configured to monitor both pressure and temperature and to regulate at least one of the pressure and temperature in order to maintain clathrates within a clathrate stability range.

13. The vehicle of claim 5, wherein the separation system comprises a separation vessel operably connected to the clathrate storage vessel.

14. The vehicle of claim 13, wherein the vehicle further comprises a transport device operably connected to the clathrate storage vessel and operably connected to the separation vessel and configured to transfer gas clathrates from the clathrate storage vessel to the separation vessel.

15. The vehicle of claim 13, wherein the separation system is configured to control the rate of dissociation of the gas clathrates by regulating at least one of the temperature and the pressure of the gas clathrates within the separation vessel.

16. The vehicle of claim 13, wherein the separation system further comprises a heating system configured and located to impart heat energy to the separation vessel.

17. The vehicle of claim 5, further comprising a transport device configured to transport dissociated at least one gas from the separation system to the engine, wherein the transport device is operably connected to the separation system and to the engine.

18. The vehicle of claim 5, wherein the clathrate storage vessel is configured for removal of stored carbon dioxide from the vehicle when the vehicle is otherwise not in use.

19. The vehicle of claim 5, wherein the clathrate storage vessel is configured to maintain carbon dioxide clathrates as a solid until removal of carbon dioxide from the vehicle is intended.

20. The vehicle of claim 5, further comprising a recycle system configured to transfer dissociated host material from the separation system to the clathrate formation system.

21. The vehicle of claim 5, wherein at least a portion of the host material used to store gas clathrates is reused to form carbon dioxide clathrates.

22. A vehicle with reduced emissions, the vehicle comprising:
a clathrate storage vessel configured to store gas clathrates and carbon dioxide clathrates;
a separation system configured to dissociate the gas clathrates into a host material and at least one gas;
an engine configured to utilize the at least one gas as fuel; and a clathrate formation system configured to combine carbon dioxide from an exhaust stream from the engine. with the host material to form carbon dioxide clathrates, wherein the clathrate formation system is configured to control the pressure and temperature of the exhaust stream and the host material sufficient to form carbon dioxide clathrates with carbon dioxide and host material.

23. The vehicle of claim 22, wherein the clathrate formation system comprises a cooling system configured to cool the exhaust stream.

24. The vehicle of claim 22, wherein the clathrate formation system comprises a formation vessel operably connected to the clathrate storage vessel.

25. The vehicle of claim 24, further comprising a carbon dioxide removal system configured to separate carbon dioxide from the exhaust stream and deliver the removed carbon dioxide to the formation vessel.

26. The vehicle of claim 25, wherein the carbon dioxide removal system comprises a removal vessel operably connected to the exhaust stream and the formation vessel.

27. The vehicle of claim 26, wherein the removal vessel is configured to contact the exhaust stream with at least one separation fluid.

28. The vehicle of claim 26, wherein the removal vessel is configured to contact the exhaust stream with an alkali carbonate.

29. The vehicle of claim 26, wherein the removal vessel comprises a membrane configured to separate carbon dioxide from the exhaust stream.

30. The vehicle of claim 24, wherein the clathrate formation system is configured to control the rate of formation of the carbon dioxide clathrates by regulating at least one of the temperature and the pressure of exhaust gases within the formation vessel.

31. The vehicle of claim 24, wherein the vehicle further comprises a transport device operably connected to the clathrate storage vessel, operably connected to the formation vessel, and operably connected to the separation vessel, wherein the transport device is configured to transfer gas clathrates from the clathrate storage vessel to the separation vessel and is also configured to transfer carbon dioxide clathrates from the formation vessel to the clathrate storage vessel.

32. The vehicle of claim 31, wherein the transport device comprises a moveable surface.

33. The vehicle of claim 32, further comprising a tracking system configured to monitor the position of the moveable surface to determine which clathrates comprise gas clathrates and which clathrates comprise carbon dioxide clathrates.

34. The vehicle of claim 32, wherein the separation system is configured to dissociate substantially all of the gas clathrates located on a portion of the moveable surface transported to the separation system, such that when that portion of the moveable surface is transported to the clathrate formation system, that portion of the moveable surface is substantially free from gas clathrates.

35. The vehicle of claim 24, wherein the vehicle further comprises a transport device operably connected to the clathrate storage vessel and operably connected to the formation vessel and configured to transfer carbon dioxide clathrates from the formation vessel to the clathrate storage vessel.

36. A vehicle with reduced emissions, the vehicle comprising: a clathrate storage vessel configured to store gas clathrates and carbon dioxide clathrates;
a separation system configured to dissociate the gas clathrates into a host material and at least one gas;
an engine configured to utilize the at least one gas as fuel;
a clathrate formation system configured to combine carbon dioxide from an exhaust stream from the engine, with the host material to form carbon dioxide clathrates;
and a dissociation vessel operably connected to the clathrate storage vessel, configured to receive carbon dioxide clathrates from the clathrate storage vessel, and configured for removal of stored carbon dioxide from the vehicle when the vehicle is otherwise not in use.

37. The vehicle of claim 36, wherein the clathrate storage vessel is configured to receive the at least one gas and the host material and to form the gas clathrates within the clathrate storage vessel.

38. The vehicle of claim 36, wherein the separation system comprises a separation vessel operably connected to the clathrate storage vessel.

39. The vehicle of claim 36, further comprising a transport device configured to transport dissociated at least one gas from the separation system to the engine, wherein the transport device is operably connected to the separation system and to the engine.

40. The vehicle of claim 36, further comprising a recycle system configured to transfer dissociated host material from the separation system to the clathrate formation system.

\* \* \* \* \*

UNITED STATES PATENT AND TRADEMARK OFFICE
CERTIFICATE OF CORRECTION

PATENT NO.        : 9,435,239 B2                                       Page 1 of 1
APPLICATION NO.   : 13/957083
DATED             : September 6, 2016
INVENTOR(S)       : Hyde et al.

It is certified that error appears in the above-identified patent and that said Letters Patent is hereby corrected as shown below:

In the Claims

Column 65, Claim 22, Line 49 - "engine. with the host material to form carbon dioxide" should read --engine, with the host material to form carbon dioxide--

Signed and Sealed this
Eleventh Day of April, 2017

Michelle K. Lee
*Director of the United States Patent and Trademark Office*